United States Patent
Harrold et al.

(10) Patent No.: US 12,392,949 B2
(45) Date of Patent: *Aug. 19, 2025

(54) WIDE ANGLE IMAGING DIRECTIONAL BACKLIGHTS

(71) Applicant: RealD Spark, LLC, Beverly Hills, CA (US)

(72) Inventors: Jonathan Harrold, Leamington Spa (GB); Graham J Woodgate, Henley-on-Thames (GB)

(73) Assignee: RealD Spark, LLC, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/352,497

(22) Filed: Jun. 21, 2021

(65) Prior Publication Data

US 2021/0389516 A1 Dec. 16, 2021

Related U.S. Application Data

(63) Continuation of application No. 15/595,615, filed on May 15, 2017, now Pat. No. 11,079,619.

(Continued)

(51) Int. Cl.
 F21V 8/00 (2006.01)
 G02B 27/01 (2006.01)
 (Continued)

(52) U.S. Cl.
 CPC ......... *G02B 6/0016* (2013.01); *G02B 6/0045* (2013.01); *G02B 6/0048* (2013.01);
 (Continued)

(58) Field of Classification Search
 CPC ............... G02F 1/1323; G02F 1/13318; G02F 1/133615; G02F 2203/12; G06T 7/70;
 (Continued)

(56) References Cited

U.S. PATENT DOCUMENTS 1,128,979 A 2/1915 Hess
1,970,311 A 8/1934 Ives
(Continued)

FOREIGN PATENT DOCUMENTS

CA 2222313 A1 6/1998
CN 1142869 A 2/1997
(Continued)

OTHER PUBLICATIONS

EP-19881483.2 Extended European Search Report of European Patent Office dated Aug. 5, 2022.
(Continued)

*Primary Examiner* — Mishawn N. Hunter
(74) *Attorney, Agent, or Firm* — Foley & Lardner LLP

(57) ABSTRACT

An imaging directional backlight apparatus includes a waveguide and a light source array, providing large area directed illumination from localized light sources. The waveguide may include a stepped structure, and the steps may further include extraction features optically hidden to guided light, propagating in a forward direction. Returning light propagating in a backward direction may be refracted, diffracted, or reflected by the features to provide discrete illumination beams exiting from the top surface of the waveguide. Viewing windows are formed through imaging individual light sources and define the relative positions of system elements and ray paths. The imaging directional backlight apparatus further includes a control system for controlling the light output directional distribution in an automotive or vehicle environment in dependence on the output from sensors mounted on the vehicle. The control system is arranged to control the light output direction distribution of portable directional displays co-located with the vehicle.

22 Claims, 53 Drawing Sheets

Related U.S. Application Data

(60) Provisional application No. 62/339,081, filed on May 19, 2016.

(51) Int. Cl.

| | | |
|---|---|---|
| *G02F 1/13* | (2006.01) | |
| *G02F 1/133* | (2006.01) | |
| *G06T 7/70* | (2017.01) | |
| *H04N 7/18* | (2006.01) | |
| *G02F 1/13357* | (2006.01) | |
| *H04N 13/31* | (2018.01) | |
| *H04N 13/383* | (2018.01) | |

(52) U.S. Cl.
CPC ......... *G02B 6/0055* (2013.01); *G02B 6/0068* (2013.01); *G02B 27/0149* (2013.01); *G02F 1/1323* (2013.01); *G02F 1/13318* (2013.01); *G06T 7/70* (2017.01); *H04N 7/183* (2013.01); *G02F 1/133615* (2013.01); *G02F 2203/12* (2013.01); *H04N 13/31* (2018.05); *H04N 13/383* (2018.05)

(58) Field of Classification Search
CPC .. G02B 6/0016; G02B 6/0045; G02B 6/0048; G02B 6/0055; G02B 6/0068; G02B 27/22; H04N 7/183; H04N 13/383; H04N 13/31
USPC ....................................................... 348/148
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 3,914,022 A | 10/1975 | Kashnow |
| 4,057,323 A | 11/1977 | Ward |
| 4,059,916 A | 11/1977 | Tachihara et al. |
| 4,528,617 A | 7/1985 | Blackington |
| 4,542,958 A | 9/1985 | Young |
| 4,586,790 A | 5/1986 | Umeda et al. |
| 4,621,898 A | 11/1986 | Cohen |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 4,974,941 A | 12/1990 | Gibbons et al. |
| 5,005,108 A | 4/1991 | Pristash et al. |
| 5,035,491 A | 7/1991 | Kawagishi et al. |
| 5,050,946 A | 9/1991 | Hathaway et al. |
| 5,126,882 A | 6/1992 | Oe et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,579,139 A | 11/1996 | Abileah et al. |
| 5,581,402 A | 12/1996 | Taylor |
| 5,588,526 A | 12/1996 | Fantone et al. |
| 5,608,550 A | 3/1997 | Epstein et al. |
| 5,658,490 A | 8/1997 | Sharp et al. |
| 5,671,994 A | 9/1997 | Tai et al. |
| 5,697,006 A | 12/1997 | Taguchi et al. |
| 5,703,667 A | 12/1997 | Ochiai |
| 5,715,028 A | 2/1998 | Abileah et al. |
| 5,726,729 A | 3/1998 | Takei |
| 5,727,107 A | 3/1998 | Umemoto et al. |
| 5,771,066 A | 6/1998 | Barnea |
| 5,779,337 A | 7/1998 | Saito et al. |
| 5,791,757 A | 8/1998 | O'Neil et al. |
| 5,796,451 A | 8/1998 | Kim |
| 5,808,784 A | 9/1998 | Ando et al. |
| 5,808,792 A | 9/1998 | Woodgate et al. |
| 5,835,166 A | 11/1998 | Hall et al. |
| 5,852,509 A | 12/1998 | Coleman |
| 5,854,872 A | 12/1998 | Tai |
| 5,875,055 A | 2/1999 | Morishima et al. |
| 5,894,361 A | 4/1999 | Yamazaki et al. |
| 5,896,225 A | 4/1999 | Chikazawa |
| 5,903,388 A | 5/1999 | Sedlmayr |
| 5,914,760 A | 6/1999 | Daiku |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 5,997,148 A | 12/1999 | Ohkawa |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,055,103 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,099,758 A | 8/2000 | Verrall et al. |
| 6,108,059 A | 8/2000 | Yang |
| 6,118,584 A | 9/2000 | Berkel et al. |
| 6,128,054 A | 10/2000 | Schwarzenberger |
| 6,144,433 A | 11/2000 | Tillin et al. |
| 6,169,589 B1 | 1/2001 | Kaneko |
| 6,172,723 B1 | 1/2001 | Inoue et al. |
| 6,199,995 B1 | 3/2001 | Umemoto et al. |
| 6,204,904 B1 | 3/2001 | Tillin et al. |
| 6,222,672 B1 | 4/2001 | Towler et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,280,043 B1 | 8/2001 | Ohkawa |
| 6,295,109 B1 | 9/2001 | Kubo et al. |
| 6,302,541 B1 | 10/2001 | Grossmann |
| 6,305,813 B1 | 10/2001 | Lekson et al. |
| 6,364,497 B1 | 4/2002 | Park et al. |
| 6,373,637 B1 | 4/2002 | Gulick et al. |
| 6,377,295 B1 | 4/2002 | Woodgate et al. |
| 6,379,016 B1 | 4/2002 | Boyd et al. |
| 6,392,727 B1 | 5/2002 | Larson et al. |
| 6,422,713 B1 | 7/2002 | Fohl et al. |
| 6,437,915 B2 | 8/2002 | Moseley et al. |
| 6,456,340 B1 | 9/2002 | Margulis |
| 6,464,365 B1 | 10/2002 | Gunn et al. |
| 6,476,850 B1 | 11/2002 | Erbey |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,752,505 B2 | 6/2004 | Parker et al. |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 6,987,550 B2 | 1/2006 | Takato et al. |
| 7,001,058 B2 | 2/2006 | Inditsky |
| 7,058,252 B2 | 6/2006 | Woodgate et al. |
| 7,067,985 B2 | 6/2006 | Adachi |
| 7,072,096 B2 | 7/2006 | Holman et al. |
| 7,091,931 B2 | 8/2006 | Yoon |
| 7,101,048 B2 | 9/2006 | Travis |
| 7,136,031 B2 | 11/2006 | Lee et al. |

(56) References Cited

U.S. PATENT DOCUMENTS

| | | |
|---|---|---|
| 7,163,319 B2 | 1/2007 | Kuo et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,227,602 B2 | 6/2007 | Jeon et al. |
| 7,239,293 B2 | 7/2007 | Perlin et al. |
| 7,365,908 B2 | 4/2008 | Dolgoff |
| 7,366,392 B2 | 4/2008 | Honma et al. |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,524,542 B2 | 4/2009 | Kim et al. |
| 7,528,893 B2 | 5/2009 | Schultz et al. |
| 7,528,913 B2 | 5/2009 | Kobayashi |
| 7,545,429 B2 | 6/2009 | Travis |
| 7,614,777 B2 | 11/2009 | Koganezawa et al. |
| 7,633,586 B2 | 12/2009 | Winlow et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,766,534 B2 | 8/2010 | Iwasaki |
| 7,771,102 B2 | 8/2010 | Iwasaki |
| 7,798,698 B2 | 9/2010 | Segawa |
| 7,798,699 B2 | 9/2010 | Laitinen et al. |
| 7,834,834 B2 | 11/2010 | Takatani et al. |
| 7,864,253 B2 | 1/2011 | Tajiri |
| 7,970,246 B2 | 6/2011 | Travis et al. |
| 7,991,257 B1 | 8/2011 | Coleman |
| 8,016,475 B2 | 9/2011 | Travis |
| 8,070,346 B2 | 12/2011 | Maeda et al. |
| 8,098,350 B2 | 1/2012 | Sakai et al. |
| 8,154,686 B2 | 4/2012 | Mather et al. |
| 8,223,296 B2 | 7/2012 | Lee et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,556,491 B2 | 10/2013 | Lee |
| 8,646,931 B2 | 2/2014 | Choi et al. |
| 8,684,588 B2 | 4/2014 | Ajichi et al. |
| 8,760,762 B1 | 6/2014 | Kelly et al. |
| 8,801,260 B2 | 8/2014 | Urano et al. |
| 8,848,132 B2 | 9/2014 | O'Neill et al. |
| 8,926,112 B2 | 1/2015 | Uchiike et al. |
| 8,939,595 B2 | 1/2015 | Choi et al. |
| 8,942,434 B1 | 1/2015 | Karakotsios et al. |
| 8,973,149 B2 | 3/2015 | Buck |
| 9,195,087 B2 | 11/2015 | Terashima |
| 9,197,884 B2 | 11/2015 | Lee et al. |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 * | 9/2018 | Wakamoto .............. B60K 37/06 |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 11,977,286 B2 | 5/2024 | Woodgate et al. |
| 2001/0001566 A1 | 5/2001 | Moseley et al. |
| 2001/0024561 A1 | 9/2001 | Cornelissen et al. |
| 2001/0050686 A1 | 12/2001 | Allen |
| 2002/0015300 A1 | 2/2002 | Katsu et al. |
| 2002/0018299 A1 | 2/2002 | Daniell |
| 2002/0024529 A1 | 2/2002 | Miller et al. |
| 2002/0113866 A1 | 8/2002 | Taniguchi et al. |
| 2002/0140342 A1 | 10/2002 | Sundahl |
| 2002/0163790 A1 | 11/2002 | Yamashita et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117790 A1 | 6/2003 | Lee et al. |
| 2003/0117792 A1 | 6/2003 | Kunimochi et al. |
| 2003/0133191 A1 | 7/2003 | Morita et al. |
| 2003/0137821 A1 | 7/2003 | Gotoh et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0100598 A1 | 5/2004 | Adachi et al. |
| 2004/0108971 A1 | 6/2004 | Waldern et al. |
| 2004/0109303 A1 | 6/2004 | Olczak |
| 2004/0125430 A1 | 7/2004 | Kasajima et al. |
| 2004/0135741 A1 | 7/2004 | Tomisawa et al. |
| 2004/0141107 A1 | 7/2004 | Jones |
| 2004/0145703 A1 | 7/2004 | O'Connor et al. |
| 2004/0170011 A1 | 9/2004 | Kim et al. |
| 2004/0223094 A1 | 11/2004 | Hamada et al. |
| 2004/0240777 A1 | 12/2004 | Woodgate et al. |
| 2004/0246418 A1 | 12/2004 | Kumagai et al. |
| 2004/0263968 A1 | 12/2004 | Kobayashi et al. |
| 2004/0263969 A1 | 12/2004 | Lipton et al. |
| 2004/0264910 A1 | 12/2004 | Suzuki et al. |
| 2005/0002174 A1 | 1/2005 | Min et al. |
| 2005/0007753 A1 | 1/2005 | Hees et al. |
| 2005/0014913 A1 | 1/2005 | Kim et al. |
| 2005/0041311 A1 | 2/2005 | Mi et al. |
| 2005/0094295 A1 | 5/2005 | Yamashita et al. |
| 2005/0110980 A1 | 5/2005 | Maehara et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0180167 A1 | 8/2005 | Hoelen et al. |
| 2005/0190180 A1 | 9/2005 | Jin et al. |
| 2005/0190326 A1 | 9/2005 | Jeon et al. |
| 2005/0190329 A1 | 9/2005 | Okumura |
| 2005/0190345 A1 | 9/2005 | Dubin et al. |
| 2005/0206814 A1 | 9/2005 | Histake |
| 2005/0213348 A1 | 9/2005 | Parikka et al. |

(56) References Cited

U.S. PATENT DOCUMENTS

| | | |
|---|---|---|
| 2005/0219693 A1 | 10/2005 | Hartkop et al. |
| 2005/0237488 A1 | 10/2005 | Yamasaki et al. |
| 2005/0243265 A1 | 11/2005 | Winlow et al. |
| 2005/0254127 A1 | 11/2005 | Evans et al. |
| 2005/0259193 A1 | 11/2005 | Sumiyoshi et al. |
| 2005/0259205 A1 | 11/2005 | Sharp et al. |
| 2005/0264717 A1 | 12/2005 | Chien et al. |
| 2005/0270798 A1 | 12/2005 | Lee et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0050209 A1 | 3/2006 | Higa |
| 2006/0056166 A1 | 3/2006 | Yeo et al. |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0146405 A1 | 7/2006 | MacMaster |
| 2006/0158729 A1 | 7/2006 | Vissenberg et al. |
| 2006/0176912 A1 | 8/2006 | Anikitchev |
| 2006/0203162 A1 | 9/2006 | Ito et al. |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244884 A1 | 11/2006 | Jeon et al. |
| 2006/0244918 A1 | 11/2006 | Cossairt et al. |
| 2006/0250580 A1 | 11/2006 | Silverstein et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0267040 A1 | 11/2006 | Baek et al. |
| 2006/0268207 A1 | 11/2006 | Tan et al. |
| 2006/0269213 A1 | 11/2006 | Hwang et al. |
| 2006/0284974 A1 | 12/2006 | Lipton et al. |
| 2006/0285040 A1 | 12/2006 | Kobayashi |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0008471 A1 | 1/2007 | Wang et al. |
| 2007/0013624 A1 | 1/2007 | Bourhill |
| 2007/0024970 A1 | 2/2007 | Lub et al. |
| 2007/0025680 A1 | 2/2007 | Winston et al. |
| 2007/0030240 A1 | 2/2007 | Sumiyoshi et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0040780 A1 | 2/2007 | Gass et al. |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0139772 A1 | 6/2007 | Wang |
| 2007/0147088 A1 | 6/2007 | Chien et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0268427 A1 | 11/2007 | Uehara |
| 2007/0279554 A1 | 12/2007 | Kowarz et al. |
| 2007/0279727 A1 | 12/2007 | Gandhi et al. |
| 2007/0285775 A1 | 12/2007 | Lesage et al. |
| 2008/0008434 A1 | 1/2008 | Lee et al. |
| 2008/0055221 A1 | 3/2008 | Yabuta et al. |
| 2008/0068329 A1 | 3/2008 | Shestak et al. |
| 2008/0068862 A1 | 3/2008 | Shimura |
| 2008/0079662 A1 | 4/2008 | Saishu et al. |
| 2008/0084519 A1 | 4/2008 | Brigham et al. |
| 2008/0106689 A1 | 5/2008 | Inoue et al. |
| 2008/0117364 A1* | 5/2008 | Matsushima ......... G02F 1/1323 349/96 |
| 2008/0128728 A1 | 6/2008 | Nemchuk et al. |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0285310 A1 | 11/2008 | Aylward et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316198 A1 | 12/2008 | Fukushima et al. |
| 2008/0316303 A1 | 12/2008 | Chiu et al. |
| 2008/0316366 A1 | 12/2008 | Takatani et al. |
| 2008/0316768 A1 | 12/2008 | Travis |
| 2009/0009894 A1 | 1/2009 | Chuang |
| 2009/0016057 A1 | 1/2009 | Rinko |
| 2009/0021657 A1 | 1/2009 | Yang et al. |
| 2009/0040426 A1 | 2/2009 | Mather et al. |
| 2009/0067156 A1 | 3/2009 | Bonnett et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0109705 A1 | 4/2009 | Pakhchyan et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174840 A1 | 7/2009 | Lee et al. |
| 2009/0174843 A1 | 7/2009 | Sakai et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0225380 A1 | 9/2009 | Schwerdtner et al. |
| 2009/0244415 A1 | 10/2009 | Ide |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0002296 A1 | 1/2010 | Choi et al. |
| 2010/0014313 A1* | 1/2010 | Tillin ................. G02B 27/0101 359/619 |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0066960 A1 | 3/2010 | Smith et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0128200 A1 | 5/2010 | Morishita et al. |
| 2010/0149459 A1 | 6/2010 | Yabuta et al. |
| 2010/0165598 A1 | 7/2010 | Chen et al. |
| 2010/0177113 A1 | 7/2010 | Gay et al. |
| 2010/0177387 A1 | 7/2010 | Travis et al. |
| 2010/0182542 A1 | 7/2010 | Nakamoto et al. |
| 2010/0187704 A1 | 7/2010 | Hsu et al. |
| 2010/0188438 A1 | 7/2010 | Kang |
| 2010/0188602 A1 | 7/2010 | Feng |
| 2010/0205667 A1 | 8/2010 | Anderson et al. |
| 2010/0214135 A1 | 8/2010 | Bathiche et al. |

(56) References Cited

U.S. PATENT DOCUMENTS

| | | |
|---|---|---|
| 2010/0214324 A1 | 8/2010 | Broughton et al. |
| 2010/0220260 A1 | 9/2010 | Sugita et al. |
| 2010/0231498 A1 | 9/2010 | Large et al. |
| 2010/0238376 A1 | 9/2010 | Sakai et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0283930 A1 | 11/2010 | Park et al. |
| 2010/0289870 A1 | 11/2010 | Leister |
| 2010/0289989 A1 | 11/2010 | Adachi et al. |
| 2010/0295755 A1 | 11/2010 | Broughton et al. |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309204 A1 | 12/2010 | Smith et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0018860 A1 | 1/2011 | Parry-Jones et al. |
| 2011/0019112 A1 | 1/2011 | Dolgoff |
| 2011/0032437 A1 | 2/2011 | Yoshimi et al. |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0115997 A1 | 5/2011 | Kim |
| 2011/0176089 A1 | 7/2011 | Ishikawa et al. |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0241573 A1 | 10/2011 | Tsai et al. |
| 2011/0241983 A1 | 10/2011 | Chang |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0255304 A1 | 10/2011 | Kinoshita |
| 2011/0267563 A1 | 11/2011 | Shimizu |
| 2011/0285927 A1 | 11/2011 | Schultz et al. |
| 2011/0286222 A1 | 11/2011 | Coleman |
| 2011/0292321 A1 | 12/2011 | Travis et al. |
| 2011/0310232 A1 | 12/2011 | Wilson et al. |
| 2011/0321143 A1 | 12/2011 | Angaluri et al. |
| 2012/0002121 A1 | 1/2012 | Pirs et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0020078 A1 | 1/2012 | Chang |
| 2012/0056971 A1 | 3/2012 | Kumar et al. |
| 2012/0062991 A1 | 3/2012 | Krijn et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0086875 A1 | 4/2012 | Yokota |
| 2012/0086893 A1 | 4/2012 | Ou et al. |
| 2012/0092435 A1 | 4/2012 | Wohlert |
| 2012/0106193 A1 | 5/2012 | Kim et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0170315 A1 | 7/2012 | Fan et al. |
| 2012/0188792 A1 | 7/2012 | Matsumoto et al. |
| 2012/0206050 A1 | 8/2012 | Spero |
| 2012/0212414 A1 | 8/2012 | Osterhout et al. |
| 2012/0219180 A1 | 8/2012 | Mehra |
| 2012/0235891 A1 | 9/2012 | Nishitani et al. |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2012/0327172 A1 | 12/2012 | El-Saban et al. |
| 2013/0039062 A1 | 2/2013 | Vinther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0101253 A1 | 4/2013 | Popovich et al. |
| 2013/0107174 A1 | 5/2013 | Yun et al. |
| 2013/0107340 A1 | 5/2013 | Wong et al. |
| 2013/0120817 A1 | 5/2013 | Yoon et al. |
| 2013/0127861 A1 | 5/2013 | Gollier |
| 2013/0128165 A1 | 5/2013 | Lee et al. |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0242231 A1 | 9/2013 | Kurata et al. |
| 2013/0242612 A1 | 9/2013 | Lee et al. |
| 2013/0265625 A1 | 10/2013 | Fäcke et al. |
| 2013/0278544 A1 | 10/2013 | Cok |
| 2013/0293793 A1 | 11/2013 | Lu |
| 2013/0294684 A1 | 11/2013 | Lipton et al. |
| 2013/0300985 A1 | 11/2013 | Bulda |
| 2013/0307831 A1 | 11/2013 | Robinson et al. |
| 2013/0307946 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0126238 A1 | 5/2014 | Kao et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0267584 A1 | 9/2014 | Atzpadin et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2014/0368602 A1 | 12/2014 | Woodgate et al. |

(56) References Cited

U.S. PATENT DOCUMENTS

| | | |
|---|---|---|
| 2015/0029449 A1 | 1/2015 | Woo et al. |
| 2015/0035872 A1* | 2/2015 | Shima ............... G02F 1/133512 |
| | | 345/88 |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0334365 A1 | 11/2015 | Tsubaki et al. |
| 2015/0338564 A1 | 11/2015 | Zhang et al. |
| 2015/0339512 A1 | 11/2015 | Son et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1* | 6/2016 | Liu ...................... H04N 13/373 |
| | | 348/40 |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1* | 1/2018 | Newman ............... B60S 1/0818 |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1 | 2/2021 | Woodgate et al. |
| 2021/0072448 A1 | 3/2021 | Peng et al. |
| 2021/0116627 A1 | 4/2021 | Tsuj |
| 2021/0149233 A1 | 5/2021 | Robinson et al. |
| 2021/0149234 A1 | 5/2021 | Woodgate et al. |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1377453 A | 10/2002 |
| CN | 1125943 C | 10/2003 |
| CN | 1454329 A | 11/2003 |
| CN | 1466005 A | 1/2004 |
| CN | 1487332 A | 4/2004 |
| CN | 1690800 A | 11/2005 |
| CN | 1696788 A | 11/2005 |
| CN | 1776484 A | 5/2006 |
| CN | 1826553 A | 8/2006 |
| CN | 1900785 A | 1/2007 |
| CN | 1908753 A | 2/2007 |
| CN | 101029975 A | 9/2007 |
| CN | 101042449 A | 9/2007 |
| CN | 101049028 A | 10/2007 |
| CN | 101114080 A | 1/2008 |
| CN | 101142823 A | 3/2008 |
| CN | 101256251 A | 9/2008 |
| CN | 101266338 A | 9/2008 |

(56) References Cited

FOREIGN PATENT DOCUMENTS

| | | |
|---|---|---|
| CN | 101435952 A | 5/2009 |
| CN | 101454712 A | 6/2009 |
| CN | 101518095 A | 8/2009 |
| CN | 101681061 A | 3/2010 |
| CN | 102147079 A | 8/2011 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 106557711 A | 4/2017 |
| CN | 107102460 A | 8/2017 |
| CN | 209171779 U | 7/2019 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1326102 A1 | 7/2003 |
| EP | 1394593 A1 | 3/2004 |
| EP | 1060344 B1 | 5/2004 |
| EP | 1956423 A1 | 8/2008 |
| EP | 2037318 A1 | 3/2009 |
| EP | 2219067 A1 | 8/2010 |
| EP | 2451180 A2 | 5/2012 |
| GB | 2405542 | 2/2005 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H09197405 A | 7/1997 |
| JP | H10142556 A | 5/1998 |
| JP | H10268251 A | 10/1998 |
| JP | H11174489 A | 7/1999 |
| JP | 2003215705 A | 7/2003 |
| JP | 2005181914 A | 7/2005 |
| JP | 2005316470 A | 11/2005 |
| JP | 2005345799 A | 12/2005 |
| JP | 2006010935 A | 1/2006 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007094035 A | 4/2007 |
| JP | 2007109255 A | 4/2007 |
| JP | 2007148279 A | 6/2007 |
| JP | 2007273288 A | 10/2007 |
| JP | 2008204874 A | 9/2008 |
| JP | 2008310271 A | 12/2008 |
| JP | 2009020293 A | 1/2009 |
| JP | 2010160527 A | 7/2010 |
| JP | 2011095719 A | 5/2011 |
| JP | 2011103241 A | 5/2011 |
| JP | 2012060607 A | 3/2012 |
| JP | 2013015619 | 1/2013 |
| JP | 2013160818 A | 8/2013 |
| JP | 2014032953 A | 2/2014 |
| JP | 2014099363 A | 5/2014 |
| KR | 20090106062 A | 10/2009 |
| KR | 20090108231 A | 10/2009 |
| KR | 20090932304 | 12/2009 |
| KR | 20110006773 A | 1/2011 |
| KR | 20110017918 A | 2/2011 |
| KR | 20120011228 A | 2/2012 |
| KR | 20120049890 A | 5/2012 |
| KR | 101227145 B1 | 2/2013 |
| KR | 20130046116 A | 5/2013 |
| KR | 1020150021937 A | 3/2015 |
| KR | 20160053264 A | 5/2016 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | 1612360 B | 1/2018 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2005071449 A2 | 8/2005 |
| WO | 2005071474 A2 | 8/2005 |
| WO | 2006030702 A1 | 3/2006 |
| WO | 2007111436 A1 | 10/2007 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2011020962 A1 | 2/2011 |
| WO | 2012158574 A1 | 11/2012 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

JP2020-509511 Non-Final Notice of Reasons for Rejection dated Jul. 19, 2022.
Nelkon et al., "Advanced Level Physics", Third edition with SI units, Heinemann Educational Books LTD, London, 1970.
TW107132221 First Office Action dated Apr. 28, 2022.
Cheng, et al., "Fast-Response Liquid Crystal Variable Optical Retarder and Multilevel Attenuator," Optical Engineering 52 (10), 107105 (Oct. 16, 2013). (Year: 2013).
EP-18857077.4 Extended European Search Report of European Patent Office dated Jun. 16, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.

(56) References Cited

OTHER PUBLICATIONS

PCT/US2021/029958 International search report and written opinion of the international searching authority mailed Aug. 10, 2021.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
CN-201980020303.0—Notification of the First Office Action dated Dec. 16, 2021.
CN201680061632.6 Notification of the First Office Action dated Sep. 14, 2021.
CN201880073578.6 Notification of the First Office Action dated Aug. 27, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority mailed Nov. 1, 2021.
PCT/US2021/043444 International search report and written opinion of the international searching authority mailed Nov. 1, 2021.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Bahadur, "Liquid crystals applications and uses," World Scientific, vol. 1, pp. 178 (1990).
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
CN201880042320.X Notification of the First Office Action dated May 25, 2021.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61 (1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
Gass, et al. "Privacy LCD Technology for Cellular Phones", Sharp Laboratories of Europe Ltd, Mobile LCD Group, Feb. 2007, pp. 45-49.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.IEEE.org/iel5/79/16655/00768575.pdf [retrieved on Sep. 26, 2016].
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Marjanovic, M.,"Interlace, Interleave, and Field Dominance," http://www.mir.com/DMG/interl.html, pp. 1-5 (2001).
Ozuysal et al., "Fast Keypoint recognition in Ten Lines of Code", Computer Vision and Pattern Recognition, pp. 1-8, 2007.
PCT/US2016/058695 International search report and written opinion of the international searching authority mailed Feb. 28, 2017.
PCT/US2017/032734 International search report and written opinion of international searching authority mailed Jul. 27, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.

(56) References Cited

OTHER PUBLICATIONS

PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Zach et al., "A Duality Based Approach for Realtime TV-L1 Optical Flow", Pattern Recognition (Proc. DAGM), 2007, pp. 214-223.
EP-20754927.0 Extended European Search Report of European Patent Office dated Sep. 19, 2022.
CN-201880042320.X Notification of the Third Office Action from the Chinese Patent Office dated Dec. 30, 2022.
CN-201980082757.0 Notification of the 1st Office Action of the Chinese Patent Office mailed Dec. 5, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
PCT/US2022/045030 International search report and written opinion of the international searching authority mailed Jan. 3, 2023.
Cheng et al., "Design and manufacturing AR head-mounted displays: A review and outlook", Light: Advanced Manufacturing (2021)2:24, Official journal of the JHL 2689-9620, pp. 1-20.
EP-20851155.0 Extended European Search Report of European Patent Office dated Aug. 2, 2023.
PCT/US2023/017639 International search report and written opinion of the international searching authority mailed Jul. 6, 2023.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection mailed Feb. 17, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
EP-20835231.0 Extended European Search Report of European Patent Office dated May 15, 2023.
PCT/US2023/012240 International search report and written opinion of the international searching authority mailed Apr. 27, 2023.
PCT/US2023/012243 International search report and written opinion of the international searching authority mailed May 10, 2023.
EP-20887756.3 Extended European Search Report of European Patent Office dated Jan. 2, 2024.
EP-20898295.9 Extended European Search Report of European Patent Office dated Jan. 22, 2024.
IN202017035853 Hearing Notice dated Jan. 3, 2024.
KR10-2020-7024293 Notice of Preliminary Rejection mailed Dec. 7, 2023.
TW108140291 First Office Action dated Nov. 9, 2023.
CN202080089170.5 Notification of the First Office Action dated Apr. 7, 2024.
EP23218625.4 Extended European Search Report of European Patent Office dated Feb. 23, 2024.
JP2022-506340 Non-Final Notice of Reasons for Rejection dated Mar. 19, 2024.
PCT/US2024/025836 International search report and written opinion of the international searching authority mailed Jul. 23, 2024.
EP21795524.4 Extended European Search Report of European Patent Office dated Apr. 26, 2024.
EP21796016.0 Extended European Search Report of European Patent Office dated Apr. 29, 2024.
EP21849510.9 Extended European Search Report of European Patent Office dated Jun. 19, 2024.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
JP2022-526302 Non-Final Notice of Reasons for Rejection dated Apr. 30, 2024.
CN201980056022.0 Notification of the Second Office Action dated Jul. 26, 2024.
CN202080079843.9 Notification of the First Office Action dated Jul. 18, 2024.
EP21849888.9 Extended European Search Report of European Patent Office dated Jul. 1, 2024.
KR10-2020-7024291 Notice of Preliminary Rejection mailed Jun. 13, 2024.
PCT/US2024/020519 International search report and written opinion of the international searching authority mailed Jun. 17, 2024.
EP20835231.0 Notification of the First Office Action dated Nov. 27, 2024.
KR10-2022-7019753 Notice of Preliminary Rejection mailed Oct. 30, 2024.

\* cited by examiner

WIDE ANGLE IMAGING DIRECTIONAL BACKLIGHTS

TECHNICAL FIELD

This disclosure generally relates to illumination of light modulation devices, and more specifically relates to control of directional displays for automotive applications and light guides for providing large area illumination from localized light sources for use in 2D, privacy, night mode, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can compromise addressing electronics in the spatial light modulator.

BRIEF SUMMARY

According to the present disclosure, a directional illumination apparatus may include an imaging directional backlight for directing light and an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293 (now U.S. Pat. No. 9,519,153), which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there may be provided a display apparatus comprising: a directional display device for use in a vehicle arranged to display an image, the directional display device having an angular output light distribution that is variable; and a control system arranged to vary the angular output light distribution of the directional display device.

Advantageously, the display apparatus may achieve reduced stray light reaching the driver for operation in low light conditions, for example during night driving. Display area may be increased in comparison to conventional backlights, while providing an equivalent amount of stray light. Specular reflections of display images may be reduced from glass areas such as the side windows or windshield, and display light falling onto vehicle surfaces such as upholstery or headlining may be reduced in illuminance.

The control system may be arranged to vary the angular output light distribution of the directional display device on the basis of the output of a vehicle sensor system provided on a vehicle. Advantageously directional display output may cooperate with sensed operating conditions of the vehicle to achieve optimized operation in low illuminance (night driving) or high illuminance (driving in bright sunlight).

The vehicle sensor system may comprise a gaze sensor system arranged to detect the gaze of an occupant of the vehicle, the control system may be arranged to angularly expand the angular output light distribution of the directional display device on the basis of the output of the darkness sensor system indicating that the occupant's gaze is directed at the directional display device. The vehicle sensor system may further comprise a darkness sensor system arranged to detect dark ambient conditions, the control system may be arranged to angularly restrict the angular output light distribution of the directional display device on the basis of the output of the darkness sensor system indicating that dark ambient conditions have been detected.

Advantageously the function and content of some of the vehicle display can be directed to passengers with the same display showing a content to the driver only when looked at by the driver. The amount of distracting light to the driver is reduced.

The control system may be further arranged to decrease the brightness of the directional display device and/or adapt the color balance of the directional display device for viewing in dark ambient conditions on the basis of the output of the darkness sensor system indicating that dark ambient conditions have been detected.

The vehicle sensor system may comprise a brightness sensor system arranged to detect bright ambient conditions, the control system may be arranged to restrict the angular output light distribution of the directional display device on the basis of the output of the brightness sensor system indicating that bright ambient conditions have been detected.

Advantageously the viewability of the vehicle displays may be improved for the driver in bright ambient conditions without increasing the overall power consumption over that of a conventional backlight. Advantageously reduced power consumption may extend the operating time of the vehicle or reduce the alternator load on the vehicle, improving its efficiency.

The control system may be further arranged to increase the brightness of the directional display device and/or adapt the color balance of the directional display device for viewing in bright ambient conditions on the basis of the output of the darkness sensor system indicating that bright ambient conditions have been detected.

The vehicle sensor system may comprise a vehicle motion sensor system arranged to detect motion of the vehicle, the control system being arranged to expand the angular output light distribution of the directional display device on the basis of the output of the vehicle motion sensor system indicating that the vehicle is motionless for a specified time.

Advantageously the driver and passenger may enjoy entertainment or other content from built-in vehicle displays when the vehicle is parked or in stationary traffic.

The vehicle sensor system may comprise an occupant sensor system arranged to recognize an occupant of the vehicle, the control system may be arranged to direct the angular output light distribution of the directional display device towards an occupant on the basis of the output of the occupant sensor system.

Advantageously the control system can be arranged to recognize the driver and link his portable device, for example a phone device, to the view seen by the driver. The passenger's phone device may be automatically linked to the passenger view.

The display apparatus may further comprise an orientation sensor arranged to detect the orientation of the directional display device and a control system may be arranged to vary the angular output light distribution of the directional display device on the basis of the output of the orientation sensor.

Advantageously the portable directional-display-capable phones, tablets and devices of passengers may be arranged to avoid or reduce reflections from vehicle glass areas that can be visible or distracting to the driver.

The orientation sensor may comprise an inertial sensor. Advantageously inertial sensors may respond to the movement of a portable device with relatively low lag or latency compared to that of a camera image that is subsequently processed.

The orientation sensor may comprise a camera system and an analysis system arranged to detect the position of windows or glass areas of the vehicle in images captured by the camera system.

Advantageously a camera system may not be subject to the drift or integrated error that may accumulate in an inertial sensor system. Advantageously use of inertial and camera systems can improve the overall performance of the glass reflection prediction system and reduce driver distracting reflections.

The directional display device may be mounted to the vehicle or built-in to the vehicle.

The directional display device may be mounted to the central console of the vehicle.

The directional display device may be arranged to display an image captured by an image capture system such as a camera facing rearward (rearwardly) of the vehicle. Advantageously the directional output of synthetic mirror displays, displays which emulate the function of conventional vehicle mirrors, may be controlled to avoid distracting reflections. Such displays may further brighten or change their output display direction when looked at by the driver reducing night time levels of stray light in the cabin.

The directional display apparatus may be a portable apparatus, the control system of the directional display apparatus being arranged to communicate with a processing system of the vehicle.

Advantageously the portable devices in the vehicle may be requested or mandated to control their directional output and brightness to avoid distracting specular reflections visible to the driver or to reduce the levels of ambient light in the vehicle at night time.

The processing system of the vehicle may be arranged to communicate vehicle internal layout or geometry information to the control system of the directional display apparatus that identifies the internal layout of the vehicle, the control system may be arranged to vary the angular output light distribution of the directional display device on the basis of the layout information.

Advantageously the portable directional display devices may be able to receive the vehicle layout information including, for example, the position of glass areas or windows without having to calculate or model the likely positions of windows or glass.

The communication with the processing system of the vehicle may be wireless communication.

Advantageously the portable directional display devices do not need to be physically wired to the vehicle to receive information about the vehicle.

The display apparatus control system may be arranged to vary the angular output light distribution of the directional display device in a manner that may reduce the incidence of light on windows of the vehicle.

Advantageously the distracting effect of light reflected in glass on the driver is reduced. The visibility of objects outside the vehicle through the glass surfaces is improved.

The display apparatus control system may also be arranged to vary at least one of the brightness, contrast, color balance and content of the image displayed on the directional display device.

Advantageously the distraction to the driver from reflections both specular and diffuse or scattered is reduced.

The directional display device may comprise: a directional backlight arranged to direct light into selectable viewing windows; and may further comprise a spatial light modulator arranged to modulate the light output by the directional backlight, wherein the control system may be arranged to vary the angular output light distribution of the directional display device by selecting the viewing windows into which light is directed.

Advantageously the passenger and driver may see images without undue distraction to the driver or high levels of background illumination within the vehicle cabin or distracting window or glass surface reflections.

The directional backlight may comprise: an array of light sources; and a directional waveguide arranged to direct light from each light source into a respective viewing window, wherein the control system may be arranged to vary the angular output light distribution of the directional display device by selecting which light sources are operated.

The directional waveguide may comprise: first and second opposed guide surfaces for guiding input light from the light sources along the waveguide; and a reflective end for reflecting input light back along the waveguide, wherein the second guide surface may be arranged to deflect light reflected from the reflective end through the first guide surface as output light.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve, for example, power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiments may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
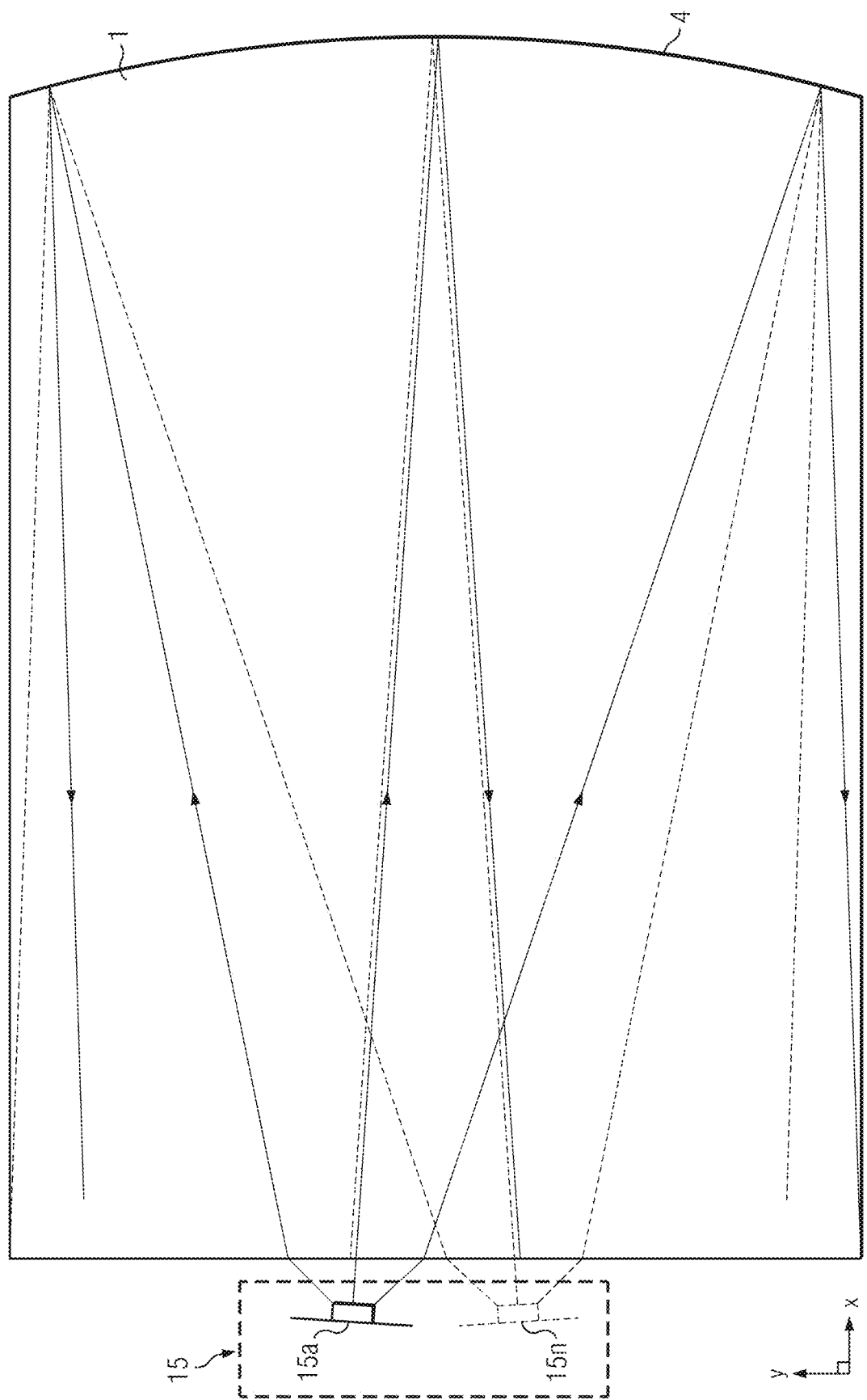
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (now U.S. Pat. No. 9,519,153) advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Kälantär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (now U.S. Pat. No. 9,519, 153), which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 (now U.S. Pat. No. 9,519,153) which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
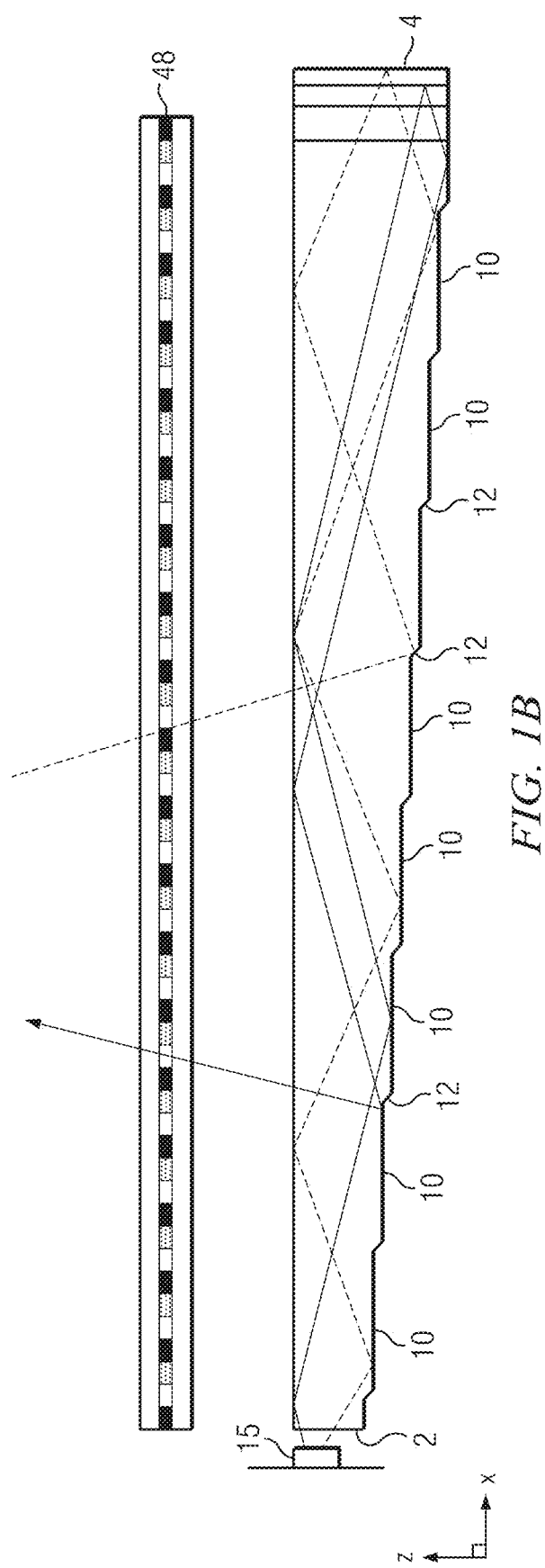
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may be a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of –x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
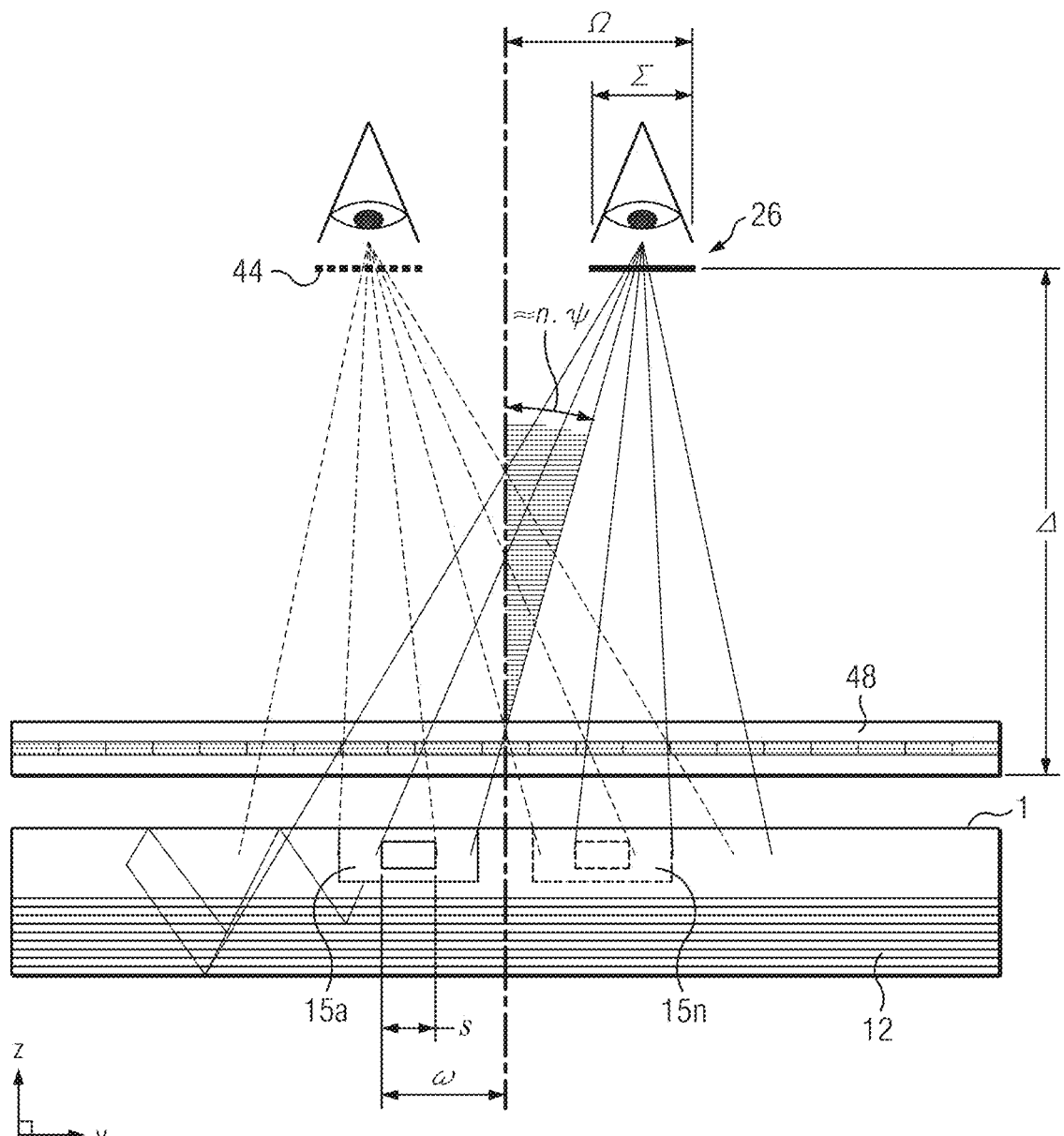
FIG. 2A is a schematic diagram illustrating in a top view of light propagation in another embodiment of a directional display device, in accordance with the present disclosure.
Figure 2B:
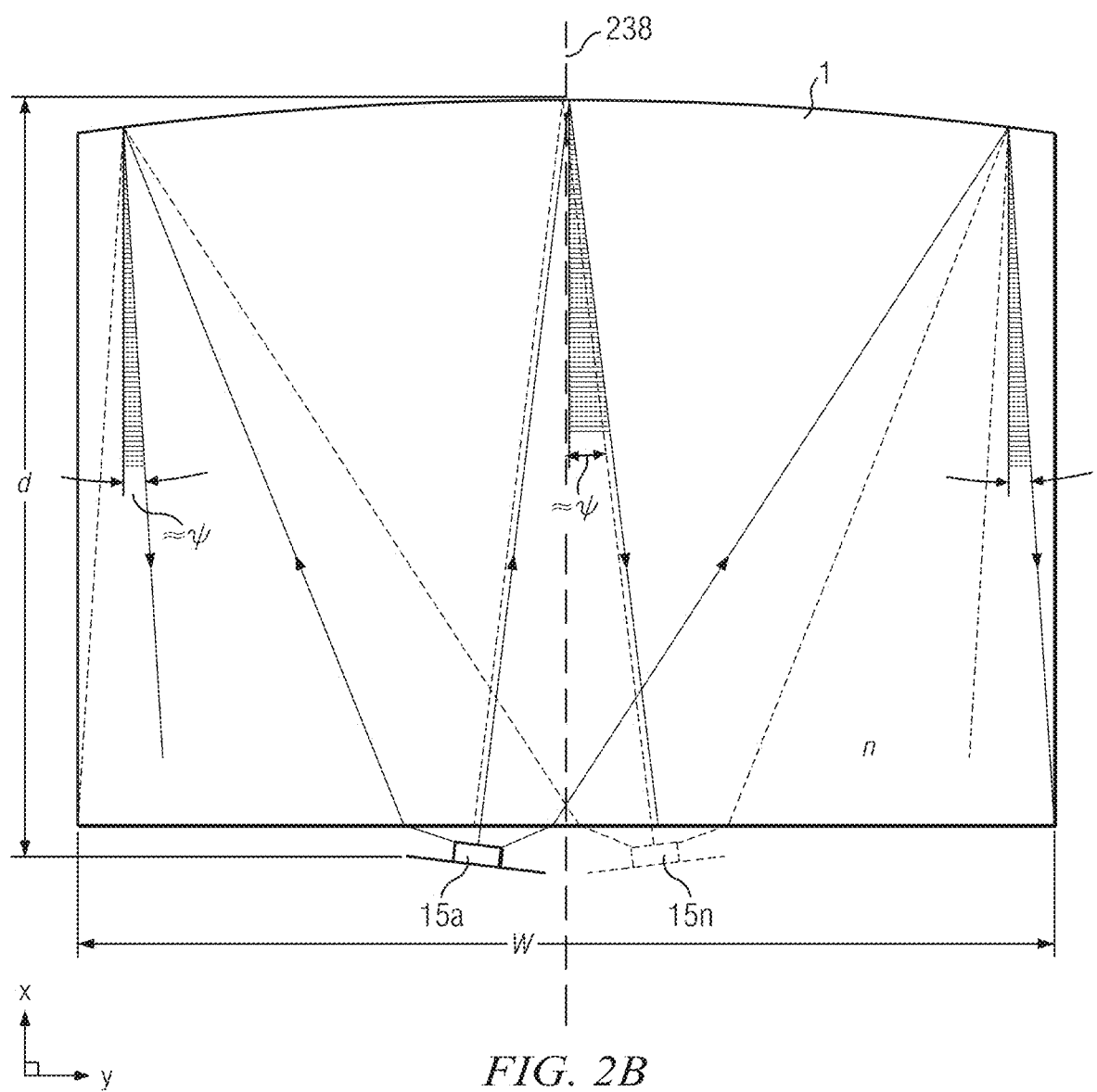
FIG. 2B is a schematic diagram illustrating light propagation in a front view of the directional display device of FIG. 2A, in accordance with the present disclosure.
Figure 2C:
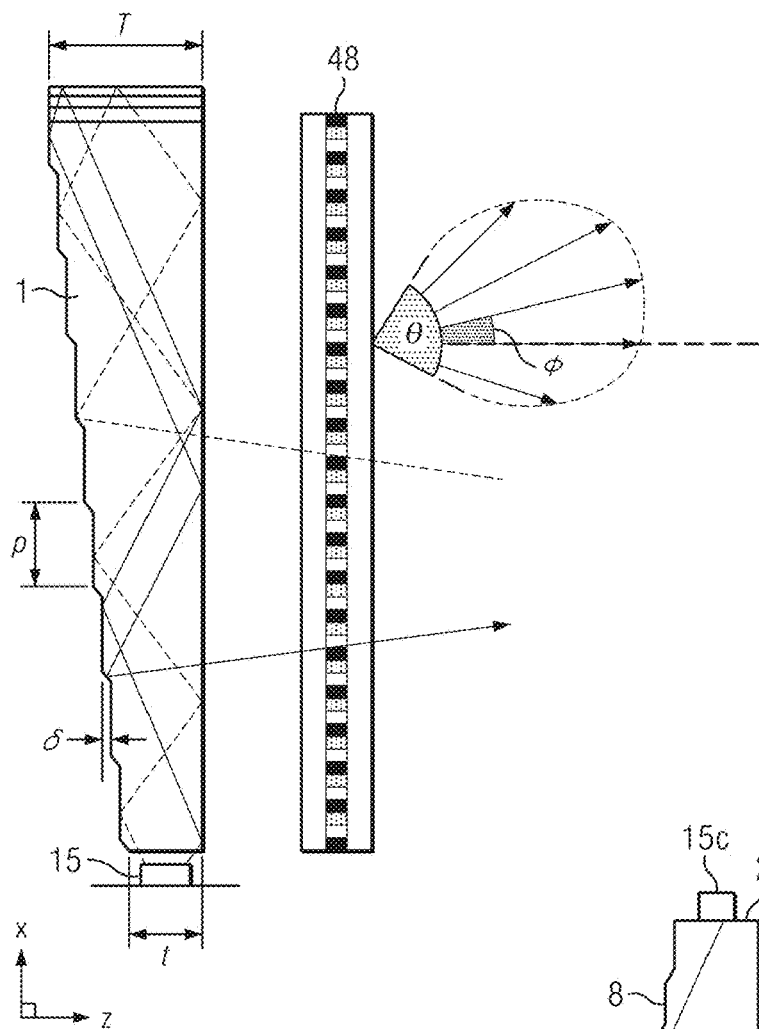
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
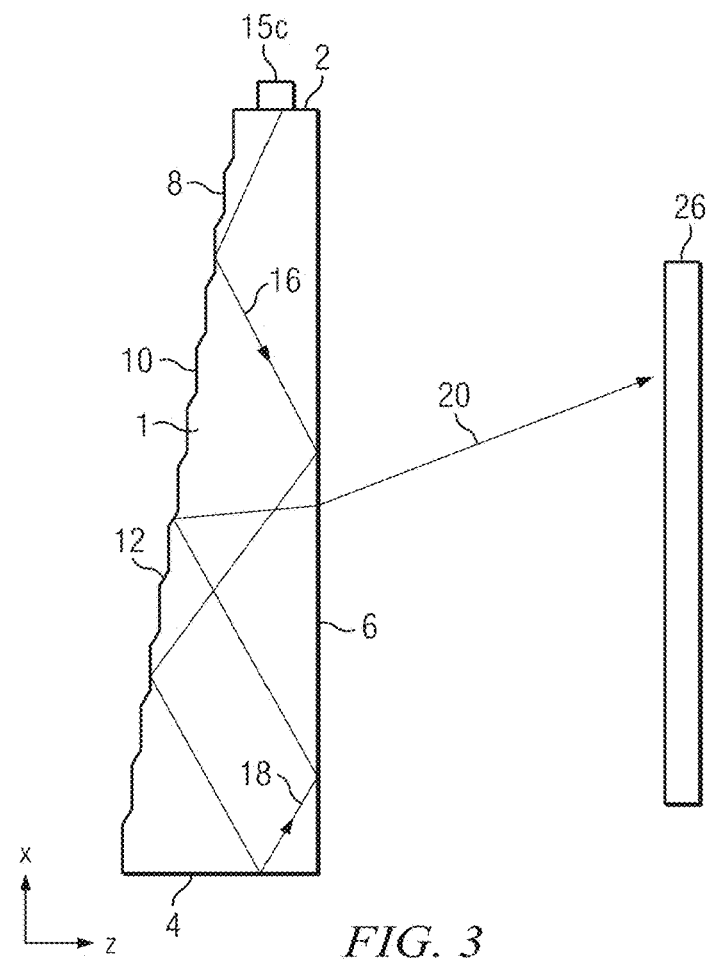
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
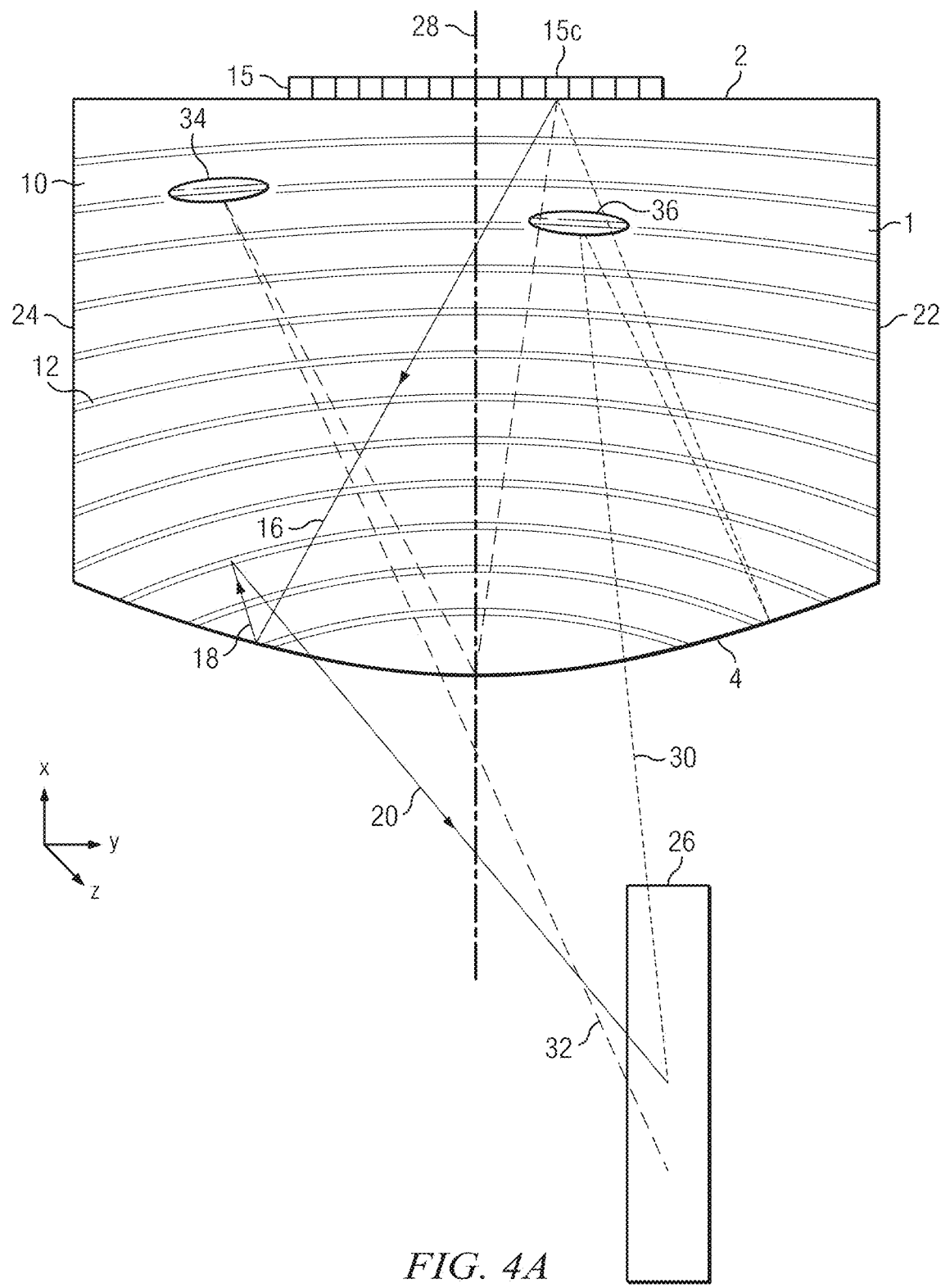
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
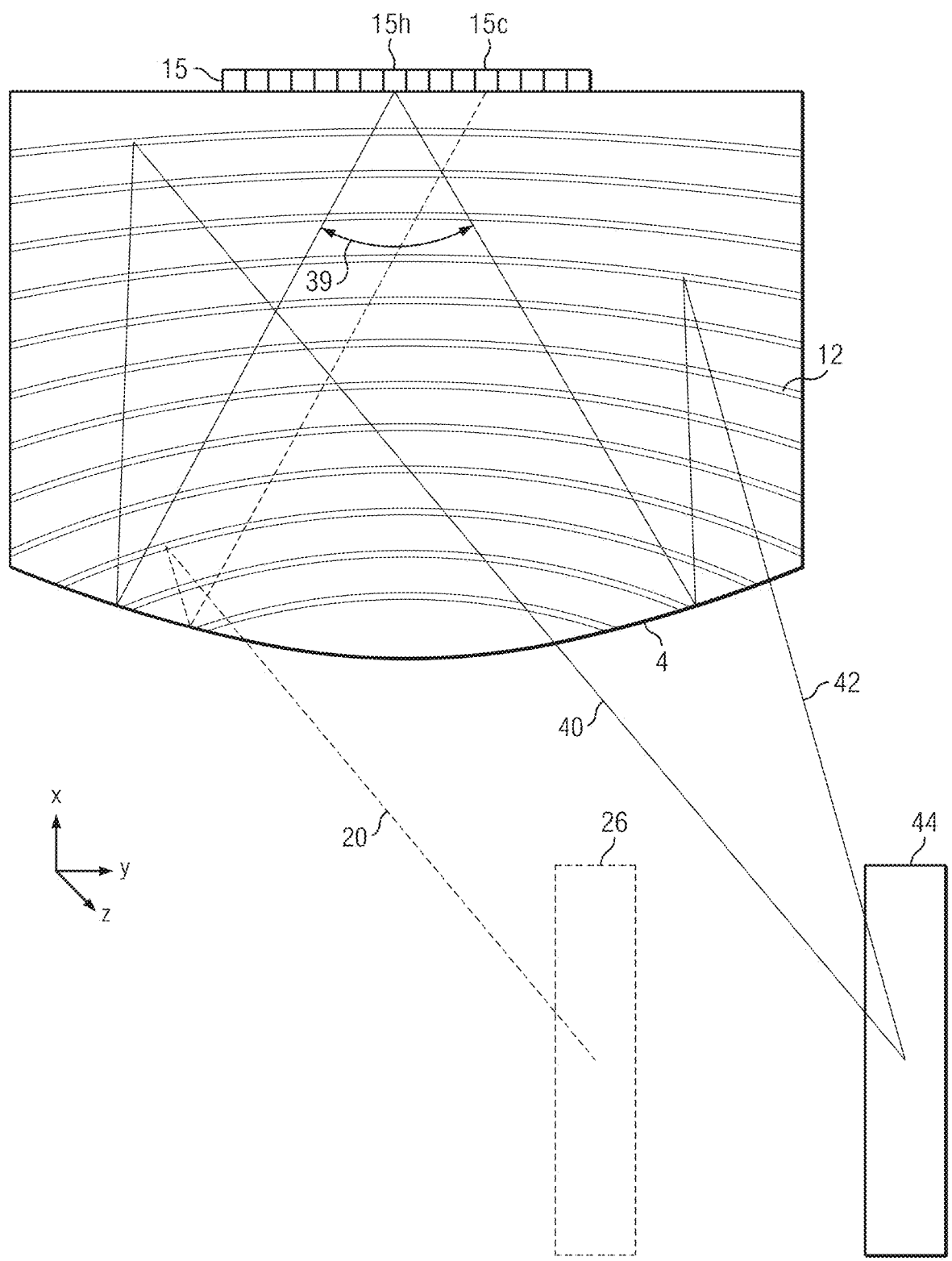
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may be illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
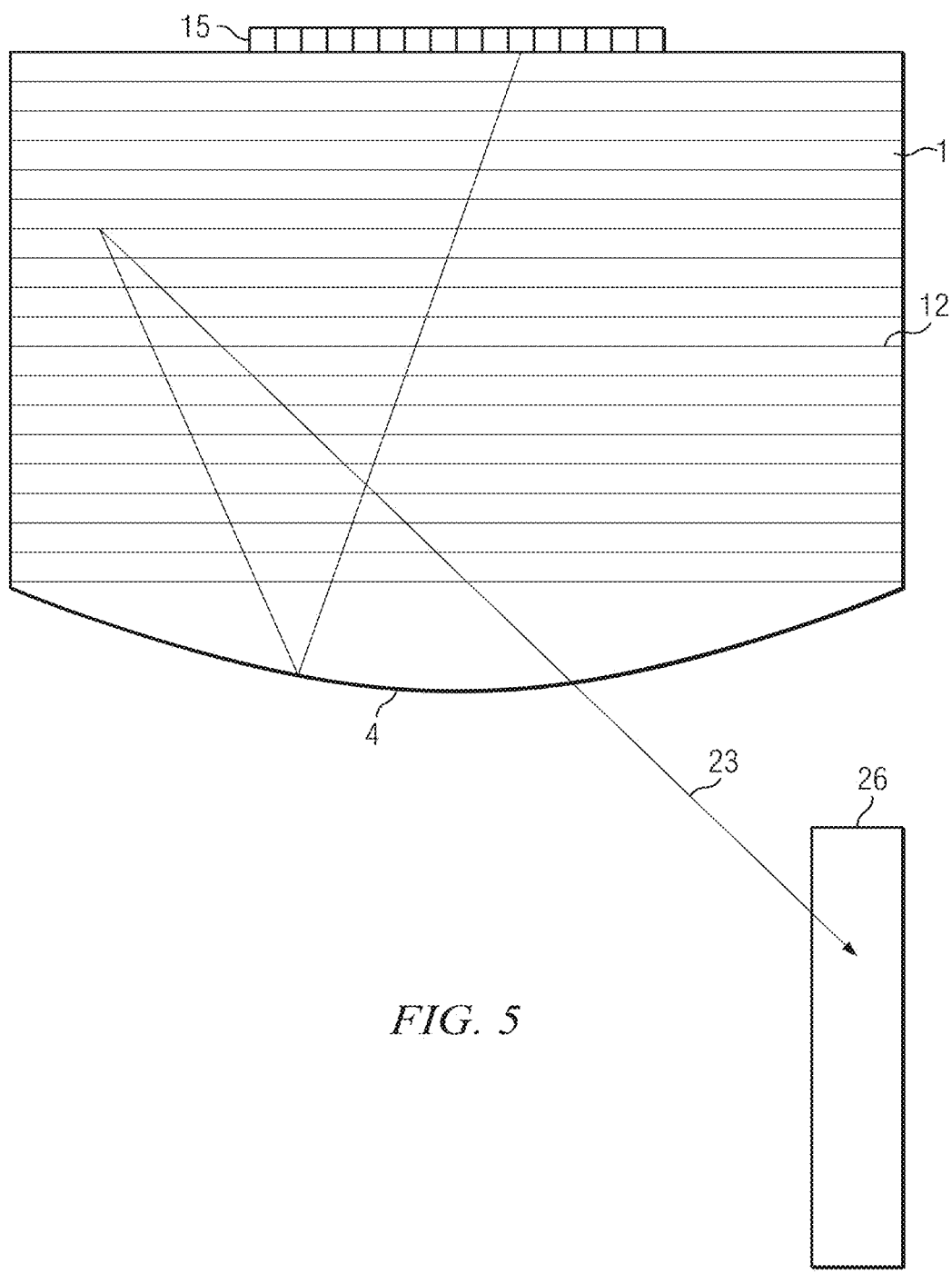
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
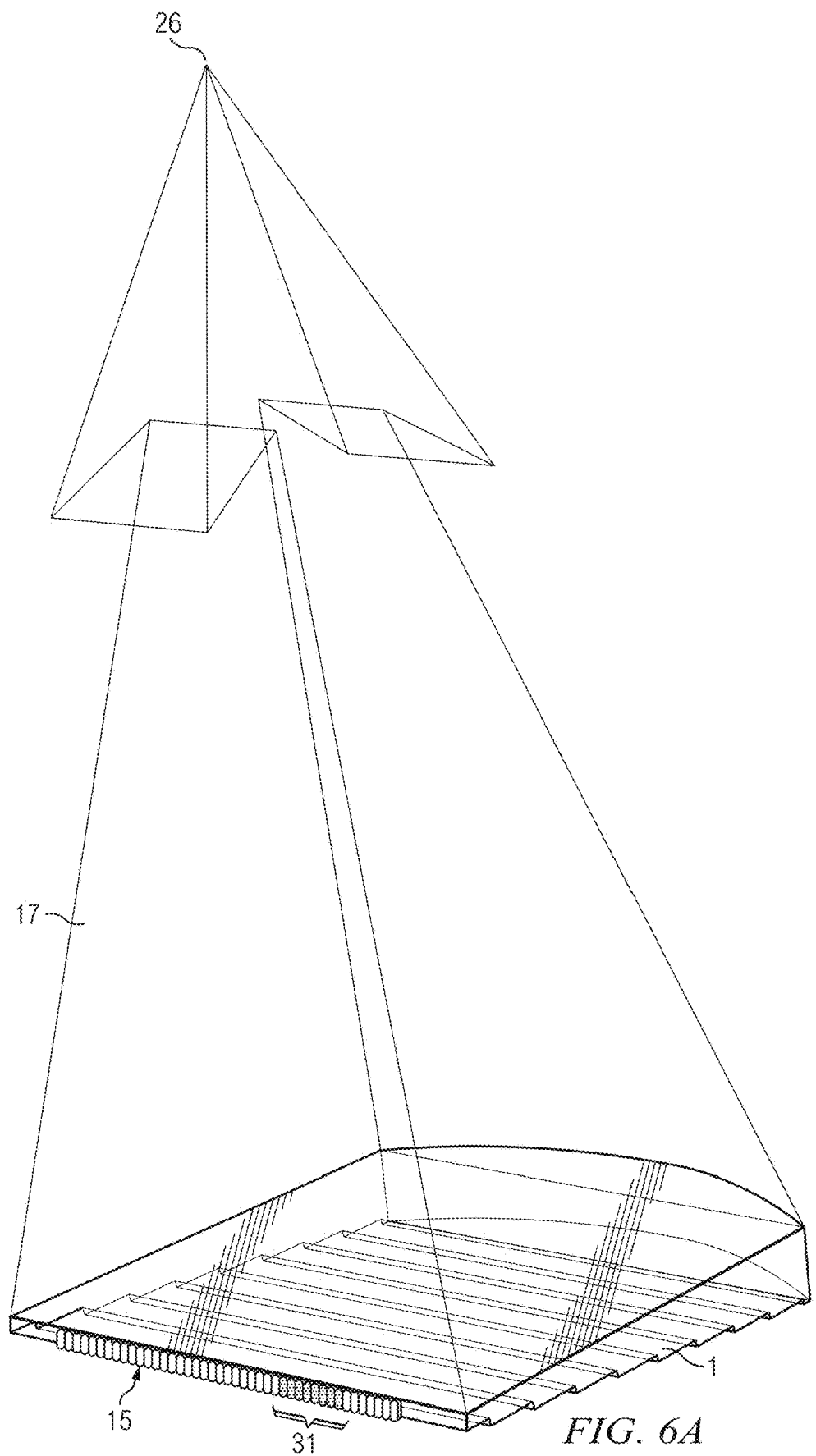
FIG. 6A is a schematic diagram illustrating one embodiment of the generation of a first viewing window in a time multiplexed directional display device in a first time slot, in accordance with the present disclosure.
Figure 6B:
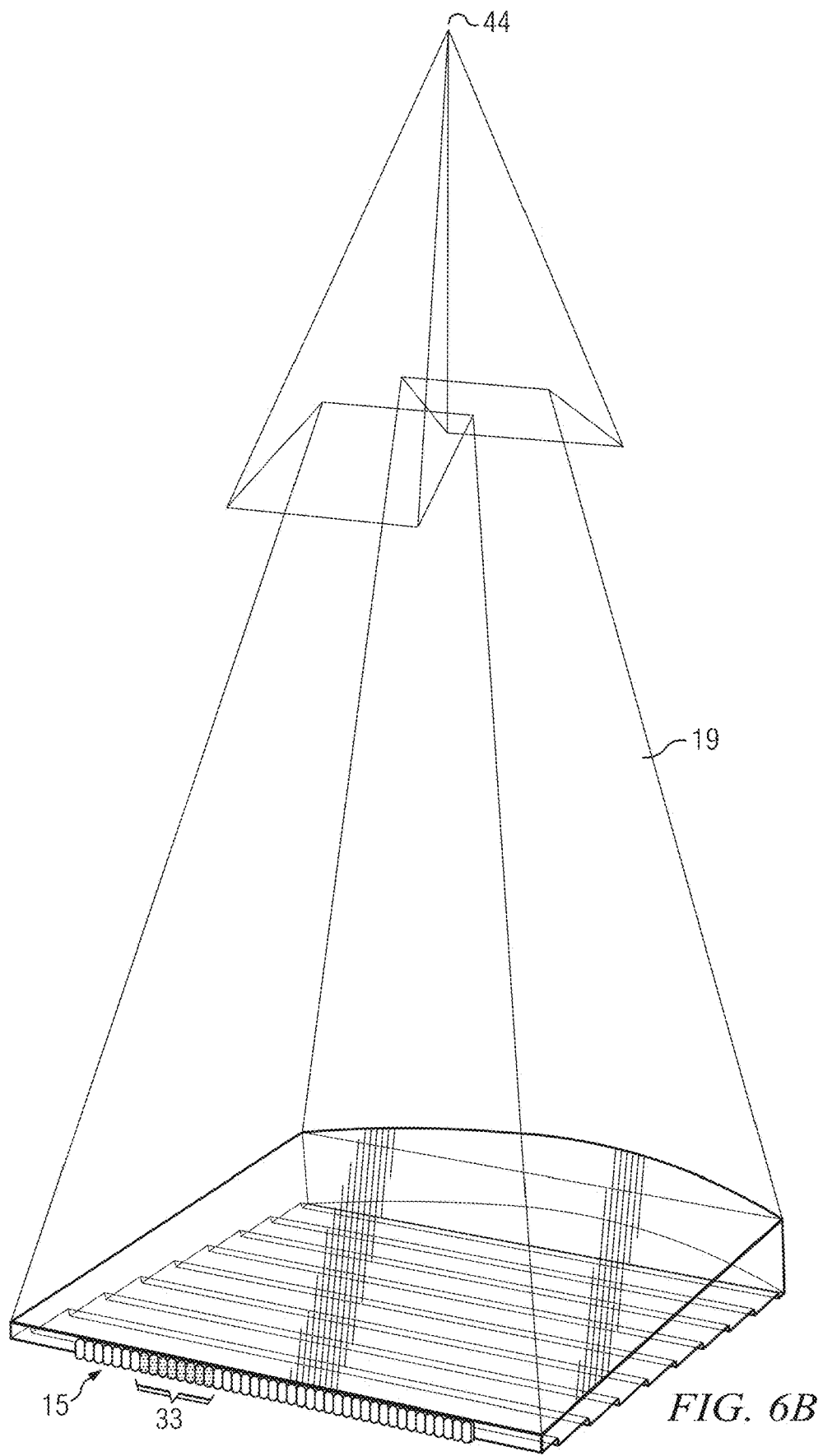
FIG. 6B is a schematic diagram illustrating another embodiment of the generation of a second viewing window in a time multiplexed directional display device in a second time slot, in accordance with the present disclosure.
Figure 6C:
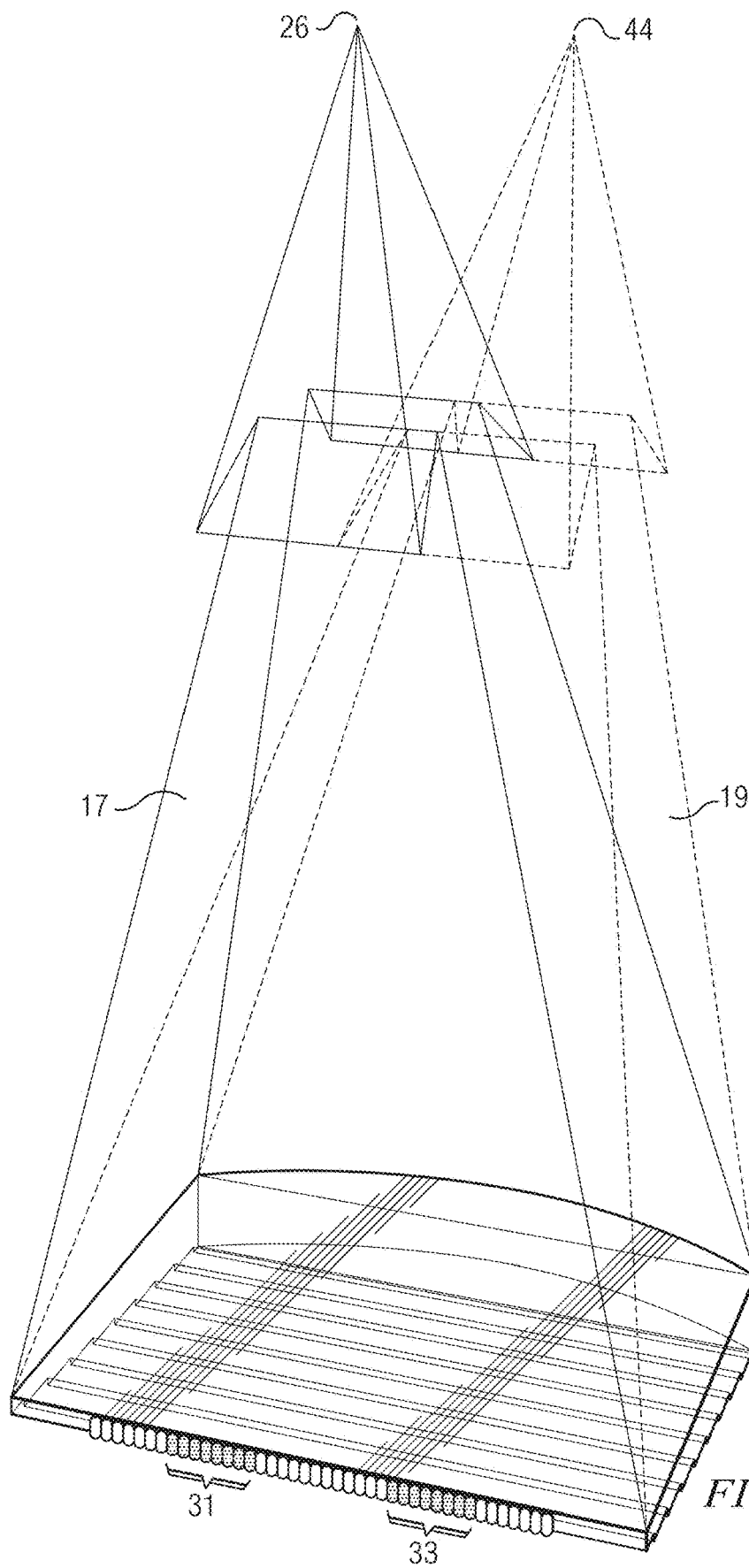
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
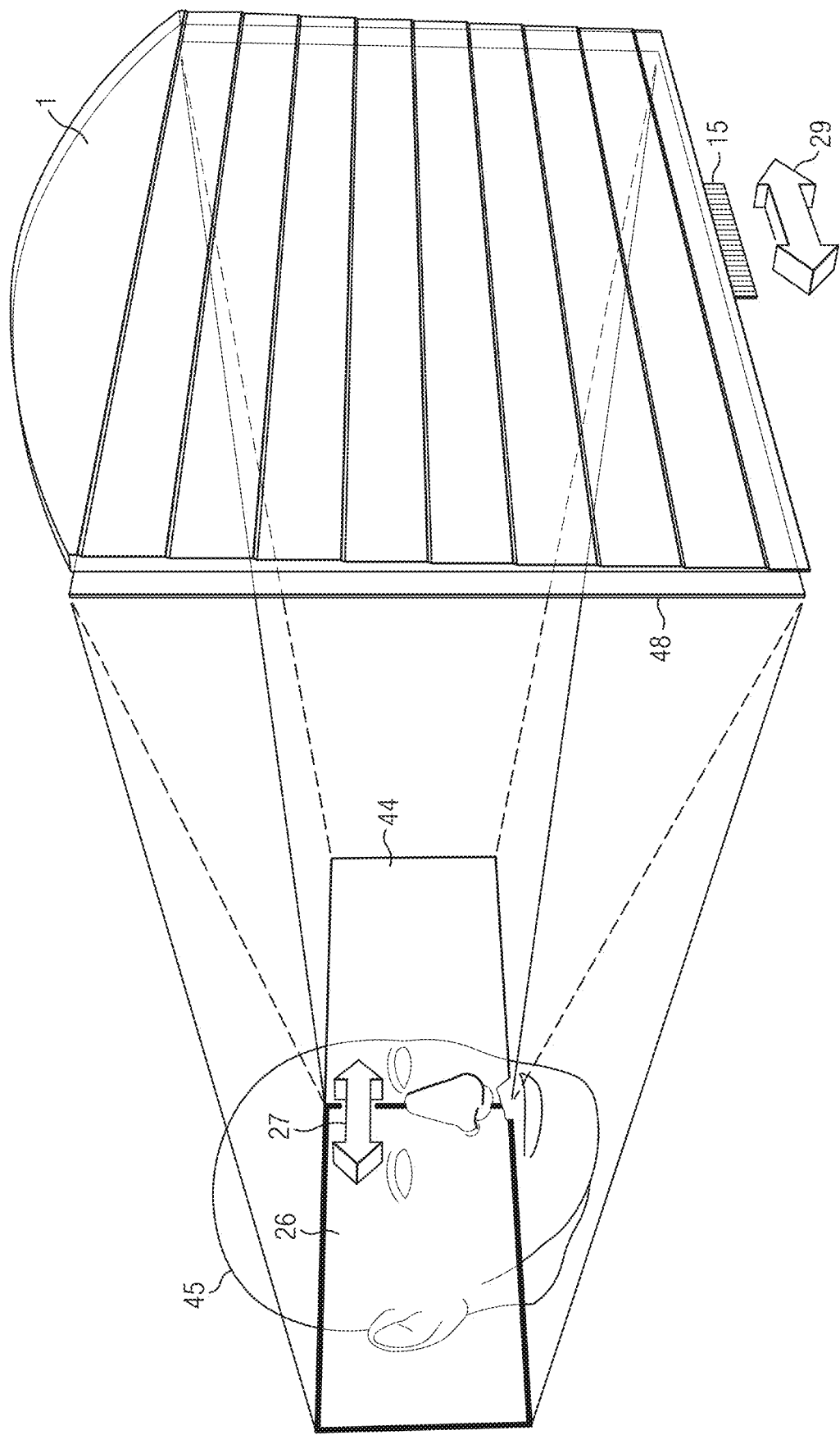
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
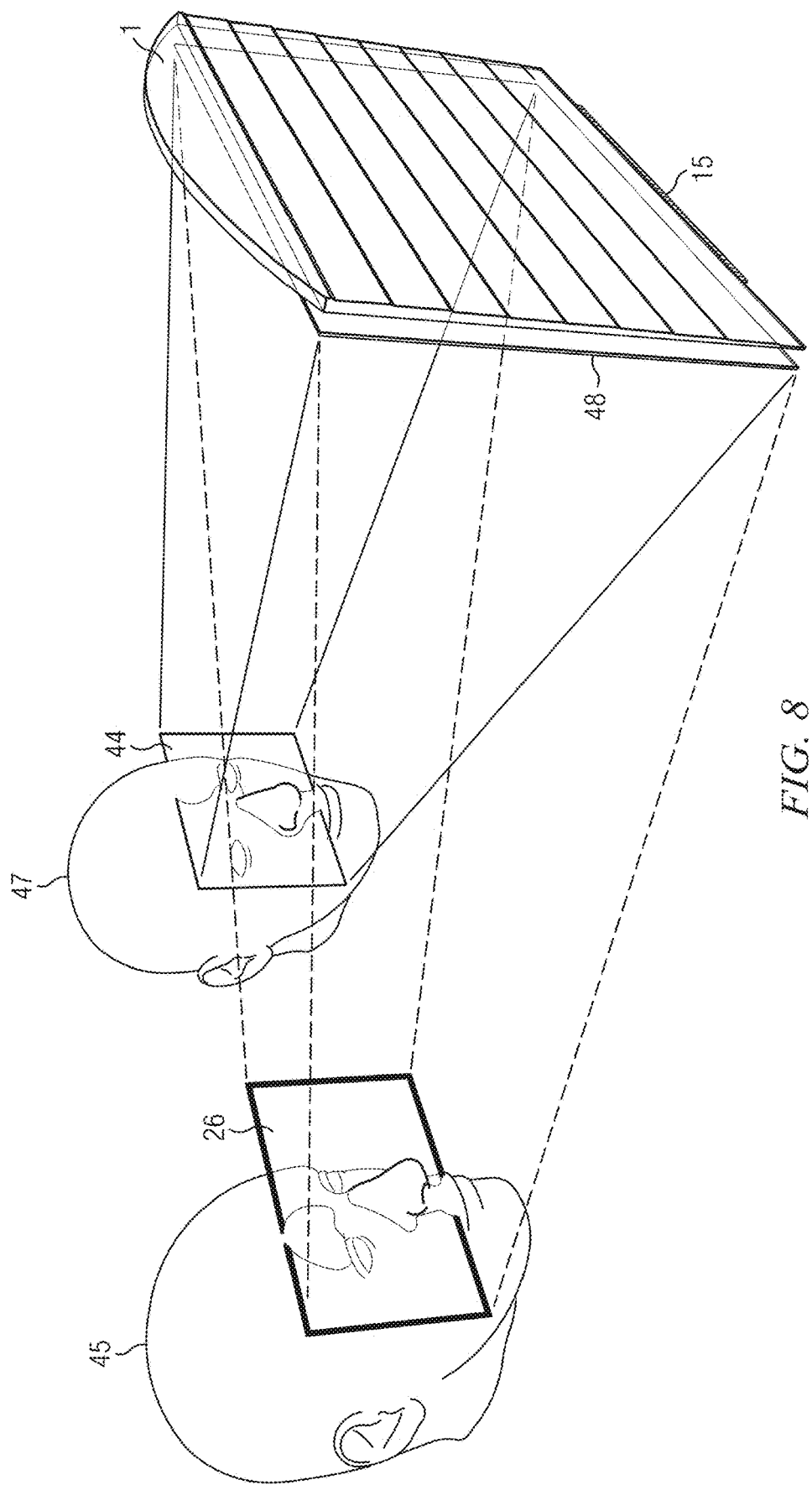
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
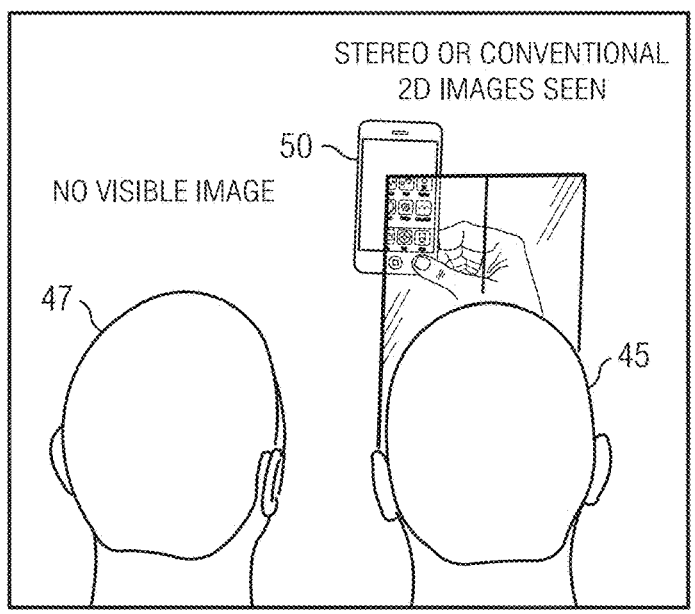
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
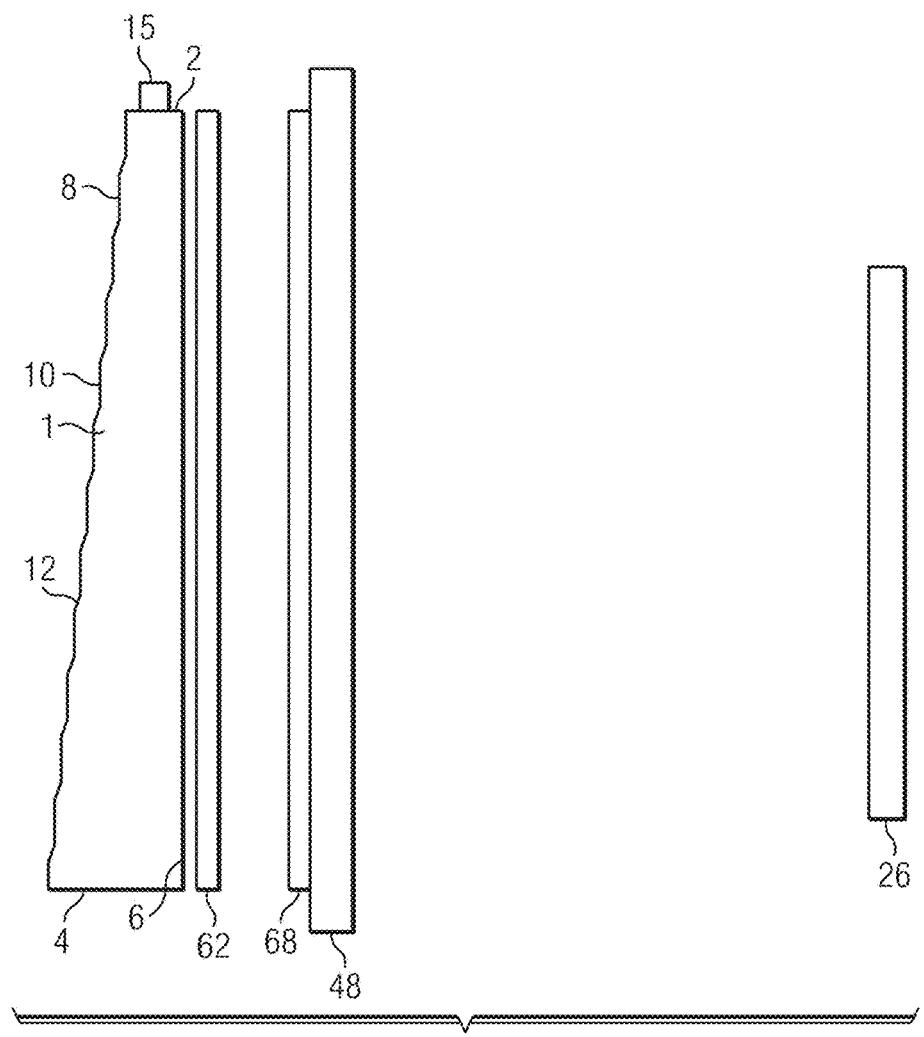
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
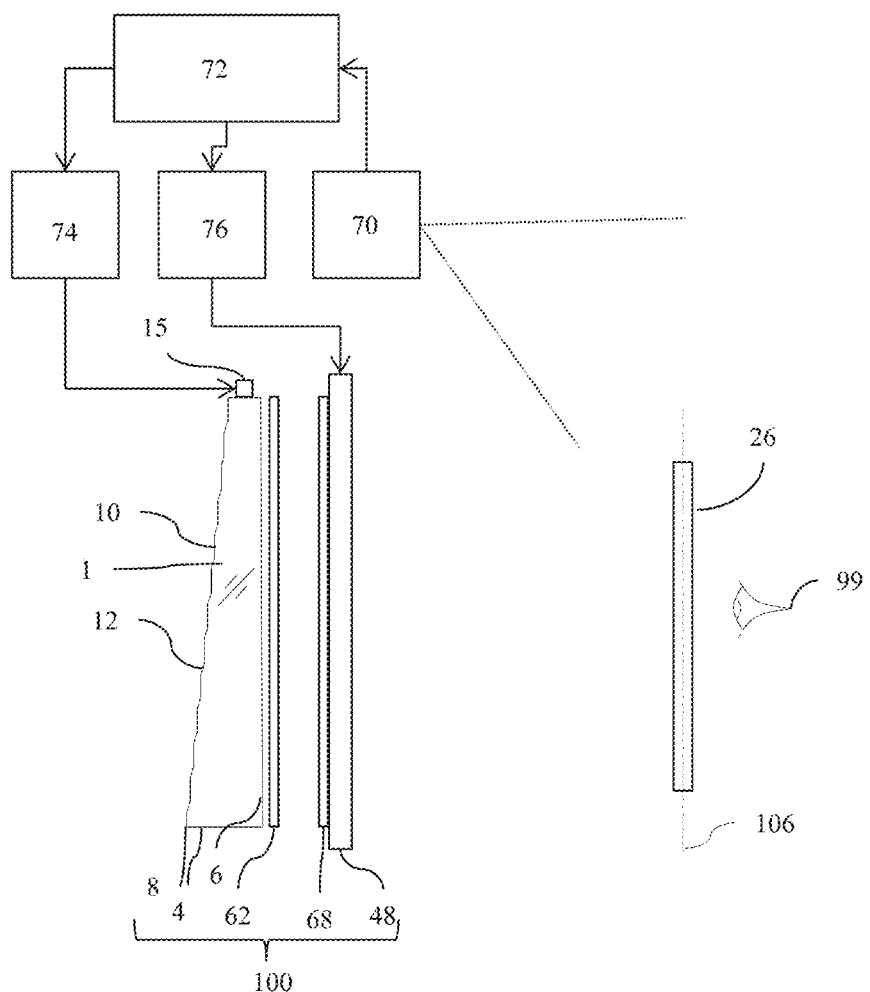
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12:
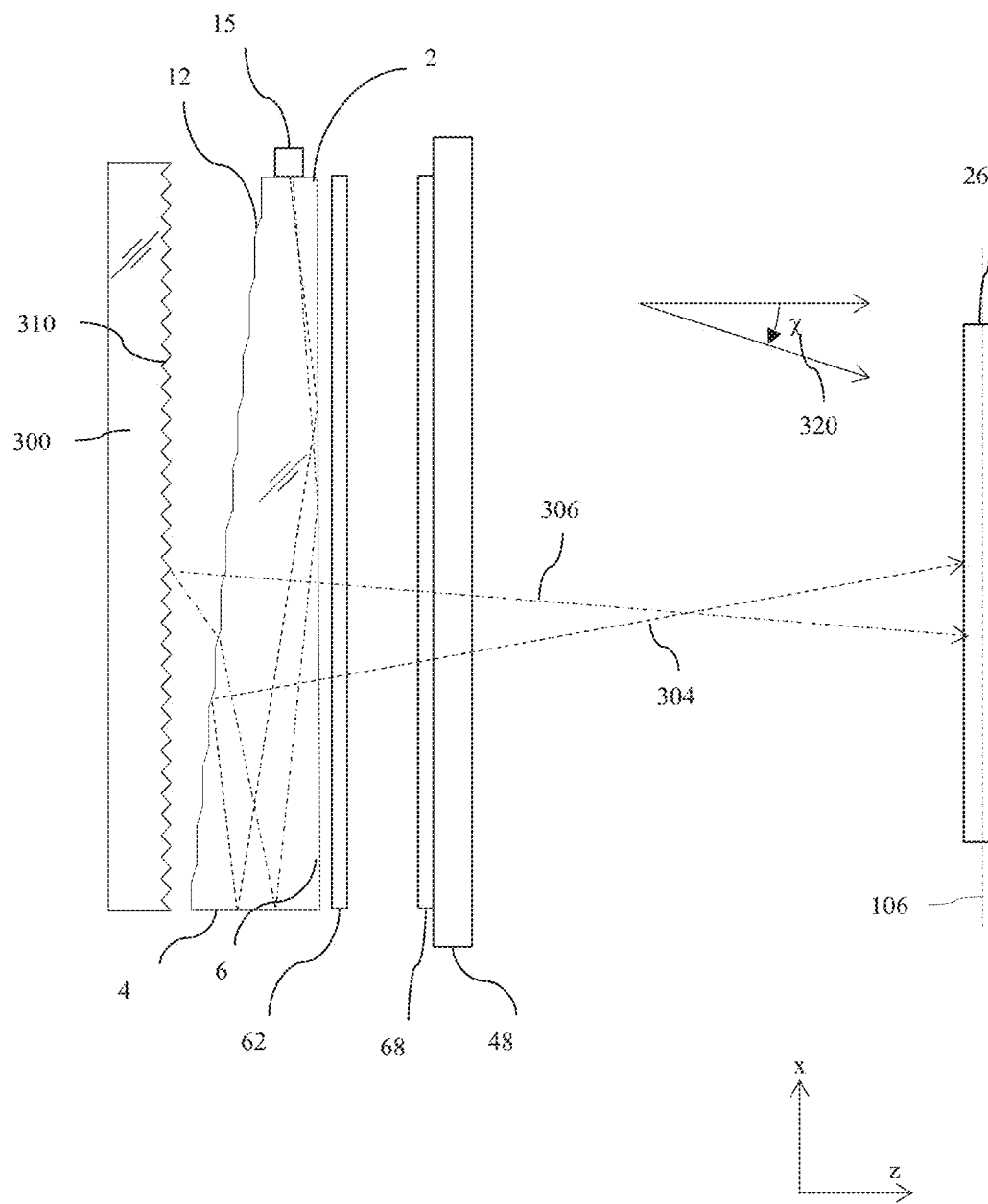
FIG. 12 is a schematic diagram illustrating in perspective view the formation of an optical window by a directional waveguide, in accordance with the present disclosure.

FIG. 12 is a schematic diagram illustrating a side view of a directional display device with a rear reflector 300. The directional display device may include a directional backlight and a transmissive spatial light modulator. The rear reflector 300 may include an array of reflective facets 310. The array is a linear array in that it repeats in a linear direction (e.g. vertically in FIG. 12). Light rays 304 that are reflected from light extraction features 12 of the waveguide 1 are directed to a vertical viewing position in the viewing window 26, with an angular distribution in the direction 320. In the absence of rear reflector 300, light rays 306 that are transmitted through the features 12 are lost to the system, or may interact with materials behind the display and scatter to produce undesirable cross talk between respective viewing windows.

In the present disclosure an optical window refers to the image of a single light source in the window plane. By way of comparison, a viewing window 26 is a region in the window plane 106 in which light is provided and which may include image data of substantially the same image from across the display area. Thus a viewing window may be formed from multiple optical windows. Typically the optical windows have a small lateral extent (y-axis direction) and a large extent in a vertical direction orthogonal to the lateral extent (x-axis direction).

In the present embodiment, light rays 306 that are transmitted through the features 12 are incident on the reflective facets of rear reflector 300. The light rays 306 are thus redirected towards the viewing window 26. For a given light source of the array 15, the lateral extent and position of the respective optical windows for rays 304, 306 is substantially the same; however the distribution of light in the vertical direction may be different for light ray bundles directed by reflection or transmission at features 12.

A directional backlight may thus include a waveguide and an array of light sources disposed at different input positions in a lateral direction across the input end of the waveguide. The waveguide may have an input end, may include first and second opposed guide surfaces for guiding light along the waveguide, and a reflective end facing the input end for reflecting the input light back through the waveguide. The first guide surface may be arranged to guide light by total internal reflection and the second guide surface may have a stepped shape which may include a plurality of facets oriented to reflect light from the light sources, after reflection from the reflective end, through the first guide surface into optical windows in output directions. The output directions may be distributed in a lateral direction to the normal to the first guide surface in dependence on the input positions, and intermediate regions between the facets that are arranged to direct light through the waveguide without extracting it. The directional backlight may also include a rear reflector which may include a linear array of reflective facets arranged to reflect light from the light sources that is transmitted through the plurality of facets of the waveguide, back through the waveguide to exit through the first guide surface into the optical windows.

A directional display device may thus also include a directional backlight and a transmissive spatial light modulator arranged to receive the output light from the first guide surface. A display apparatus may thus also include a directional display device, and a control system arranged to selectively operate the light sources to direct light into viewing windows corresponding to the output directions. The display apparatus may be an autostereoscopic display apparatus in which the control system is further arranged to control the display device to display temporally multiplexed left and right images and synchronously to direct the displayed images into viewing windows in positions corresponding to left and right eyes of an observer. The control system may further include a sensor system arranged to detect the position of an observer across the display device. The control system may be arranged to direct the displayed images into viewing windows in positions corresponding to left and right eyes of an observer, in dependence on the detected position of the observer.

Advantageously, the optical windows and viewing windows 26 achieved by the rays 304, 306 may substantially overlap in the lateral direction. Thus the cross talk of the display may be substantially maintained. Further the total intensity of light rays directed to viewing window 26 may be increased and the display brightness may be increased. The battery lifetime of a mobile display device may be increased, and the cost and number of light sources may be reduced for a desired brightness level. Further cross talk from unwanted transmitted light through features 12 is reduced or eliminated. Further, the reflector 300 may be formed in a thin film that may be mounted in the case of a display system, thus minimizing cost and thickness. Alternatively the structure of the reflector 300 may be formed on a rear case of the backlight, for example by molding the structure of the reflector 300 as part of the display case and then coating with a metallization layer. Advantageously this may provide a stiff and flat structure, achieving high window quality for the viewing windows 26 that are reflected from the reflector 300.

Figure 13:
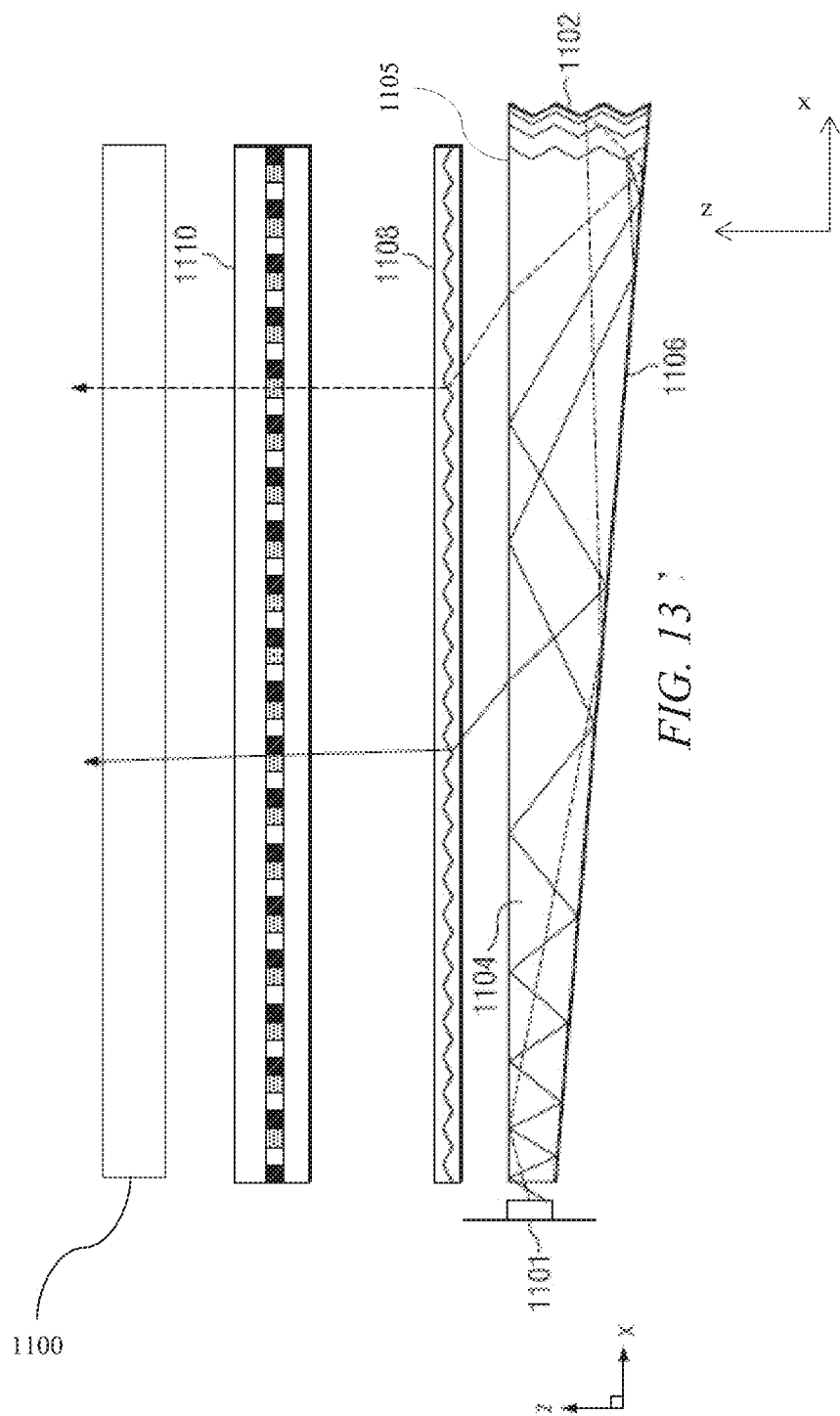
FIG. 13 is a schematic diagram illustrating in side view, a directional display comprising an optical wedge, in accordance with the present disclosure.

FIG. 13 is a schematic diagram illustrating in side view, the structure of a directional display device comprising a wedge directional backlight comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 8. Further the directional display may comprise a spatial light modulator 1110 and parallax element 1100 aligned to the spatial light modulator 1110 that is further arranged to provide optical windows. A control system 72 similar to that shown in FIG. 11 may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 14:
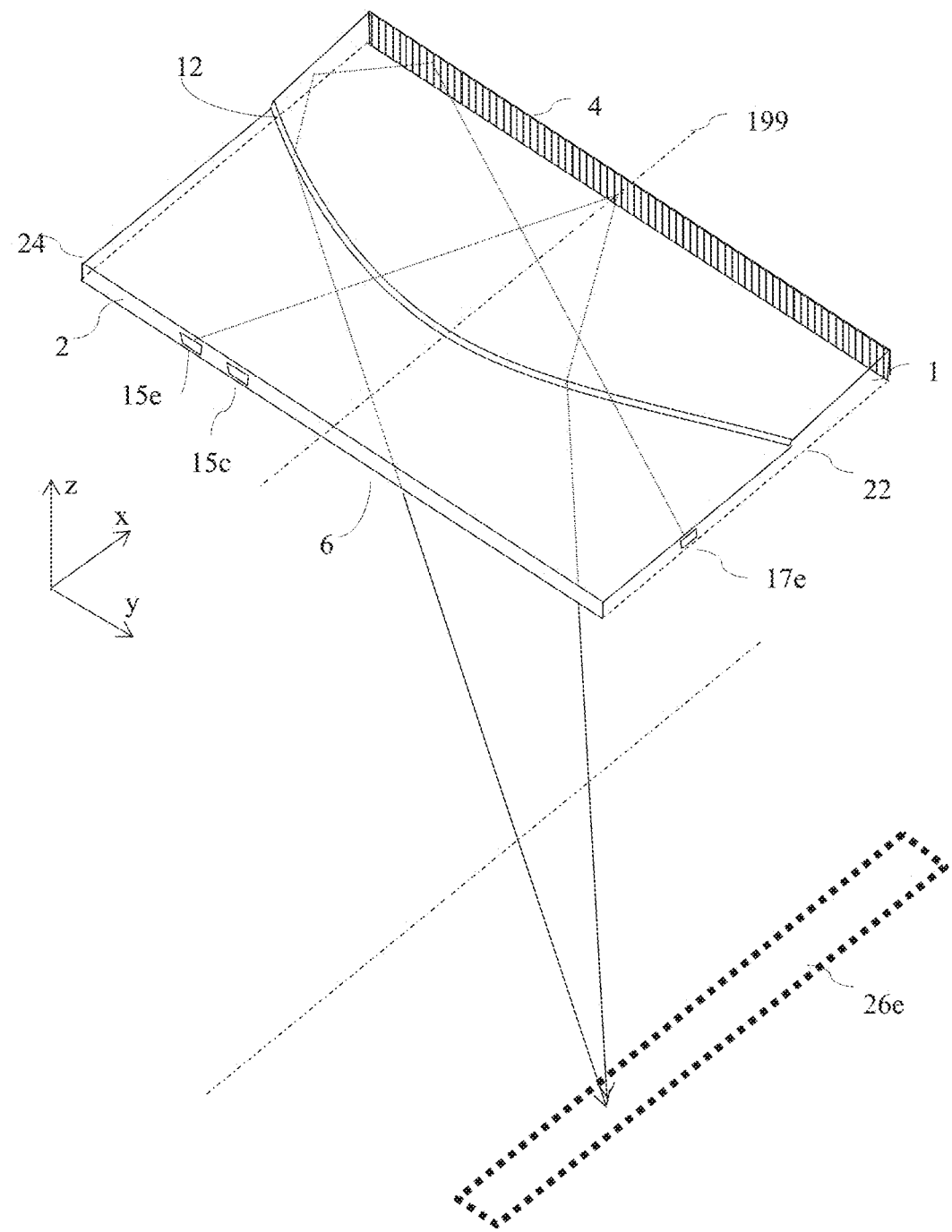
FIG. 14 is a schematic diagram illustrating in perspective view, the formation of an optical window by an optical valve, in accordance with the present disclosure.

FIG. 14 is a schematic diagram illustrating in perspective view, the formation of an optical window by an optical valve. Light source 15e may be arranged to provide optical window 26e after propagation in the waveguide 1. Light source 15e may be arranged to the right of the optical axis 199 when viewed from the position of the optical window 26e. Further light source 17e may also be arranged to substantially illuminate optical window 26e. Void correcting light source 17e is to the left of the optical axis 199 when viewed from the front. In practice, optical aberrations will create an overlap of optical windows 26a-n from sources 15a-n and sources 17a-n, 19a-n (on opposite side to 17a-n and not shown) that is not identical but similar. Illumination of multiple sources provides a final uniform illuminated waveguide with desirable angular and spatial uniformity characteristics.

Figure 15:
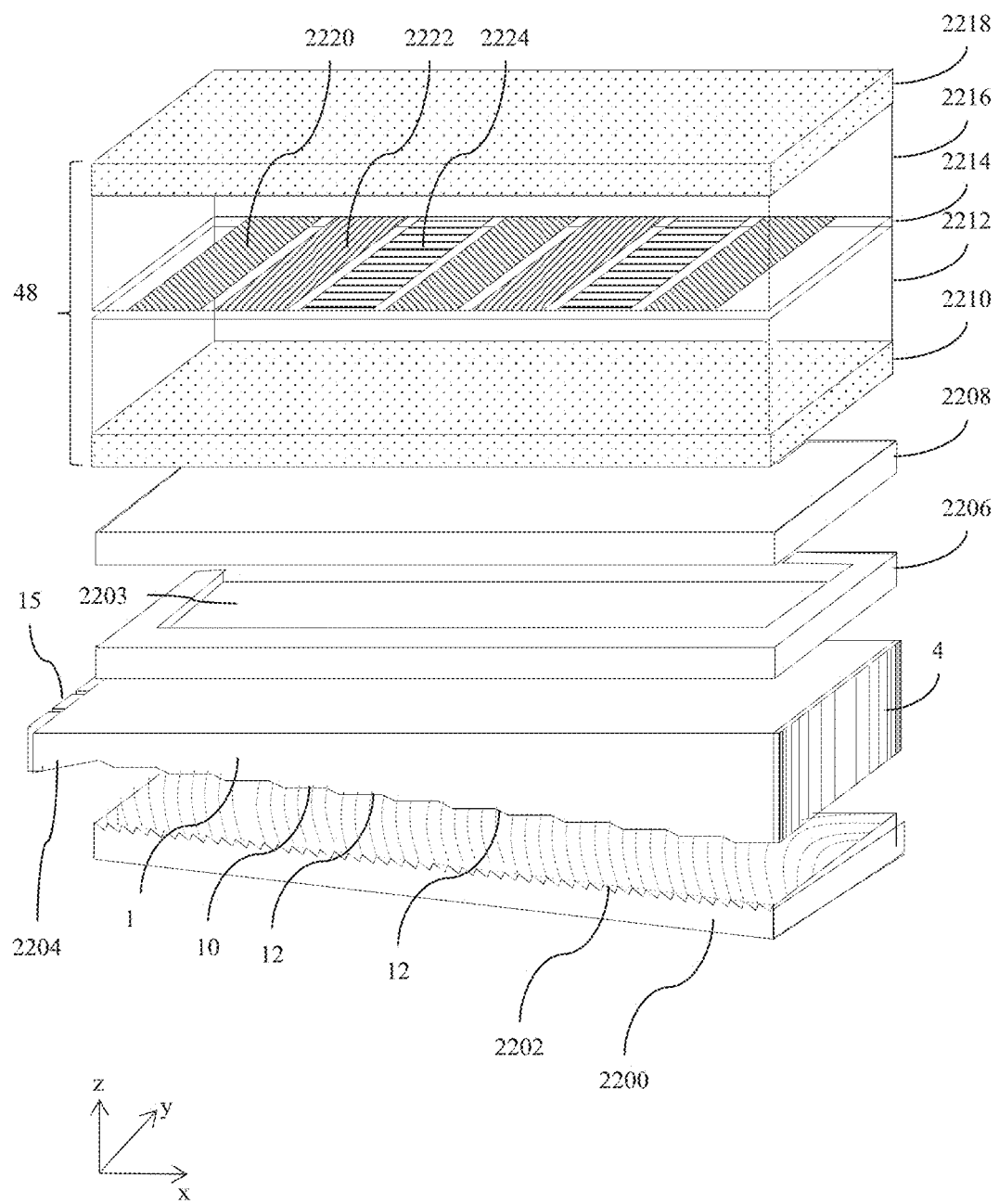
FIG. 15 is a schematic diagram illustrating in side view, a directional display comprising an optical valve, in accordance with the present disclosure.

FIG. 15 is a schematic diagram illustrating in side view, a directional display comprising a waveguide 1 arranged with a spatial light modulator 48. Reflective end 4 may be provided by a Fresnel mirror. Taper region 2204 may be arranged at the input to the waveguide 1 to increase input coupling efficiency from the light sources 15a-15n of the array of illuminator elements 15 and to increase illumination uniformity. Shading layer 2206 with aperture 2203 may be arranged to hide light scattering regions at the edge of the waveguide 1. Rear reflector 2200 may comprise facets 2202 that are curved and arranged to provide viewing windows 26 from groups of optical windows provided by imaging light sources of the array 15 to the window plane 106. Optical stack 2208 may comprise reflective polarizers, retarder layers and diffusers. Rear reflectors 2200 and optical stack 2208 are described further in U.S. patent application Ser. No. 14/186,862, filed Feb. 21, 2014, entitled "Directional backlight" (U.S. Patent Publ. No. 2014-0240828) incorporated herein by reference in its entirety.

Spatial light modulator 48 may comprise a liquid crystal display that may comprise an input polarizer 2210, TFT glass substrate 2212, liquid crystal layer 2214, color filter glass substrate 2216 and output polarizer 2218. Red pixels 2220, green pixels 2222 and blue pixels 2224 may be arranged in an array at the liquid crystal layer 2214. White, yellow, additional green or other color pixels (not shown) may be further arranged in the liquid crystal layer to increase transmission efficiency, color gamut or perceived image resolution.

In the embodiment of FIG. 15, injection of input light into the waveguide is along the long edge. The physical size of the LED packages of the array 15 and scatter from waveguide and other surfaces near the input end 2 limit the minimum bezel width that can be achieved. It would be desirable to reduce the width of the side bezel along the long edges of the waveguide.

Figure 16:
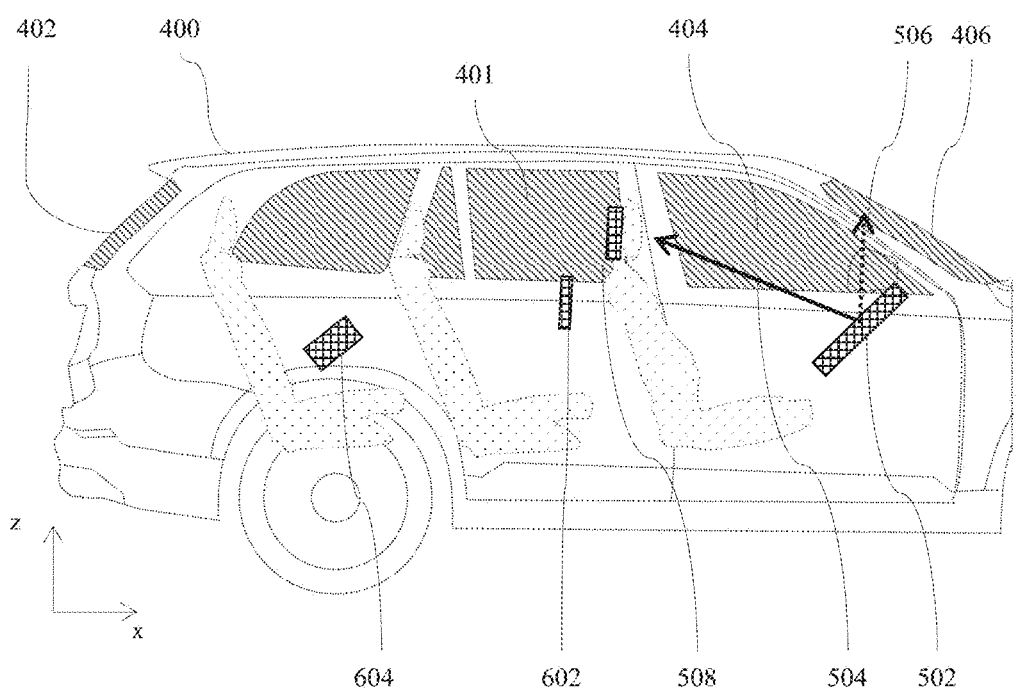
FIG. 16 is a schematic diagram illustrating in side view, the location of directional displays in a vehicle cabin, in accordance with the present disclosure.

FIG. 16 is a schematic diagram illustrating in side view, the location of displays in a vehicle cabin 401. Some displays such as 502 are mounted to or built-in to the vehicle 400. The output from such displays may be directed to the driver 504 but may also be visible in reflection 506 from the windshield 406. The cabin 401 may also contain seat back displays 508 and portable phones 602 or tablet devices 604 that are not fixed to the vehicle but are "co-located". With such displays in the vehicle 400, then the overall cabin 401 luminance and reflections from glass, for example 406, 404 and 402 can be both distracting for the driver at nighttime and the amount of blue and green light in the display output may impair the driver's night vision adaption, thereby reducing the safety of the vehicle operation.

In the following paragraphs the descriptions are made with respect to a passenger vehicle shown in FIG. 16; however this disclosure is not limited to such a vehicle and may apply to five-seat cars, two-seat cars, motorcycles, bicycles, trucks, buses, trains, boats, aircraft, and other vehicles without limitation.

Figure 17:
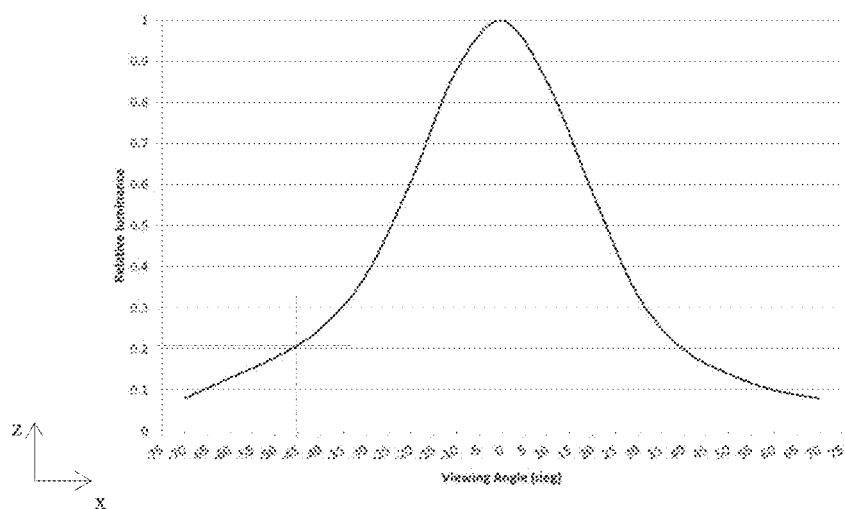
FIG. 17 is a schematic graph illustrating the luminance profile of a directional display in an axis orthogonal to the lateral direction, in accordance with the present disclosure.

FIG. 17 is a schematic graph illustrating the luminance profile of a directional display in an axis orthogonal to the lateral direction (i.e. vertical). From the curve shown it can be seen that the luminance at +/−45 degrees is about 20% of that at the peak brightness.

Figure 18:
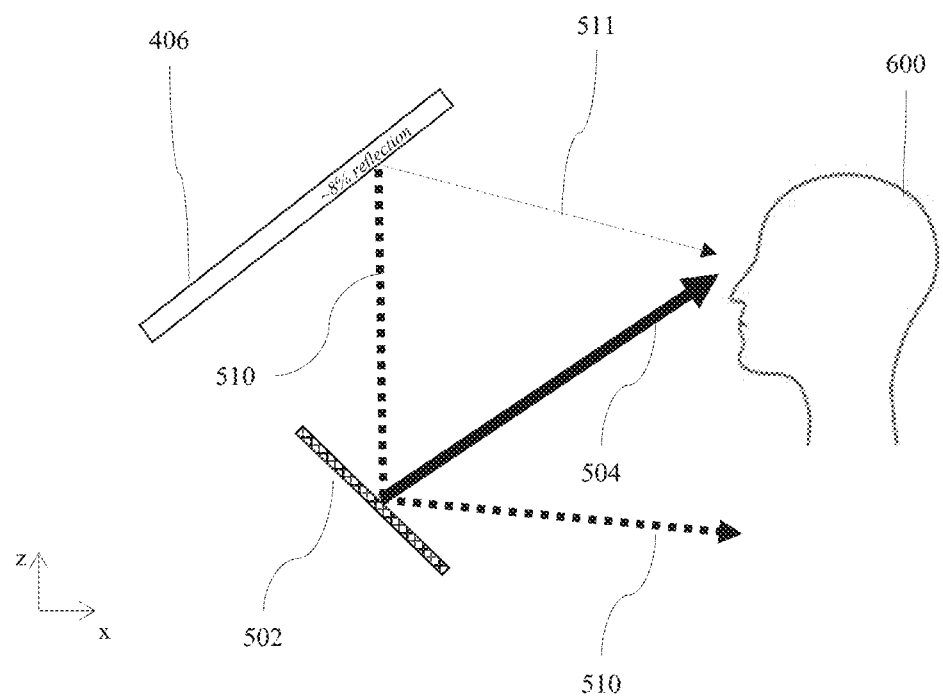
FIG. 18 is a schematic diagram illustrating in side view reflections of light from a display from the windscreen of a vehicle, in accordance with the present disclosure.

FIG. 18 is a schematic diagram illustrating in side view reflections of light from a display from the windscreen or windshield (both terms are used in this specification) of a vehicle. With a laminated windshield 406, the reflection of the light output at +/−45 degrees (510) may be about 8% so that for a display 502 with peak output in direction 504 of say 250 nits, then the light 511 reflected to the occupant 600 would be about 4 nits.

Figure 19A:
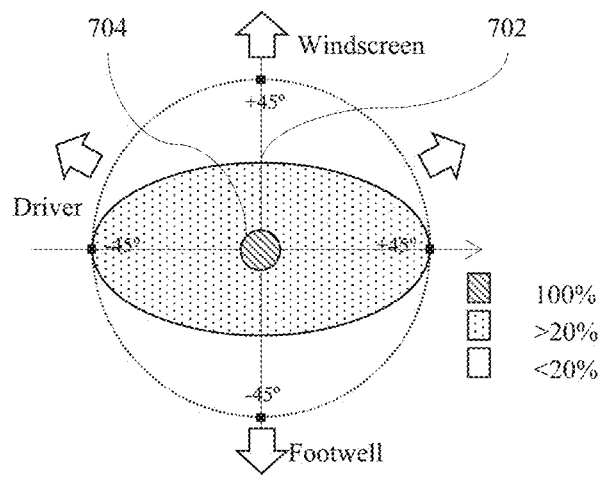
FIG. 19A and FIG. 19B are schematic graphs illustrating angular profiles of light from a directional display with respect to occupant and vehicle locations for portrait and landscape display orientations, in accordance with the present disclosure.
Figure 19B:
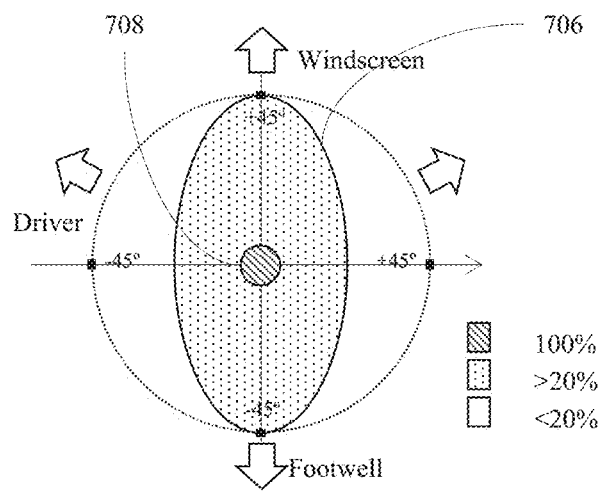

FIGS. 19A-B are schematic graphs illustrating angular profiles of light from a directional display with respect to occupants and vehicle windshield for portrait and landscape display orientations. FIG. 19A shows angular output light distribution of the directional display device in which the output light cone is controlled in the windshield direction so that in the region 702 indicated the angular space or angular cone of output light which is at 20% or more of the maximum output light 704. The angular spread in the horizontal direction may be further electronically and dynamically controlled (e.g., reduced) as explained in other figures of this specification.

Figure 20A:
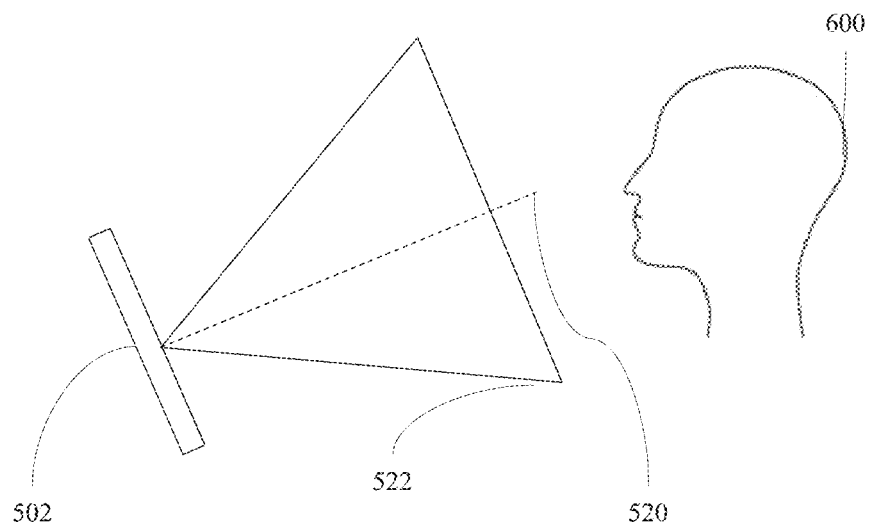
FIG. 20A, FIG. 20B, and FIG. 20C are schematic diagrams illustrating in side view angular output light distribution cones from a directional display towards an occupant, in accordance with the present disclosure.
Figure 20B:
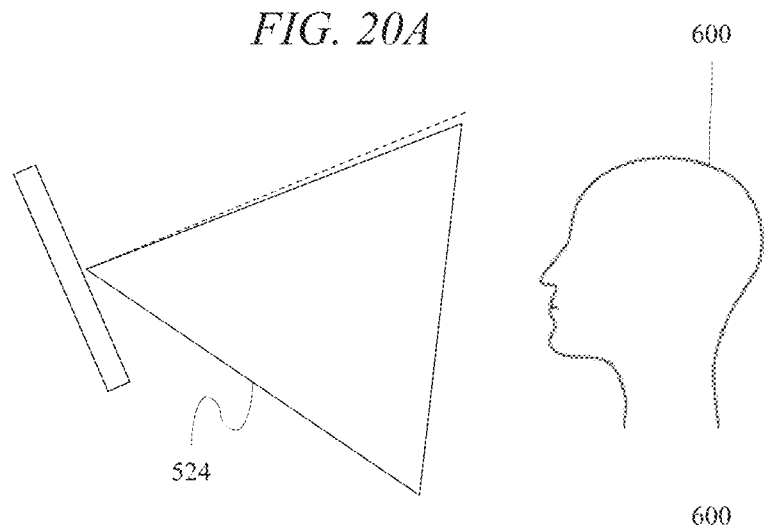
Figure 20C:
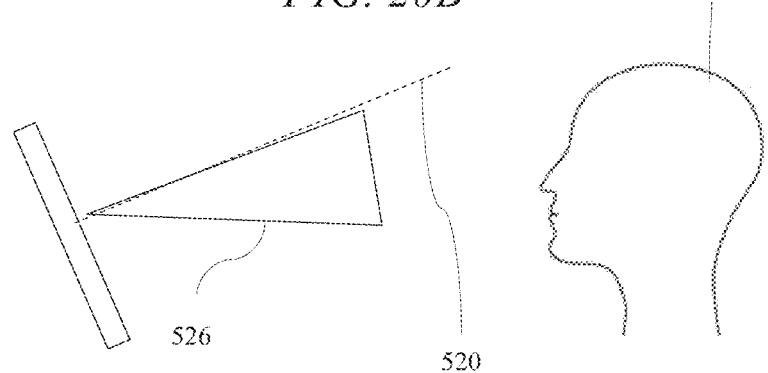

FIG. 19B differs from FIG. 19A in that an angular output light distribution region 706 is produced in which the output light is at or above 20% of the intensity of the peak light output 708. The angular spread in the vertical (windscreen-footwell axis) may be further controlled as explained in this specification FIGS. 20A-C are schematic diagrams illustrating in side view light cones from a directional display towards an occupant 600. For a conventional display 502 which may be an LCD, OLED or LED display, light may be emitted in the vertical direction as explained with reference to FIG. 17. In FIG. 20A the output from display 502 is shown for illustrative purposes as illumination cone 522 representing the light output within for example +/−45 degrees. The peak luminance is in direction 520 normal to the display 502 and directed to occupant 600.

Advantageously FIG. 20B shows how the vertical angular output light distribution cone 524 may be tilted down so that the occupant 600 still sees the display but the windshield (not shown) reflections are reduced.

FIG. 20C shows an illumination or angular output light distribution cone 526 that is both tilted down from the display normal 520 and narrowed.

Advantageously the narrow angular output light distribution cone maintains display visibility for the occupant 600 with reduced illumination of the footwell area and so may reduce the cabin background illumination, which helps avoid night time distractions and enables less power to be used by the display. Reducing the power of ancillary devices such as displays contributes to less demand on the vehicle alternator, increasing fuel efficiency, or for electric vehicles, extending the vehicle range.

Figure 21A:
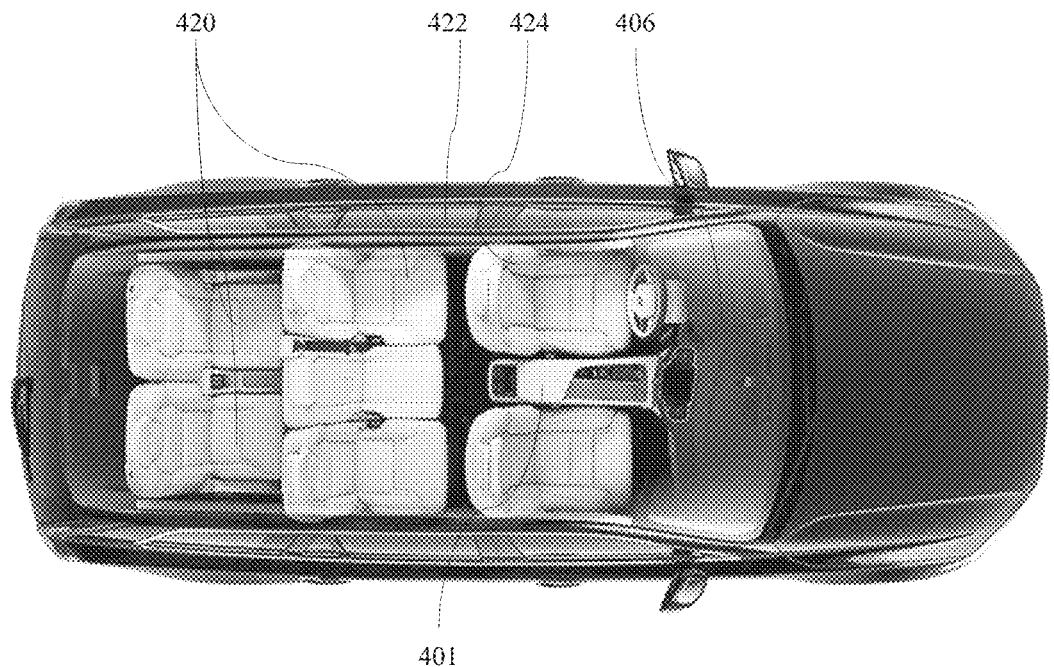
FIG. 21A and FIG. 21B are schematic diagrams illustrating in top view an automotive cabin, in accordance with the present disclosure.
Figure 21B:
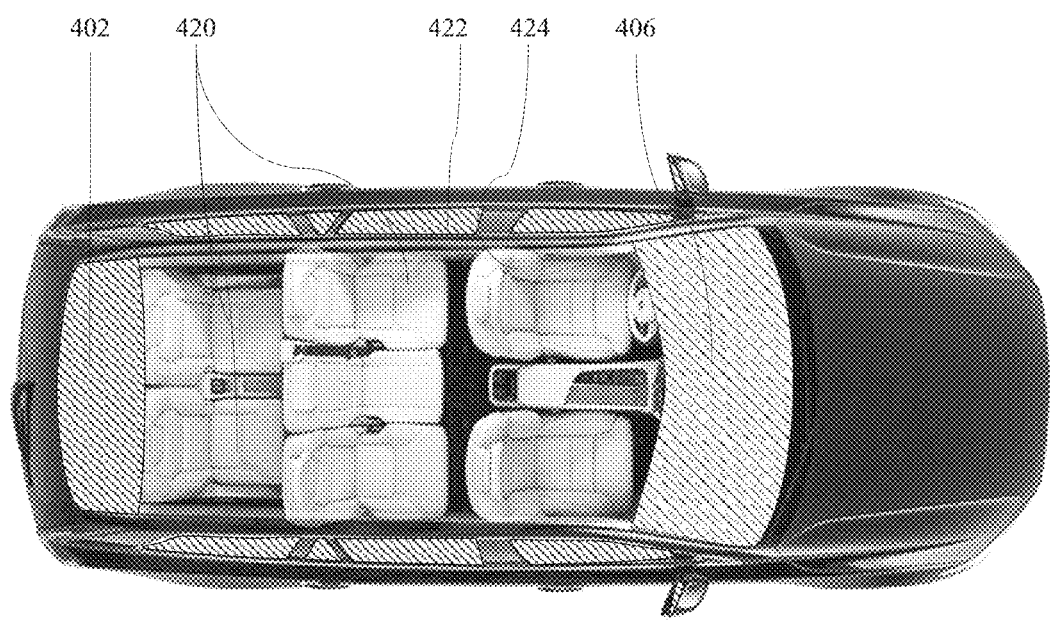

FIGS. 21A-B are schematic diagrams illustrating in top view a typical vehicle cabin 401. The cabin 401 may contain displays mounted to the vehicle such as the Driver Information Display (DID) or instrument cluster display (not labelled) for primary use of the driver in seat 424. The cabin 401 may also contain portable personal devices such as phones, tablets or video players used by passengers for example in seats 420. All of these display have the potential to produce unwanted and distracting reflections in vehicle glass shown hatched in FIG. 21B, for example 406, 402 and 422

Figure 22A:
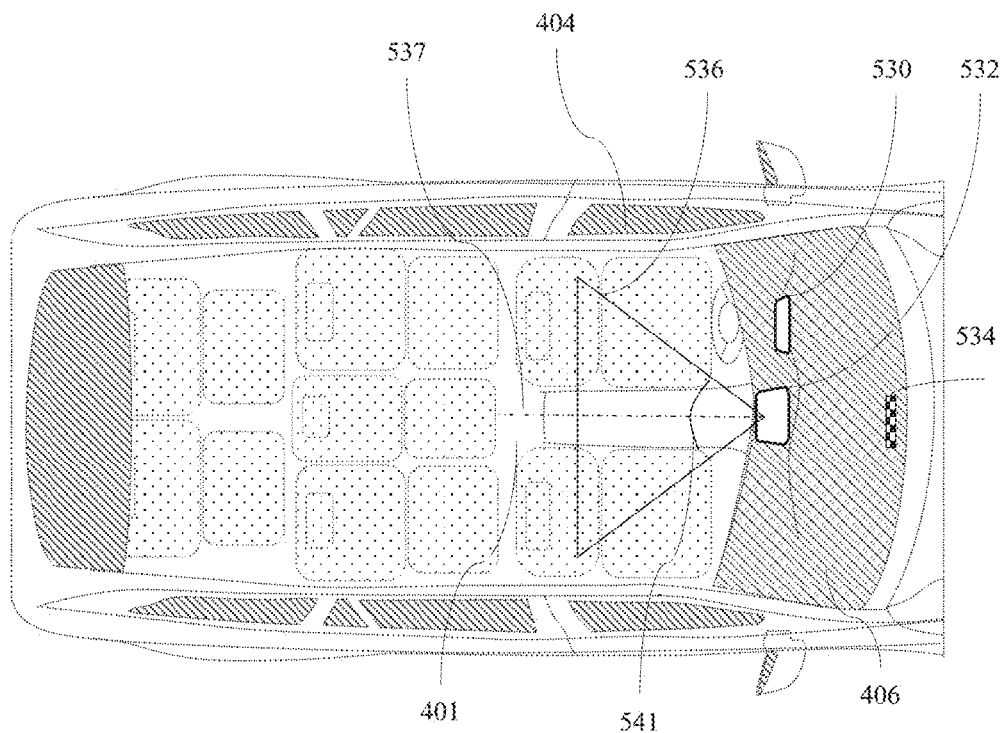
FIG. 22A and FIG. 22B are schematic diagrams illustrating in top view an automotive cabin and respective angular output light distributions from a center console directional display in a first and second modes of operation, in accordance with the present disclosure.
Figure 22B:
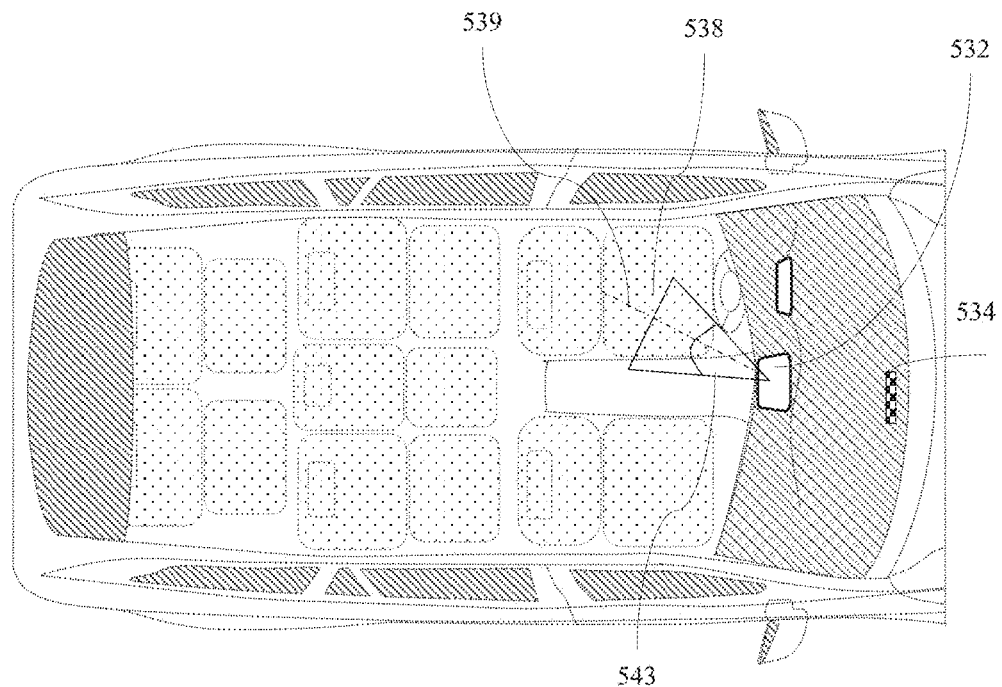

FIGS. 22A-B are schematic diagrams illustrating in top view of a typical vehicle cabin 401 and respective angular output light distributions 536, 538 from a center stack directional display 532 in a first and second modes of operation.

Automotive displays may differ from conventional mobile display applications in that they can be expected to provide clear readability for both very high illuminance conditions for example in bright sunlight and very low illuminance conditions such as at night time. In daytime operation it would be desirable to increase display luminance without substantially increasing display power consumption. For night time operation, light that is not directed to occupants' eyes can degrade the outside vision of the driver by means of (i) reflections of the display surface from windscreens and (ii) reflection from non-specular surfaces in the vehicle that provide a background illumination that may compete with externally illuminated objects, thus degrading driver night vision. The trend to fit both more and larger displays to vehicles coupled with the reduction in windshield angles (to improve aerodynamic efficiency) may all contribute to degraded driver outside vision.

It would be desirable to provide a reduction in reflections from specular surfaces such as glass surfaces including windows 404 and windshield 406 for light from displays such as a Center Stack Display (CSD), 532 which is built-in or mounted to the vehicle. In particular it would be desirable to enable increase the size of CSD 532 while achieving low visibility of specular reflections such as from glass surfaces.

In a first mode of operation, center stack display 532 may be arranged to provide angular output light distribution 536 with angular width illustrated as cone angular size 541 in direction 537 normal to the display 532. For illustrative convenience the angular output light distributions such as 536 and 538 are used to show the extent of the angular illuminance output of displays (in this case CSD 532) at reference angles 541, 543 at which the display angular output drops to, for example, 20% of the peak illuminance output. The length of the angular output light distribution cones 536, 538 represent the relative peak illuminance of display 532. In FIG. 22A, the angular output light distribution 536 is configured such that the display can conveniently be seen by driver, passenger and other occupants (not shown). In a second mode of operation as illustrated in FIG. 22B, such as for use in environments with low ambient lighting levels, angular output light distribution 538 may be provided with direction 539, reduced cone angular size 543 and reduced illuminance. As illustrated, angular output light distribution 538 has a smaller length indicating lower display illuminance.

The display 532 may be switched automatically between first and second modes by means of signals from controller 534 which may also receive signals from vehicle sensors such as ambient light sensors and GPS position sensors and time clocks. Switching between modes may also be done under manual control.

Advantageously the total illuminance of the cabin including from specular surfaces such as glass windows 404, 406 and non-specular surfaces such as seats and headlining is reduced.

Advantageously the display power consumption may be reduced, increasing vehicle efficiency. Advantageously the reflection from glass areas of cabin 401 may be reduced.

Figure 23:
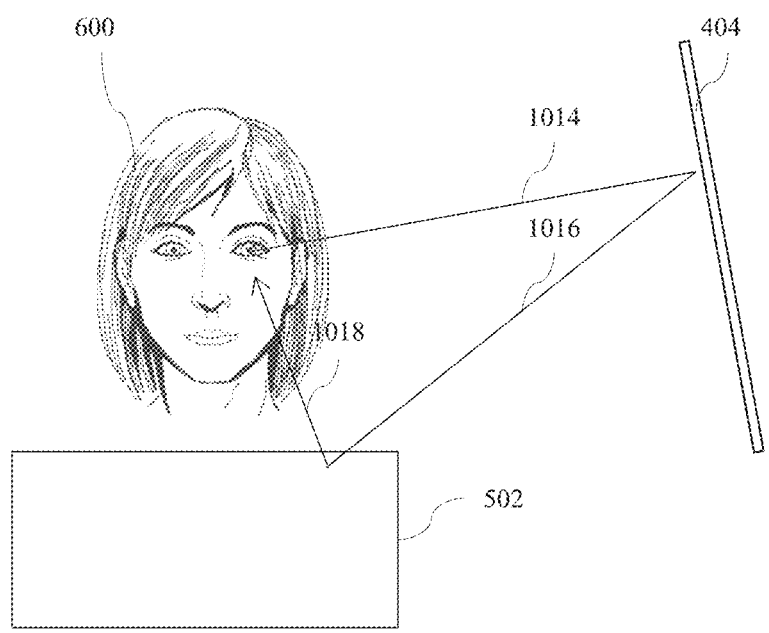
FIG. 23 is a schematic diagram illustrating in front view an automotive cabin and respective angular output light distributions from a directional display and side window, in accordance with the present disclosure.

FIG. 23 is a schematic diagram illustrating in front view part of an automotive cabin. Light from display 502 may reach the occupant 600 both directly via path 1018 or may also reach the occupant 600 by reflection off side window glass 404 following path 1016, 1014.

It would be desirable to reduce distracting reflections at side glass 404. Advantageously a directional display as described herein which can alter the angular output angle can reduce side window reflections. Such a display may also adjust intensity and the image contrast of the images to reduce distracting reflections.

Figure 24A:
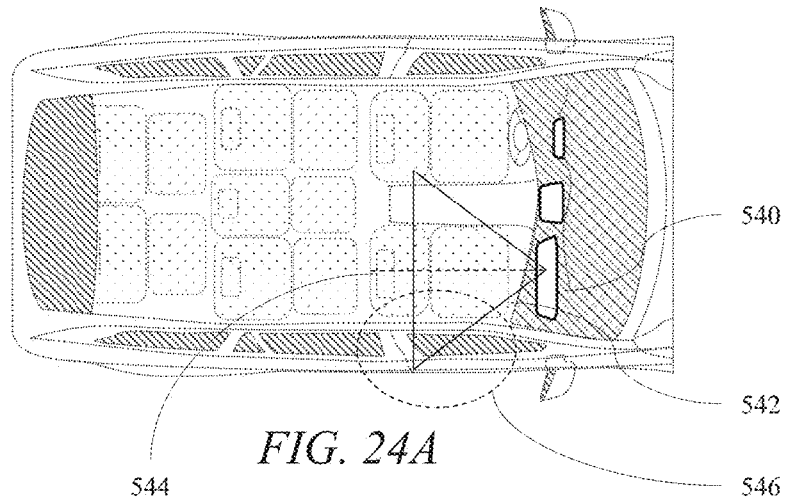
FIG. 24A, FIG. 24B, and FIG. 24C are schematic diagrams illustrating in top view an automotive cabin and respective angular output light distributions from a passenger directional display in a first, second and third modes of operation, in accordance with the present disclosure.
Figure 24B:
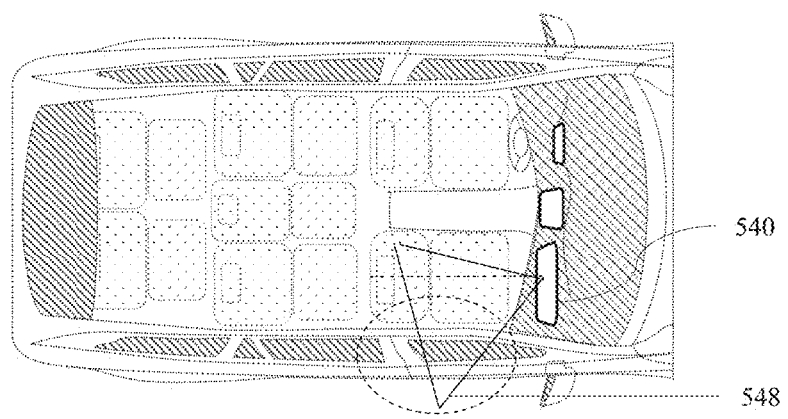
Figure 24C:
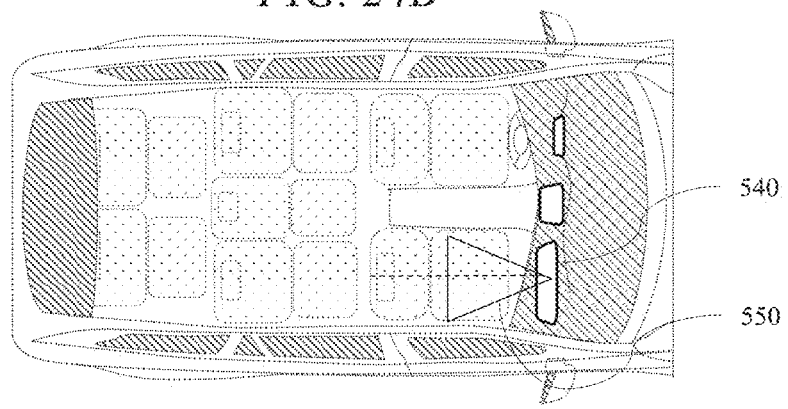

FIGS. 24A-C are schematic diagrams illustrating in top view an automotive cabin and respective angular output light distribution from a passenger directional display in a first, second and third modes of operation.

Modern vehicles may be fitted with large 17"-diagonal (or more) displays intended for passenger use. The angular output light distribution from these displays is not intended for and may be required to be prevented from viewing by the driver. In addition these large displays can produce substantial reflections in side windows that are particularly distracting to the driver at night time.

It would be desirable if during the light direction output from the display could be altered to suit different ambient light level conditions.

FIG. 24A illustrates a first mode of operation of the passenger specific display 540 in which it emits angular output light distribution 542 symmetrical with the passenger direction 544. In daylight operation the lower intensity at the side of the angular output light distribution towards the driver and the reflection at side window 546 may not be disturbing or distracting. FIG. 24B illustrates a second mode of operation of the passenger specific display 540 for use where legislation or the driver requires that the display 540 is not visible to the driver at all. This may be achieved by tilting the angular output light distribution 548 from display 540 so that it tilts away from the driver. This has the side effect of potentially increasing the reflection at the side windows, however in bright sunlight or daylight this may not be distracting to the driver. FIG. 24C illustrates a third mode of operation of display 540 suitable for night time operation. The angular output light distribution 550 from display 540 is narrowed so that no significant light falls on the side window glass and there is no visibility of the display directly by the driver. In this case the angular output light distribution 550 may be directed at the passenger and may also be reduced in intensity. The color temperature of the display white point may also be altered to a warmer color which humans find more comfortable for night time viewing.

In these figures the display angular output light distribution cone is shown altered in direction and/or width in the horizontal direction, however the display cone may additionally be altered in the vertical direction as explained with reference to FIG. 20A-C, in which case reflections from the windshield may be reduced or eliminated. Similarly diffuse reflection from upholstery may be reduced.

Advantageously the passenger may continue to use the display 540 at night time without disturbing the driver's night vision or producing distracting reflections. Advantageously the display 540 may not be required to be turned off at night time. Advantageously the display 540 may consume less power when emitting narrow angular output light distribution 550, which improves the electrical efficiency of the vehicle.

Figure 25A:
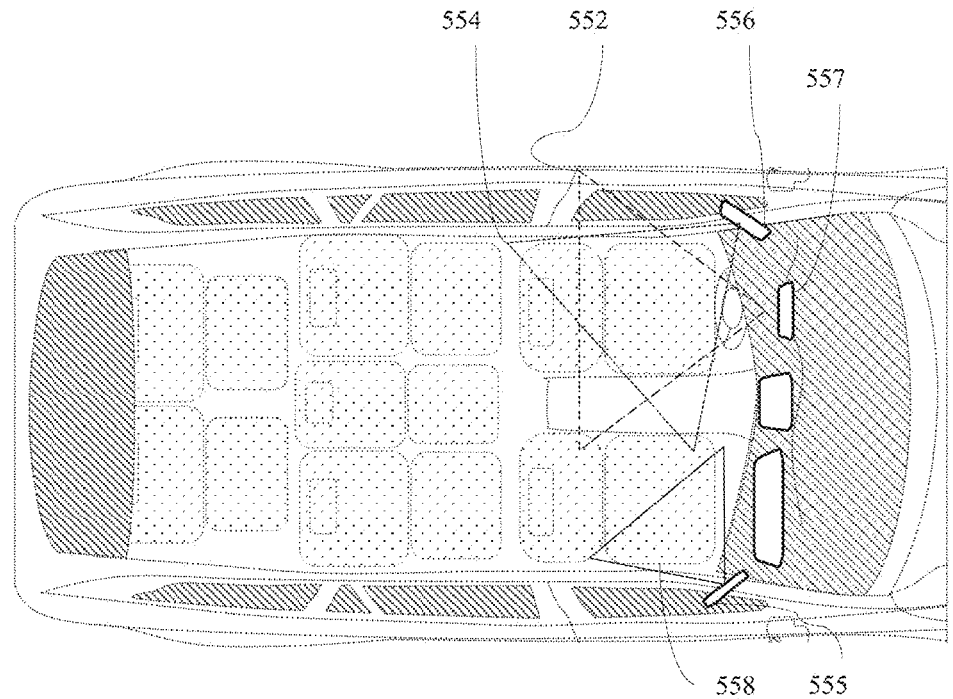
FIG. 25A and FIG. 25B are schematic diagrams illustrating in top view an automotive cabin and respective angular output light distributions from further mounted directional displays in first and second modes of operation, in accordance with the present disclosure.
Figure 25B:
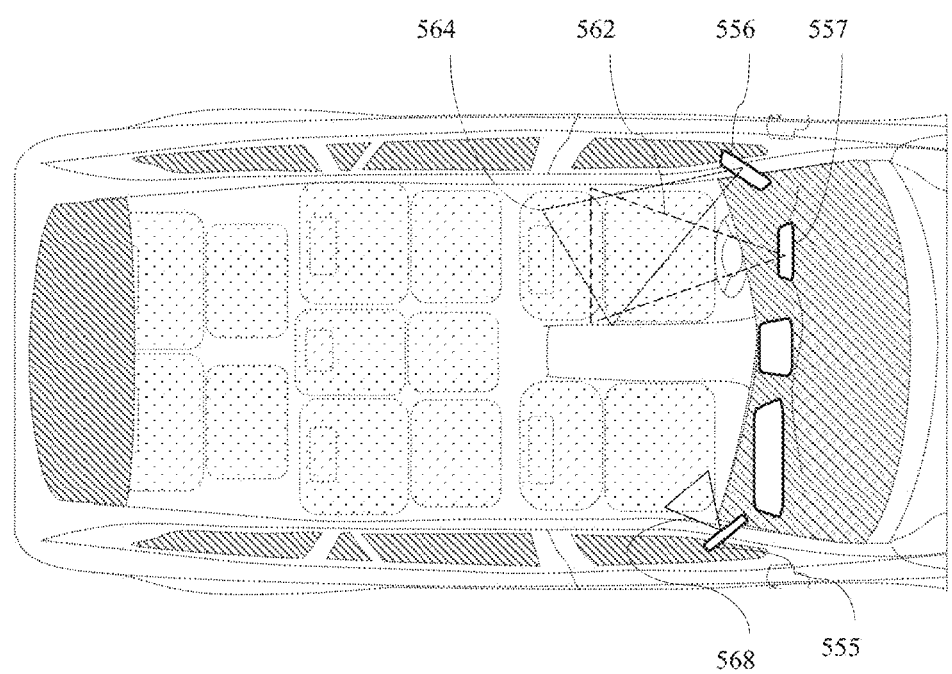

FIGS. 25A-B are schematic diagrams illustrating in top view an automotive cabin and respective angular output light distribution from further vehicle mounted directional displays in first and second modes of operation.

The Driver Information Display (DID, 557) is frequently an electronic display and must be clearly visible in all lighting conditions including bright sunlight and at night time. Modern vehicles may now being provided with "synthetic" door mirror displays 556 which are embodied as electronic displays such as LCD panels placed internal to the vehicle and driven by signals that use data from small cameras or other sensors that provide outside views of the vehicle analogous to that provided by conventional wing or door mirrors. Not fitting bulky door mirrors can improve the aerodynamic efficiency of the vehicle and therefore also improve fuel efficiency or battery range.

It is desirable that such displays are controllable to emit in angular output light distributions that vary according to driver commands and/or the operating environment including the light level exterior to the vehicle.

FIG. 25A illustrates a first mode of operation where the Driver Instrument Display (DID 557) and synthetic mirror displays 556, 555 operate with angular output light distributions 552, 554 and 558. In bright sunlight or daylight the reflections produced by these displays in window glass may not be distracting given the level of outside or exterior illumination. FIG. 25B illustrates a second mode of operation suitable for night time or low level outside illumination. The angular output light distribution 562 of the DID display 557 is narrowed to reduce glass surface reflections. The angular output light distribution 564 of synthetic mirror display 556 is also narrowed to reduce glass reflections. Synthetic mirror 555 is shown with angular output light distribution 568 which may be in the same direction but is reduced in intensity compared to that of angular output light distribution 558 in FIG. 25A. The intensity of light in angular output light distribution 562 and 564 may also be reduced to match the driver's preference.

Advantageously glass reflections are reduced. Advantageously background illumination in the cabin from upholstery, headlining or other contents may be reduced. Advantageously the driver's visual comfort level in high and low outside lighting level may be improved. Advantageously the smaller angular output light distributions 562, 564 may consume less electrical power and therefore improve vehicle efficiency.

The vehicle may also contain other displays such as seat back displays or passengers may be using smartphone and tablet displays. It would be desirable to provide a reduction of reflections from these portable mobile devices that are co-located to the vehicle. Reflections can be via glass surfaces to the eyes of a driver. Unlike the built in displays mounted to the vehicle the screens of these devices may be moveable or even be moving independently when in use.

It would be desirable to reduce scattered reflections from surfaces such as upholstery and headlining within a vehicle during night time operation.

Figure 26A:
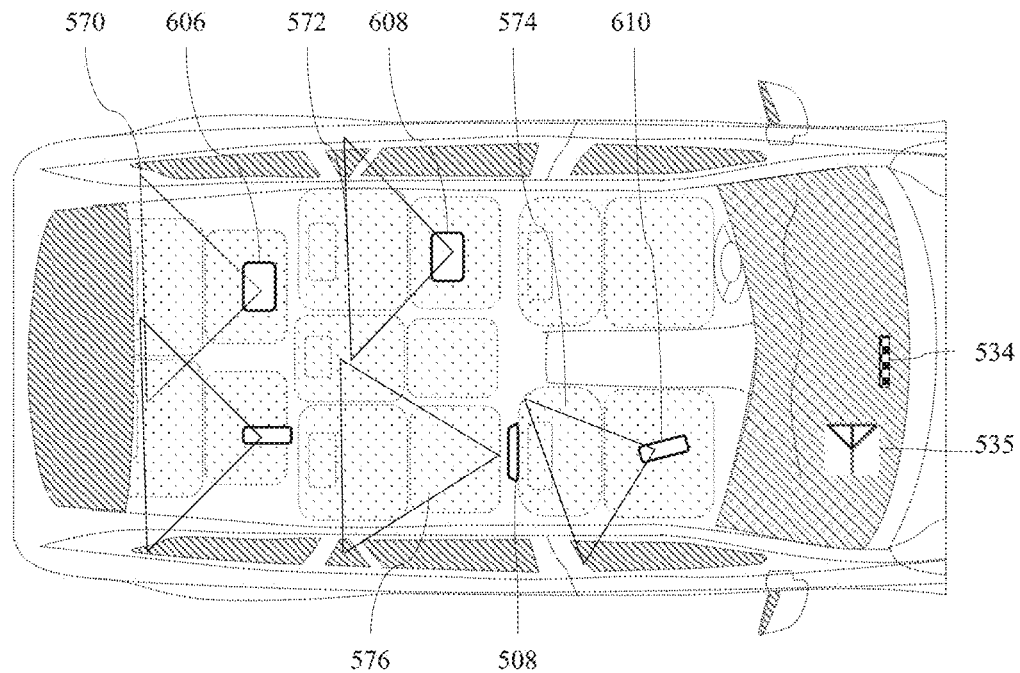
FIG. 26A and FIG. 26B are schematic diagrams illustrating in top view an automotive cabin and respective angular output light distributions from further portable directional displays in first and second modes of operation, further comprising display control communication means, in accordance with the present disclosure.
Figure 26B:
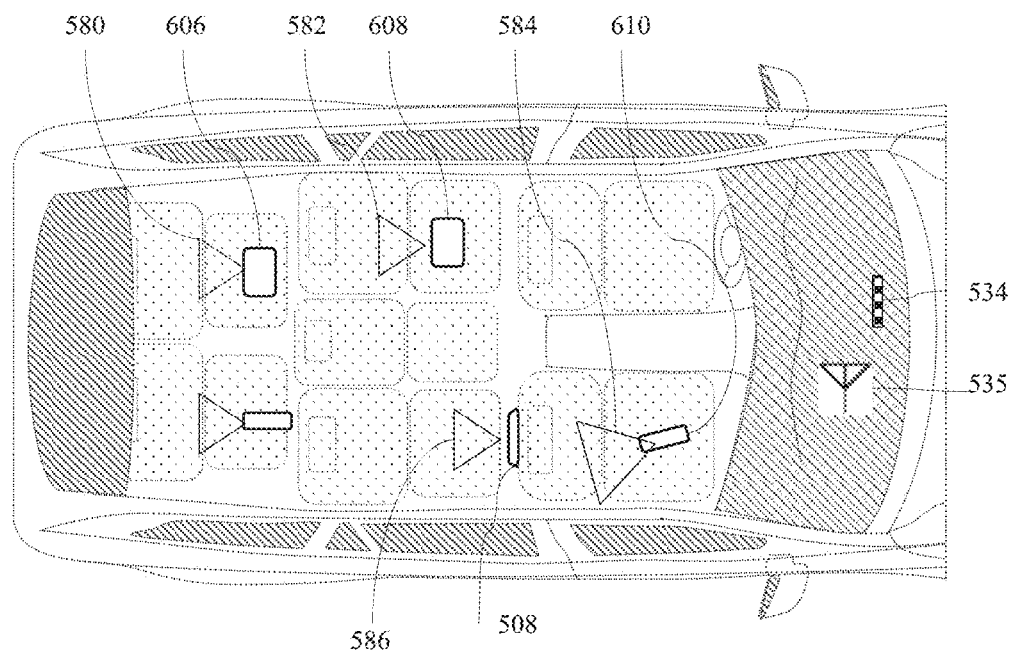

FIGS. 26A-B are schematic diagrams illustrating in top view an automotive cabin and respective angular output light distribution from further portable directional displays in first and second modes of operation, further comprising display control communication means.

FIG. 26A illustrates a first mode of operation suitable for daylight where seat back display 508 is emitting with angular output light distribution 576 and other passengers are using devices such as tablets 606, 608 emitting with angular output light distribution 570 and 572 and smartphone 610 emitting with angular output light distribution 574. In bright sunlight or daylight the emission with angular output light distribution shown may not produce reflections in the vehicle glass that are disturbing or distracting to the driver. The co-located portable mobile devices may be in communication with controller 534 by means of antenna 535 and communication protocols such as Bluetooth or WiFi. By this means the devices can be informed about the vehicle status, for example if it is in day mode or night mode. Setting to night mode may be dependent on the exterior illumination of the vehicle.

FIG. 26B illustrates a second mode of operation suitable for night time operation. The seat back display 508 has reduced angle and brightness of angular output light distribution 586 and the co-located portable directional display devices are also operating at reduced brightness and angular output light distributions as indicated by angular output light distributions 580, 582, 584. Devices 606, 608, 508, 610 may receive the instruction to enter the narrow angular output light distribution and low brightness second mode by means of controller 534 and antenna 535 and communication protocol such as Bluetooth or Wifi. The instruction to enter the second mode may be automatic or commanded by the driver.

Advantageously the brightness and angular emission of portable directional display devices in the cabin may be reduced so that the display glass reflections are also reduced. Further, reflections from non-specular surfaces in the cabin may be reduced so that the background illumination level is maintained at a low level in order to preserve the driver's night vision adaptation.

Figure 27:
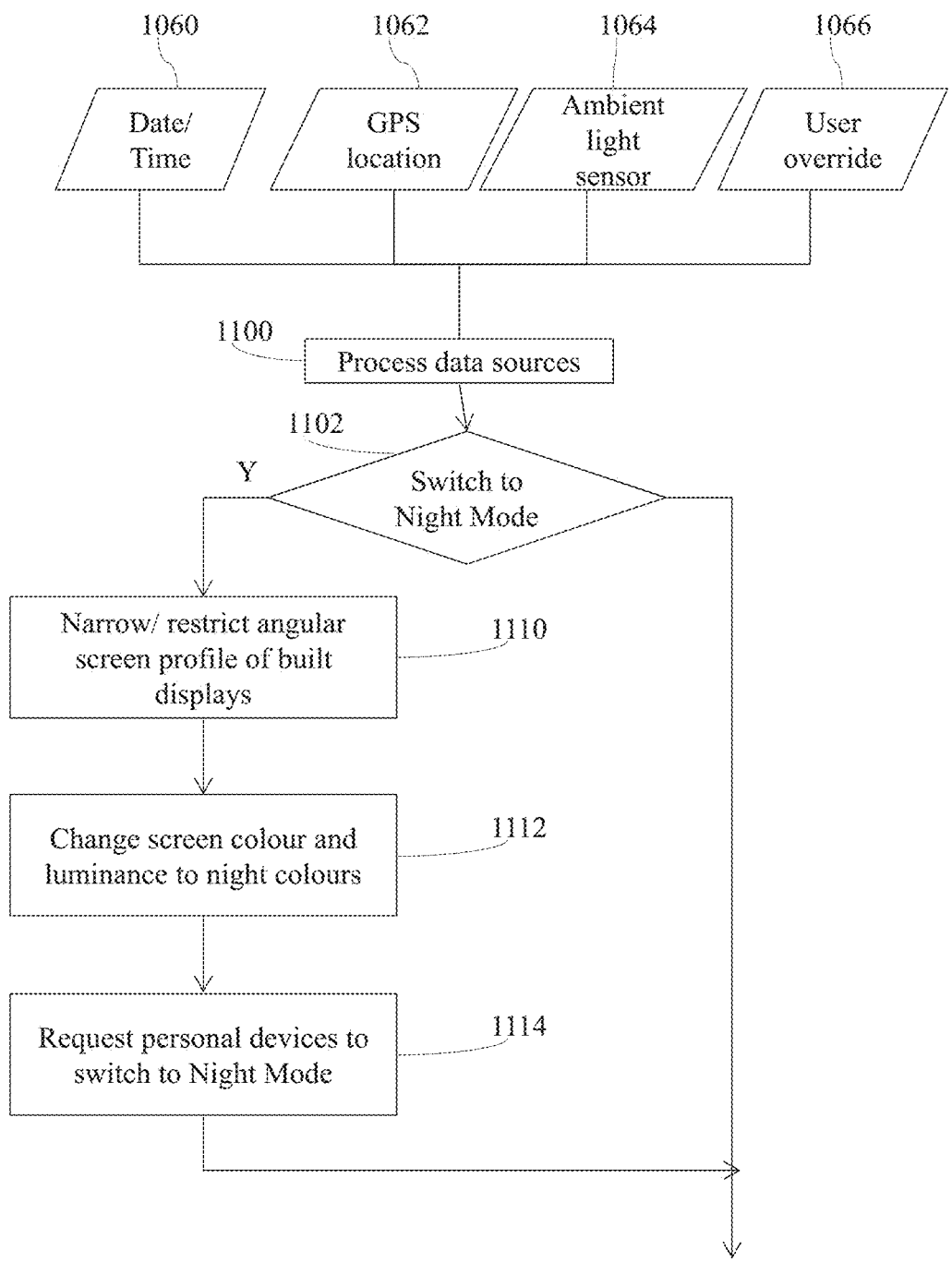
FIG. 27 is a flowchart illustrating directional illumination control of the portable directional displays of FIGS. 26A-B for a night mode of operation, in accordance with the present disclosure.

FIG. 27 is a flowchart illustrating directional illumination control of the displays mounted to the vehicle of FIG. 24A-C and FIG. 25A-C and the portable directional displays of FIGS. 26A-B for switching to a night mode of operation. The data sources available to the vehicle may include the Date and Time (1060), the vehicle location and in particular the latitude derived from a Global Positioning System (GPS, 1062). The vehicle may also have a darkness sensor system 1064 arranged to detect dark ambient conditions exterior to the vehicle. The vehicle may also be capable of processing the commands from the driver by means of voice, gesture or the user interface of the vehicle such as buttons, dials, or a touch screen. These data sources may be processed (1100) by the vehicle controller 534 in order to determine (1102) if the vehicle should request or command the directional displays mounted to the vehicle (e.g. 540 of FIG. 24A-C) and co-located portable directional displays (FIG. 26B 606, 608, 610 and 508) to switch to night mode. Depending on the capabilities of the displays 606, 608, 610 and 508, and the processed data 1100, the displays may be requested to narrow or restrict their output light emission angle (1110), alter the screen colors and luminance for night mode (1112) and co-located portable devices (e.g. FIG. 26B 606, 608, 610 and 508) may be requested to switch to night mode (1114), which may include changing colors, contrast, brightness and angular output light distribution cone width.

Advantageously the sensors available to the vehicle and internal processing may enable the displays in the vehicle to enter night mode automatically or on the command of the driver, thereby improving the driver's visual comfort at night or in low light conditions such as at dusk or in underground car parks.

Figure 28:
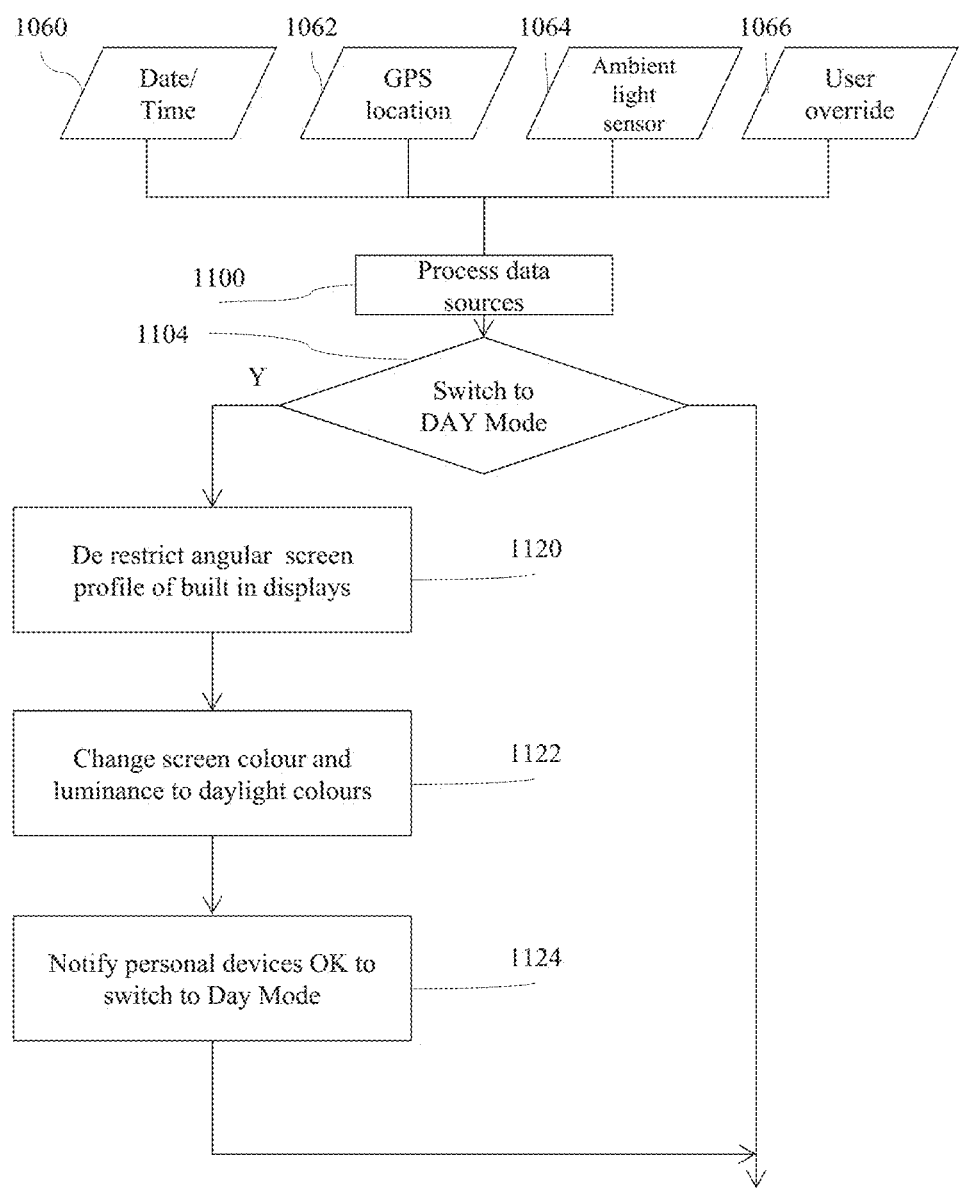
FIG. 28 is a flowchart illustrating directional illumination control of the portable directional displays of FIGS. 26A-B for a daytime mode of operation, in accordance with the present disclosure.

FIG. 28 is a flowchart illustrating directional illumination control of the displays mounted to the vehicle of FIG. 24A-C and FIG. 25A-C and the portable directional displays of FIGS. 26A-B for a daytime mode of operation. The data sources available to the vehicle may include the Date and Time (1060), the vehicle location and in particular the latitude derived from a Global Positioning System (GPS, 1062). The vehicle may also have a darkness sensor 1064 arranged to detect bright or dark ambient conditions. The vehicle may also be capable of processing the commands from the driver by means of voice, gesture or the user interface of the vehicle such as buttons, dials, or a touch screen. These data sources may be processed (1100) by the vehicle controller 534 in order to determine (1104) if the vehicle should request or command the directional displays mounted to the vehicle (e.g. 540 of FIG. 24A-C) and co-located portable directional displays (FIG. 26B 606, 608, 610 and 508) to switch to day mode. Depending on the capabilities of the displays 606, 608, 610 and 508, and the processed data 1100, the displays may be requested to derestrict their emission angle (1120), alter the screen colors and luminance for daylight mode (1122) and co-located portable devices (e.g. FIG. 26B 606, 608, 610 and 508) may permitted to switch to day mode (1124), which may include changing colors, contrast, brightness and angular display angular output light distribution width.

Advantageously the convenience of the passengers is improved by enabling their displays to switch between driver sympathetic day and night modes without the need for user interaction or interruption of their work or entertainment.

Vehicles that have rear facing seats may present additional glass reflection issues for the driver because rear facing seats have a short distance to the back window glass without an obscuring seat back. It would be desirable to reduce visibility of devices that are operated by rearwards facing occupants.

Figure 29A:
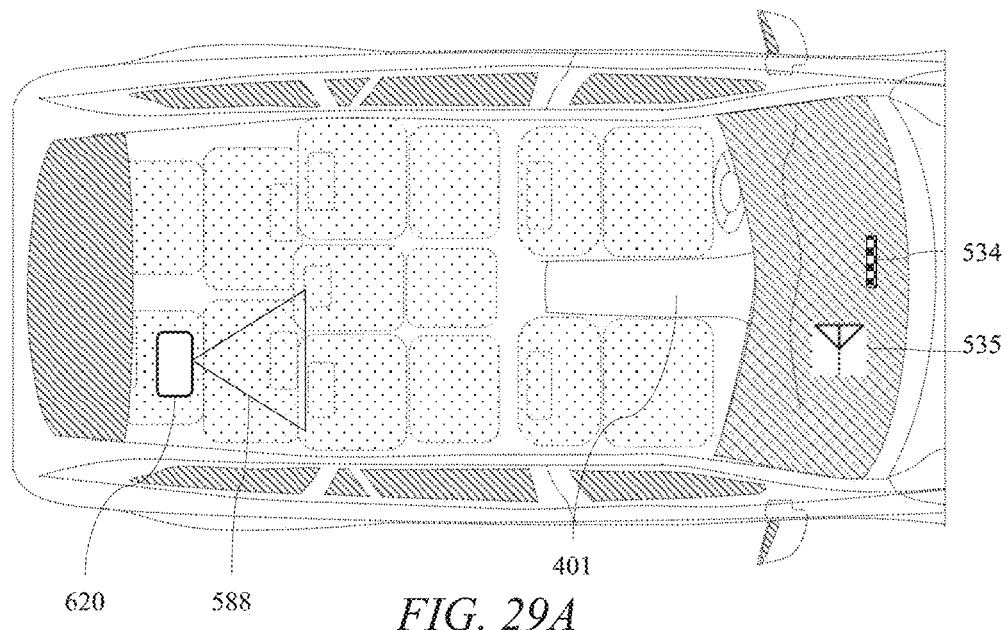
FIG. 29A and FIG. 29B are schematic diagrams illustrating in top view an automotive cabin and respective angular output light distributions from portable displays for rear facing occupant locations, in accordance with the present disclosure.
Figure 29B:
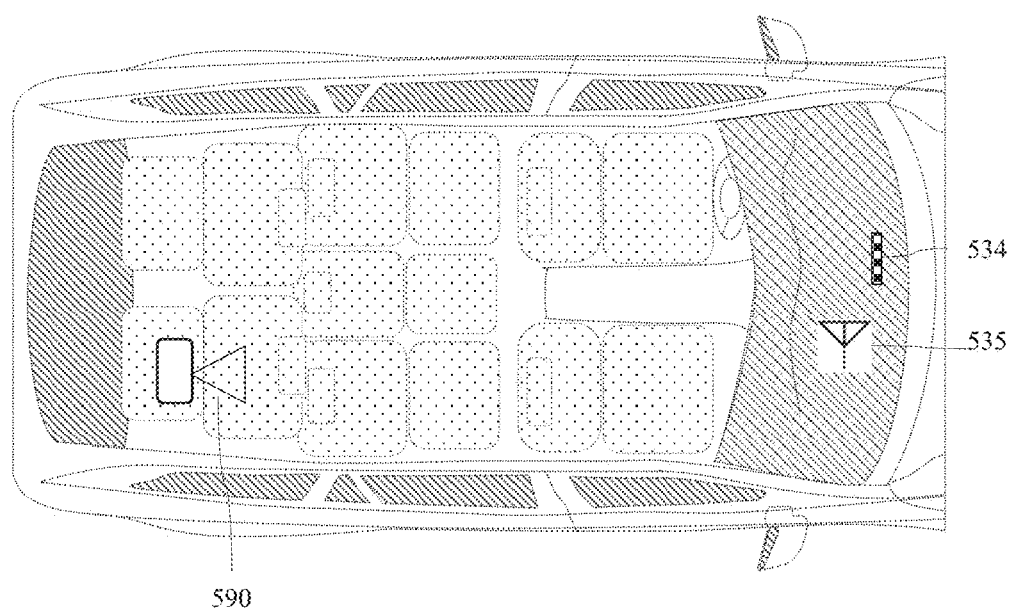

FIGS. 29A-B are schematic diagrams illustrating in top view an automotive cabin and respective angular output light distributions from further portable directional displays used by rear facing seat occupants in first and second modes of operation, further comprising display control communication means.

FIG. 29A illustrates a first mode of operation where portable directional display 620 is operated by the occupant of a rear facing seat and produces angular output light distribution 588. The permission to operate in this first mode may be confirmed by communication with controller 534 by means of antenna 535 and by means of a wireless protocol such as Bluetooth or WiFi. Note that the angular output light distribution 588 is shown in the horizontal plane but also extends in the vertical direction as explained with reference to FIG. 17 and FIG. 18.

FIG. 29B illustrates a second mode of operation where the portable directional display 620 is operated by the occupant of a rear facing seat and produces angular output light distribution 590 with less angular spread and may also adopt reduced intensity. The instruction to operate in this second mode may be received by communication with controller 534 by means of antenna 535 and by means of a wireless protocol such as Bluetooth or WiFi.

Advantageously visibility to a driver of devices that are operated by rearwards facing occupants may be reduced. Advantageously the power consumption of the portable directional display 620 may also be reduced extending its operating time, or if operated using power supplied by the vehicle, reducing the load on the vehicle alternator or drain on the vehicle battery. Reducing the drain from the vehicle battery may be important for vehicles that are stationary such as in a traffic jam.

Figure 30:
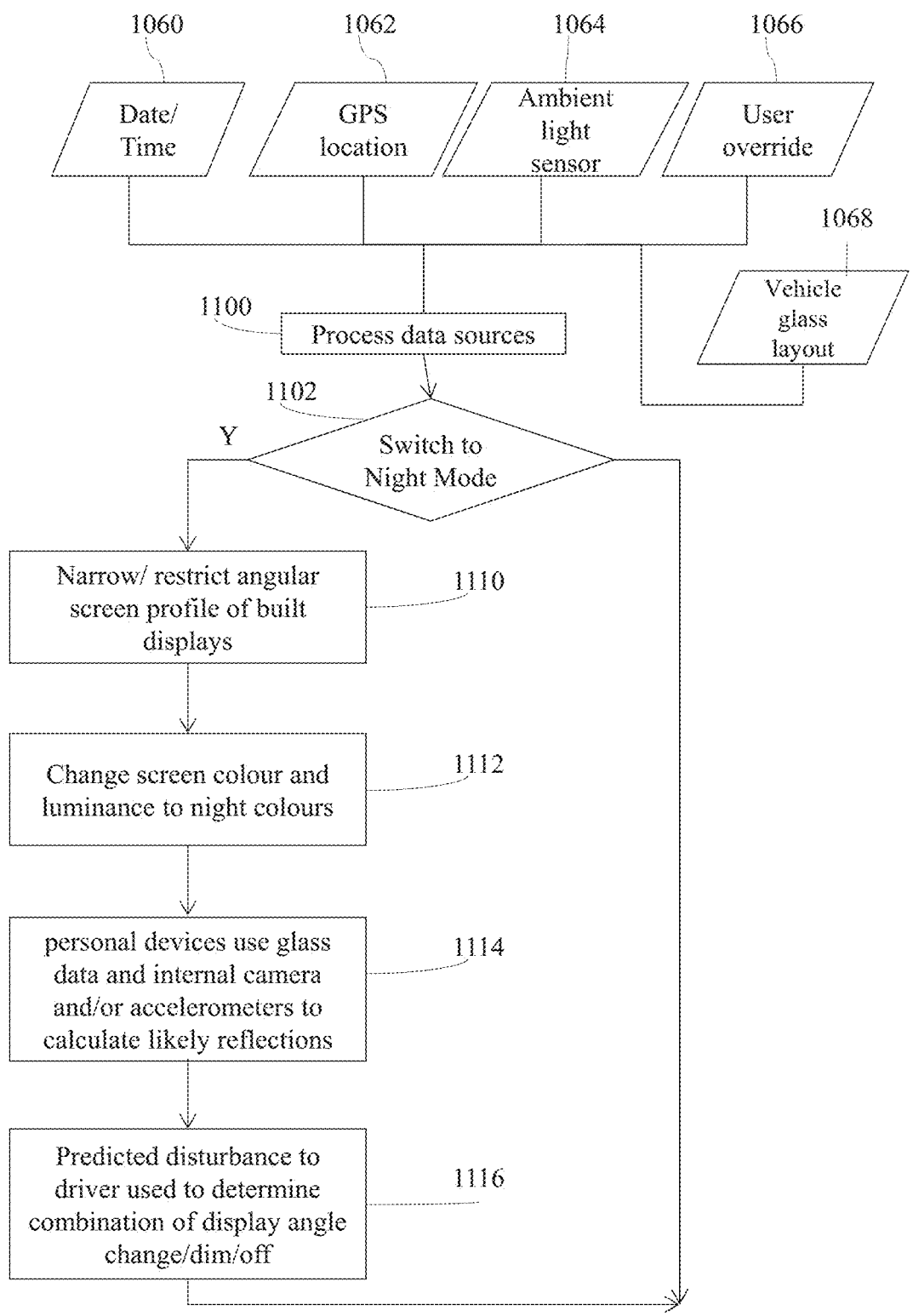
FIG. 30 is a flowchart illustrating directional illumination control of the portable directional displays of FIGS. 26A-B for a night time mode of operation arranged to locate reflections from directional displays via glass surfaces to the eyes of a driver wherein the relative location of glass surfaces and driver location are broadcast to the respective portable mobile devices, in accordance with the present disclosure.

FIG. 30 is a flowchart illustrating directional illumination control of the portable directional displays of FIGS. 26A-B and FIGS. 29A-B for a night time mode of operation where the vehicle communicates or broadcasts the internal layout of the vehicle including the layout position and shape or geometry of the vehicles glass areas (1068) and the driver's position to the portable directional displays. The portable directional displays may be arranged to restrict their angular output light distribution to minimize specular and diffuse reflections (1110). Further the portable directional displays may alter their colors and luminance (1112) to a night mode as described with reference to FIG. 27. The portable directional display devices may use the vehicle internal-layout information in conjunction with their own inertial sensors and optionally their own front or rearward (rearwardly) facing cameras (1114) to locate or predict reflections via glass surfaces. Responsive to that prediction the display angular output light distribution may be altered in angular direction or angular width, including altering the angular output angle to zero, i.e. off. The portable directional display devices may also use their inertial sensors and their cameras to predict reflections that will be distracting to the driver and may ignore reflections that the driver will not be able to see (1116). Responsive to that prediction the display angular output light distribution may be altered in angular direction or angular width, including altering the angular output angle to zero, i.e. off.

Advantageously ray paths from a display to a driver by means of specular reflections from glass surfaces may be calculated or predicted. Light that is directed to the driver may be reduced by means of control of directionality in response to said calculated or predicted ray paths.

Figure 31A:
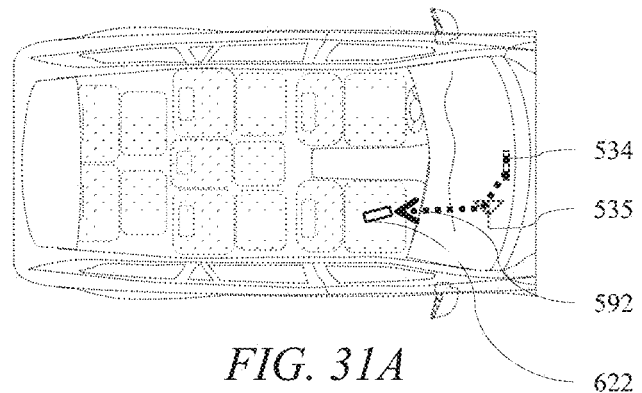
FIG. 31A, FIG. 31B, and FIG. 31C are schematic diagrams illustrating in top view an automotive cabin and portable displays arranged to collect internal layout information of the vehicle to detect direct reflections from a glass surface to a driver, in accordance with the present disclosure.
Figure 31B:
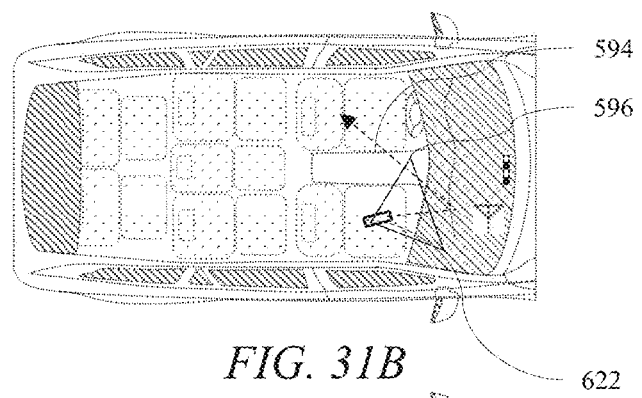
Figure 31C:
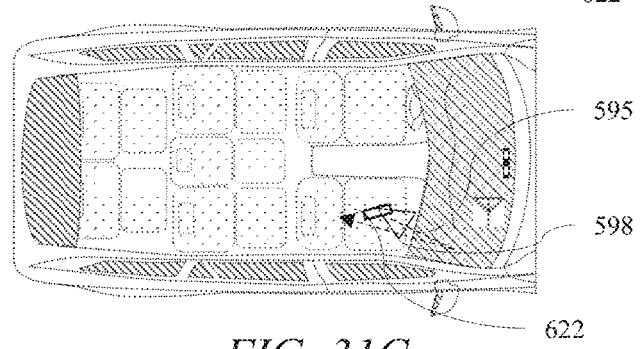

FIGS. 31A-C are schematic diagrams illustrating in top view an automotive cabin and portable displays arranged to receive internal layout of the vehicle's including the location or shape of glass areas and the seat occupied by the driver in order to detect direct reflections from a glass surface to a driver. FIG. 31A illustrates the internal vehicle layout information being communicated from controller 534 by means of antenna 535 and a wireless protocol such as WiFi or Bluetooth to portable directional display device 622. Alternatively the vehicle may communicate its model type or serial number and the internal layout information may be accessed from a database internal to the portable directional display, or may be accessed from a database external to the vehicle, e.g. from a website.

FIG. 31B illustrates an example where portable directional display 622, having earlier received the internal layout information of the vehicle, is able to predict from its inertial sensors and or built in cameras that the currently selected angular output light distribution 596 will produce a disturbing reflection 594 in the direction of the driver.

FIG. 31C illustrates display device 622 having detected or predicted a disturbing reflection, altering its angular output light distribution 598 such that reflections are in a new direction 595 which is not calculated to be disturbing for the driver. The display intensity may also be reduced. The display output angular distribution angle may be reduced to zero.

Advantageously ray paths may be predicted and directionality adjusted, reducing unwanted visibility of displays and their reflections by the driver in night time driving and thereby increasing safety.

Figure 32:
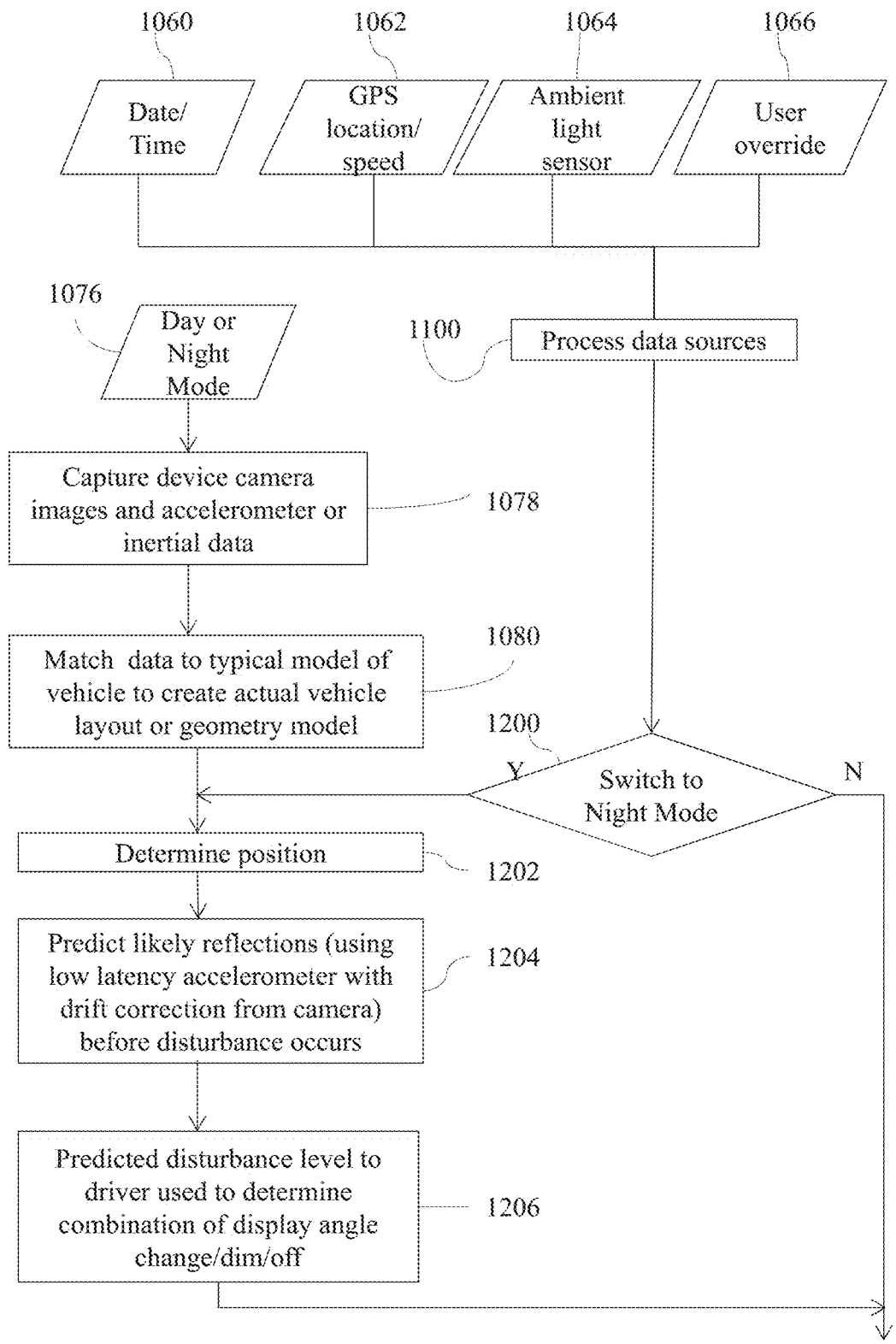
FIG. 32 is a flowchart illustrating directional illumination control of the portable directional displays of FIGS. 26A-B for a night time mode of operation arranged to locate reflections from directional displays via glass surfaces to the eyes of a driver wherein the relative location of glass surfaces and driver location are detected by the respective portable mobile devices, in accordance with the present disclosure.

FIG. 32 is a flowchart illustrating directional illumination control of the portable directional displays of FIGS. 26A-B for a night time mode of operation arranged to locate reflections from directional displays via glass surfaces to the eyes of a driver wherein the relative location of glass surfaces and driver location are detected by the respective portable directional display devices.

It would be desirable for portable directional display devices to calculate said ray paths with reduced vehicle input. In particular without needing to receive the internal layout or of the vehicle from the vehicle or from an external source. In this example, when the portable directional display is in either day or night mode, the internal inertial sensors such as accelerometers and the built in cameras (1078) can cooperate to build up a model of the internal layout of the vehicle and the reflectance of surfaces. This can be done without the model type or name of the vehicle being known. The data captured by the portable display devices can be compared to generic internal vehicle internal layout in order to determine the actual internal vehicle layout (1080) without having to rely on external databases or internal layout information supplied and communicated by the vehicle itself. Such data can be captured in the background during daylight in order that the model can be prepared in advance of the need to switch to night mode. Alternatively the internal layout information can be captured during night mode with the aid of cameras, inertial sensors and IR light sources built in to the personal directional display so that reflection data can be obtained at night without producing disturbing reflections to the driver.

Once the vehicle internal layout has been captured, knowledge of the position (1202) of the personal device can be used in conjunction with the inertial sensors and cameras to predict movement and therefore also to predict disturbances from reflections (1024) to the driver. The predicted disturbances can be used to determine a combination of display directional angle change or reduction including optionally dimming or even turning the display to emit over a zero angle (1206). If the angle of the display is reduced to zero when oriented to produce a disturbing reflection, the user will soon learn how to hold the device to avoid this.

Advantageously the low latency of inertial sensors can provide accurate short term predictions of the portable display device position and orientation and the camera systems may provide longer term drift correction and identification of internal layout features such as glass, headlining upholstery and occupants. Thereby the disturbance to the driver may be minimized while allowing the other occupants to continue using their portable devices.

Figure 33A:
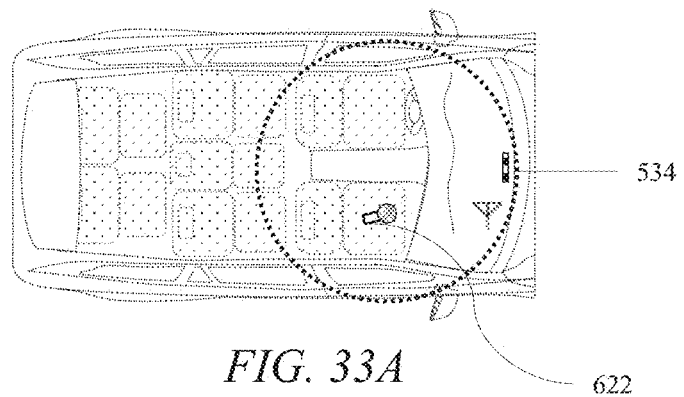
FIG. 33A, and FIG. 33B, and FIG. 33C are schematic diagrams illustrating in top view an automotive cabin and portable displays arranged to detect the internal layout of the vehicle to detect direct reflections from a glass surface to a driver, in accordance with the present disclosure.
Figure 33B:
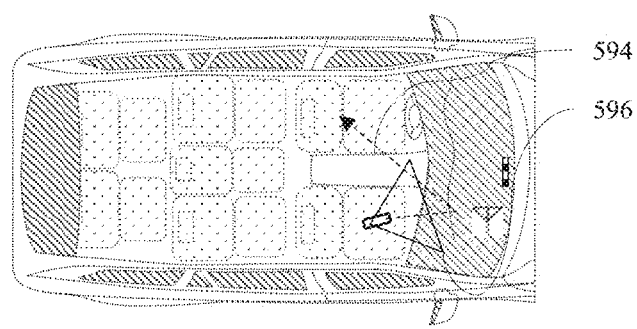
Figure 33C:
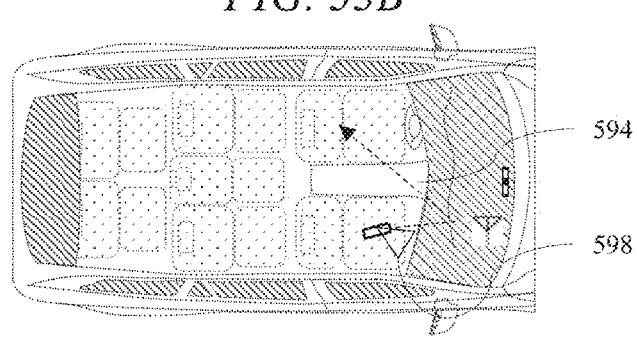

FIGS. 33A-C are schematic diagrams illustrating in top view an automotive cabin and portable displays arranged to detect the internal layout of the vehicle in order to detect or predict direct reflections from a glass surface to a driver. FIG. 33A differs from FIG. 31A in that the portable directional display device 622 can capture the location of specular and reflective surfaces in the vehicle autonomously and without needing internal layout information to be supplied by the vehicle controller 534 or other communication means. FIG. 33B illustrates the light output distribution 596 creating a potential reflection disturbance in the direction of the driver 594. FIG. 33C illustrates how the output light distribution 598 may be modified to reduce or illuminate the reflective disturbance to the driver in direction 594. The vehicle may still communicate to the portable directional display devices the instruction or request to enter the night mode where specular reflections and overall lighting disturbances from diffuse reflections are reduced.

Advantageously this method can also deal with "VARIABLES" such as passengers wearing light colored clothing or bags or temporary vehicle contents that are light colored or reflective. Therefore the reliability of the reflection disturbance reduction can be improved.

Advantageously ray paths may be collected and directionality adjusted, reducing unwanted visibility of displays by the driver for night time driving and increasing safety.

Figure 34A:
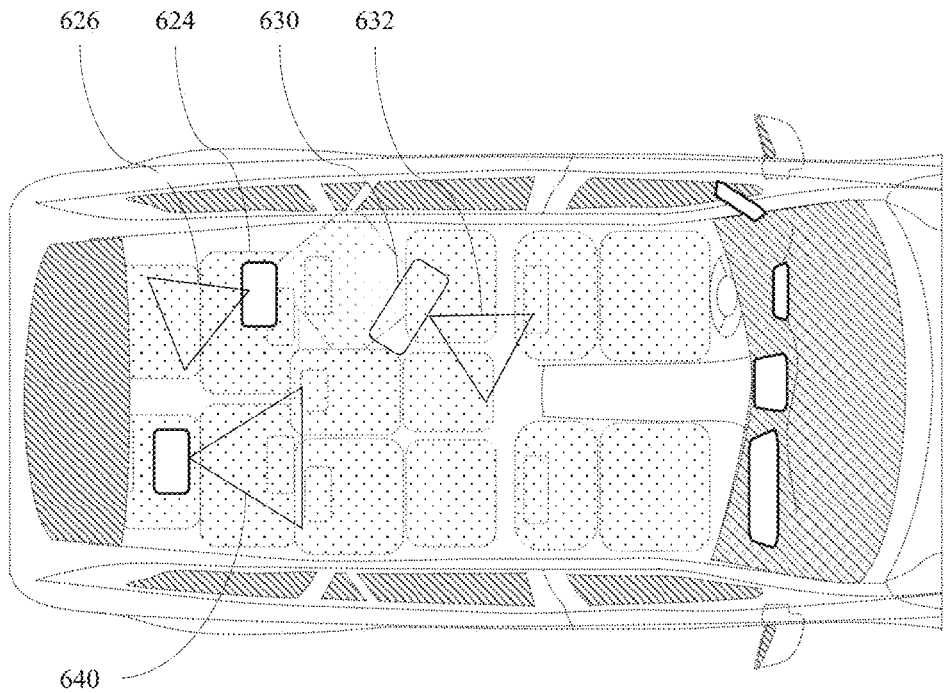
FIG. 34A and FIG. 34B are schematic diagrams illustrating in top view an automotive cabin and control of the directionality of portable directional mobile displays such that reflections from the display via a glass surface to a driver are minimized, in accordance with the present disclosure.
Figure 34B:
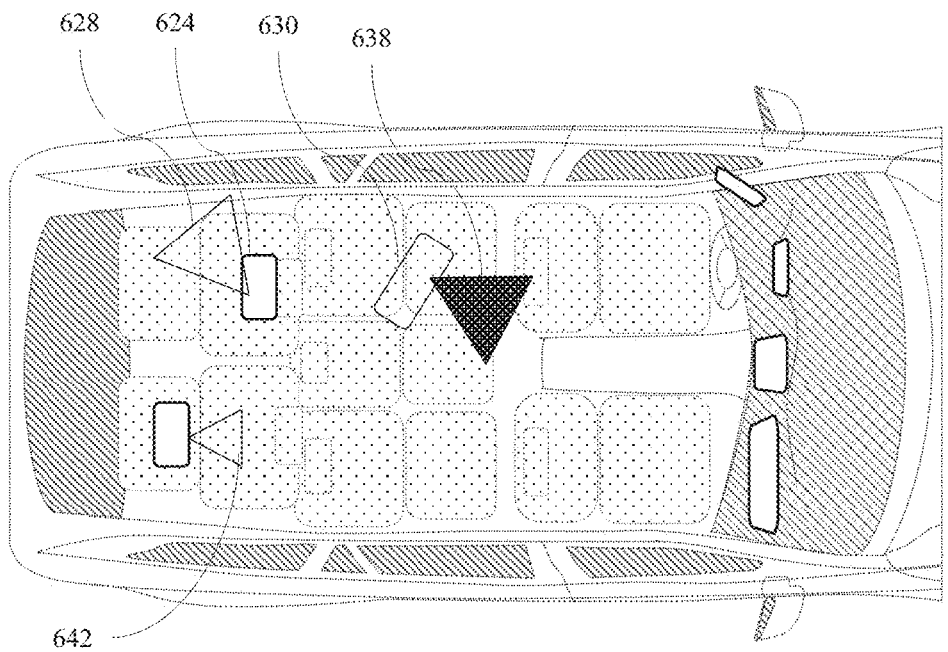

FIGS. 34A-B are schematic diagrams illustrating in top view an automotive cabin and control of the directionality of portable directional mobile displays such that reflections from the display via a glass surface to a driver are minimized. Portable directional display device 624 may autonomously alter its light output directional distribution from 626 where there is reflection from the back glass to the driver to output directional distribution 628 where there may be a window reflection, but this is not seen by or disturbing to the driver. The device 624 may use its own darkness sensor system to indicate that dark ambient conditions have been detected, may use its own camera to recognize specular reflecting surfaces, may use its own processing to determine its location relative to the vehicle and the driver, and may use its own processing to determine if a disturbing reflection for the driver is predicted and take mitigating action. Similarly portable display device emitting angular light output distribution 640 may detect similar conditions as device 622, but if it does not have a controllable directional display it may reduce its brightness to mitigate disturbance to the driver. Portable directional device 630 may calculate that there is no direction in which it can adjust its angular directional output 632 without creating a disturbance for the driver. In which case the device may elect to turn its angular distribution angle to zero 638, effectively turning off the display. As soon as device 630 detects that it has been physically re-oriented so that a disturbing reflection is not likely then the display angular distribution angle may be reset to a non-zero angular width. It can be particularly problematic with emissive displays such as OLED and LED and LCD to maintain sufficient readability in very high ambient sunlight conditions or where there is a reflectance of the sun from the surface of the display directed directly at the driver.

Figure 35:
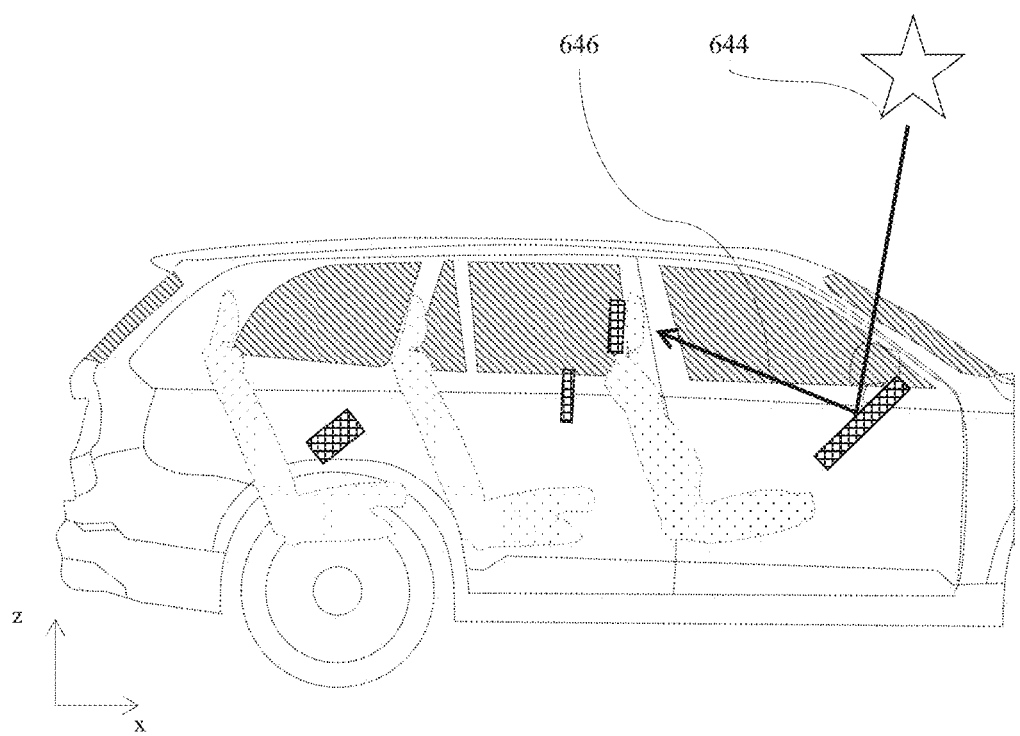
FIG. 35 is a schematic diagram illustrating in side view, reflection of sunlight from a directional display to an occupant in a vehicle cabin, in accordance with the present disclosure.

FIG. 35 is a schematic diagram illustrating in side view, reflection of sunlight from a directional display to an occupant in a vehicle cabin. Using knowledge of the vehicle's latitude and heading direction supplied by a GPS unit, and knowing the time of day, the position of the sun 644 and the reflection paths 646 from displays mounted to the vehicle towards the driver's eyes can be calculated or predicted. The darkness sensor system built in to the vehicle may also indicate that bright ambient conditions have been detected, i.e. it is not a cloudy or rainy day.

It would be desirable for drivers to maintain visibility of displays in bright direct sunlight, while not dazzling the driver in lower illuminance conditions and minimizing the power needed to illuminate the displays mounted to the vehicle.

Figure 36A:
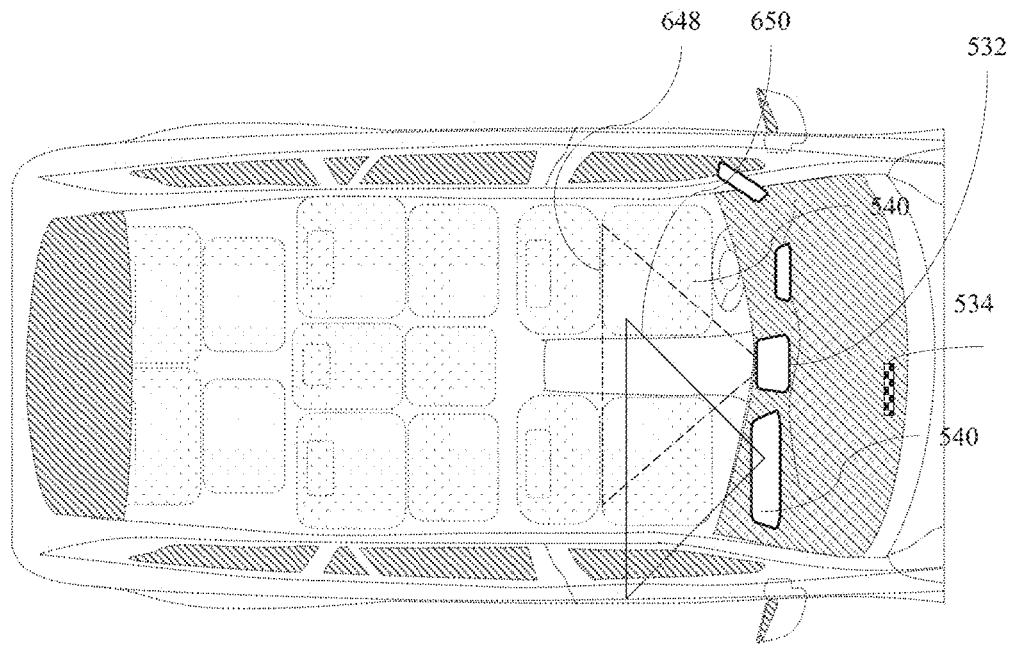
FIG. 36A and FIG. 36B are schematic diagrams illustrating in top view an automotive cabin and control of the directionality of directional displays in response to a sunlight, in accordance with the present disclosure.
Figure 36B:
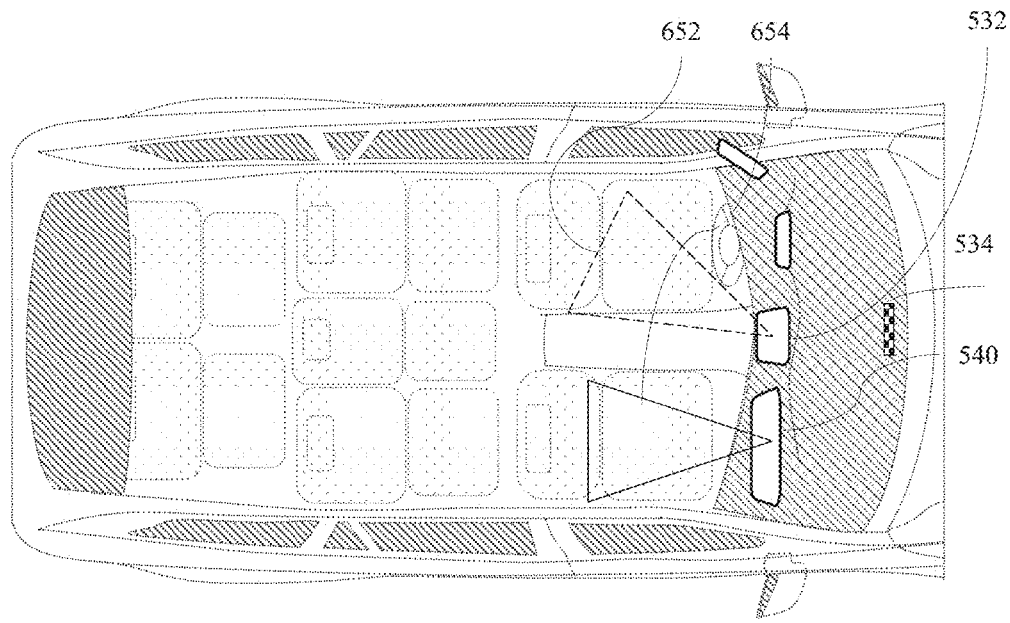

FIGS. 36A-B are schematic diagrams illustrating in top view an automotive cabin and control of the directionality of directional displays mounted to the vehicle in response to a bright ambient or prediction of a sunlight reflection from the display to the driver's eye line.

FIG. 36A shows the normal daylight use angular output distributions 648, 650 from CSD directional display 532 mounted to the vehicle and passenger directional display 540 mounted to the vehicle. Sensors detecting bright ambient light and a knowledge of the time and vehicle direction from GPS systems integrated or connected by wireless network to the vehicle, controller 534 may calculate that the visibility of the displays 532, 540 is reduced or compromised by a direct surface reflection of the sun. Responsive to such sensors the directional displays 532 and 540 may alter their angular light output directional distributions to those illustrated in FIG. 36B. The driver may see the output directional distribution indicated by angular output light distribution 652 where the light output in this narrower angular distribution may be increased over that of 648 without necessarily increasing the overall display power consumption of display 532. Similarly passenger directional display 540 may alter its angular light output distribution from 650 to 654.

Advantageously readability of the passenger directional display 540 and the CSD directional display 532 are increased in high or very high ambient light conditions without requiring more power from the display backlight system. Advantageously concentrating the angular output from the displays 540, 532 may reduce the drain on the vehicle battery or load on vehicle alternator. This may increase the efficiency of the vehicle.

Figure 37:
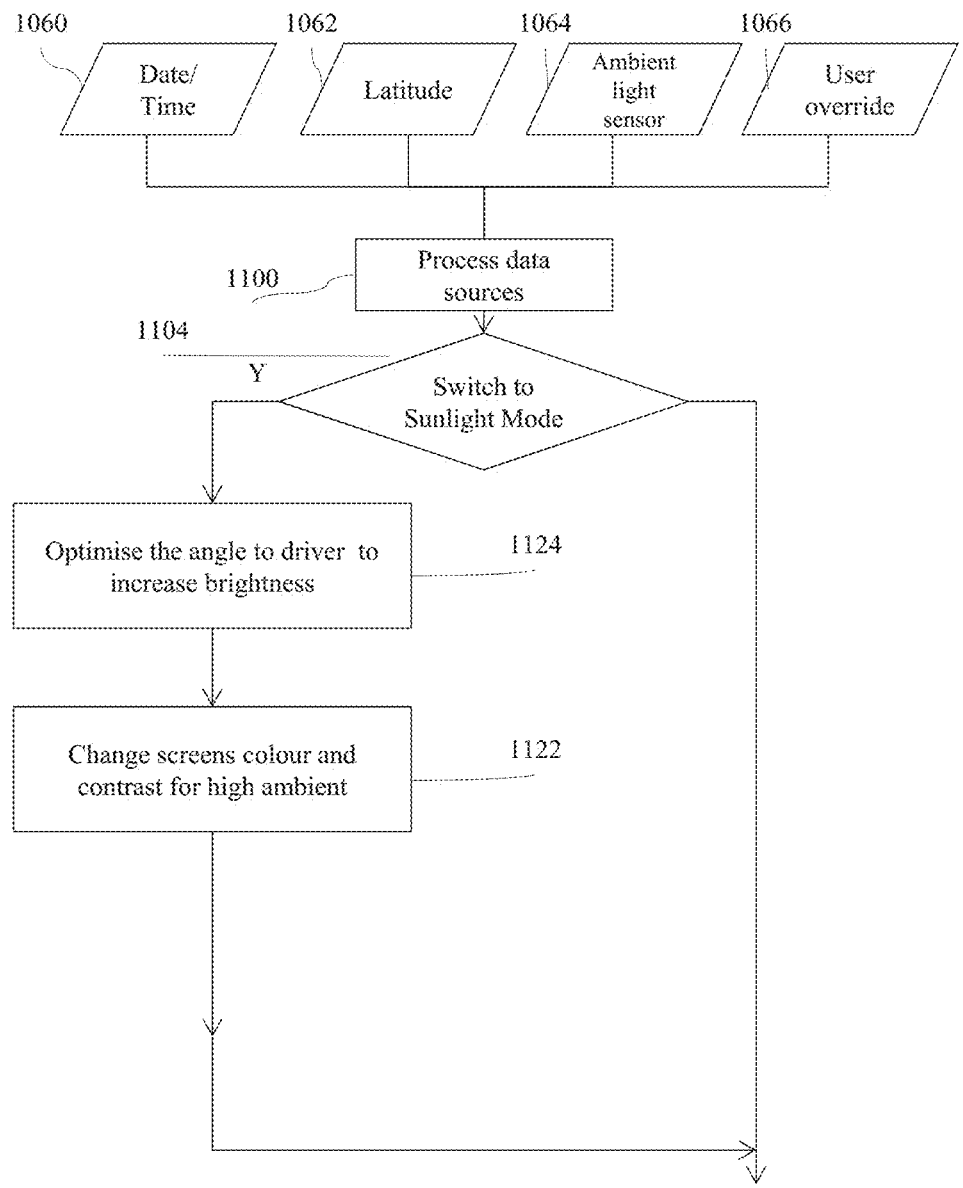
FIG. 37 is a flowchart illustrating directional illumination control of directional displays to provide a very high luminance output in response to the location of reflection of bright external sources by said directional display to a vehicle occupant, in accordance with the present disclosure.

FIG. 37 is a flowchart illustrating angular output light distribution control of directional displays to provide a directional high luminance output in response to very high ambient light levels or reflection of bright external sources such as the sun by said directional display to a vehicle occupant. The vehicle may process data (1100) from sensors including a darkness sensor system (1064) indicating that bright ambient conditions exist. The vehicle may also process data (1100) from the date and time (1060) and latitude (1062) which may be derived from the GPS system. Optionally the driver may choose to override (1066) sensor values to force the system to switch to high ambient Sunlight Mode (1104). When in sunlight mode the angular output of the directional displays may be narrowed and directed (1124) straight at the driver. This may enable the display to be brighter for the same power consumption as only a narrower range of angular space is illuminated. Note that the angular output of the directional display may be adjusted in horizontal, vertical or both axes. Optionally the screen color choice and display contrast settings may be modified (1122) to enhance viewability and clarity in high ambient conditions.

Advantageously the display luminance may be adjusted in response to the position of the reflections of direct sunlight from a display. Further advantageously the adjustment can be done for the driver's displays and or the passenger's display. Further advantageously the brightness of the directional display may be increased while minimizing the power needs of the backlight system and thereby increasing the battery range or efficiency of the vehicle.

The CSD display 532, because of the nature of the displayed information, may only require occasional or sporadic attention by the driver, and when the driver is not looking at this information the display may be optimized in angle and content for the passenger. In bright ambient conditions this means that the display produces only one super bright angular output light distribution at any one time but the directionality of this angular output varies in response to the gaze of the driver.

Figure 38:
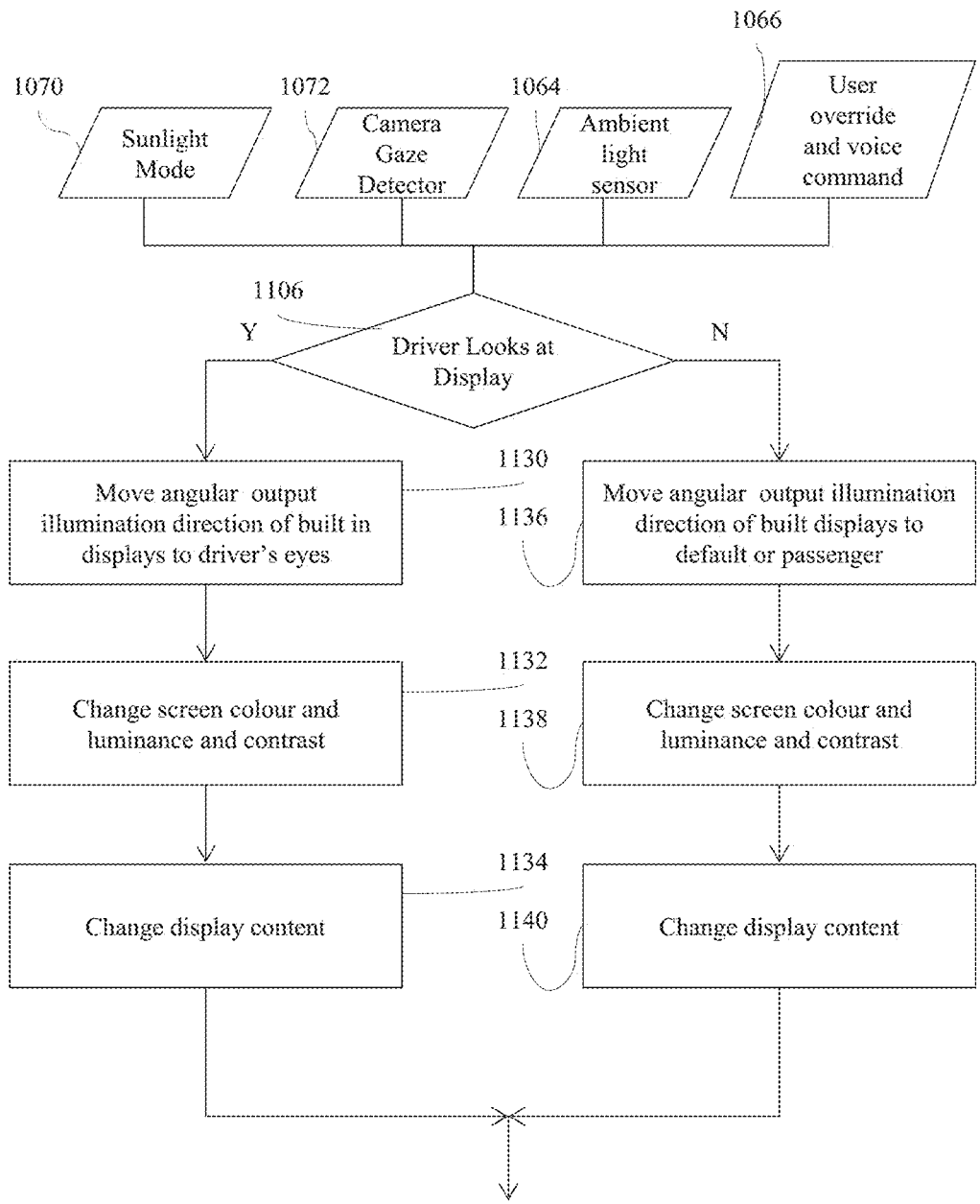
FIG. 38 is a flowchart illustrating directional illumination control of directional displays to provide a very high luminance output in response to the location of reflection of bright external sources by said directional display to a vehicle occupant when said occupant is not looking directly at the display, in accordance with the present disclosure.

FIG. 38 is a flowchart illustrating angular output illumination control of directional displays mounted to the vehicle to provide an increased luminance output in response to the location of reflection of bright external sources by said directional display to a vehicle occupant when said occupant is not looking directly at the display. If Sunlight Mode (1070) is set or automatically selected, a camera built in to the vehicle and close to or in the display area may detect the gaze (1072) of the driver. Along with Ambient light sensors (1064) and user override controls (1066), such information may be used to determine if (1106) the driver is looking at the display in high ambient or with the sun reflecting off the display. In which case the angular output of directional displays such as the CSD 532 mounted to the vehicle (see FIG. 39A) may be moved (1130) to the driver's eyes. The screen colors, contrast and luminance may be optimized for viewability in high ambient light (1132). Further the display content may be changed (1134) to a default view allowed to be viewed by the driver, or to that requested by the driver by, for example, voice commands, e.g. "show outside temperature", or "show oil temperature". If the driver is not looking at the directional display such as the CSD 532, the angular output illumination direction may be moved (1136) to the passenger direction or a default direction. The screen colors, contrast and luminance (1138) may be optimized for high ambient light viewing suitable for the display content (1140) requested by the passenger.

Figure 39A:
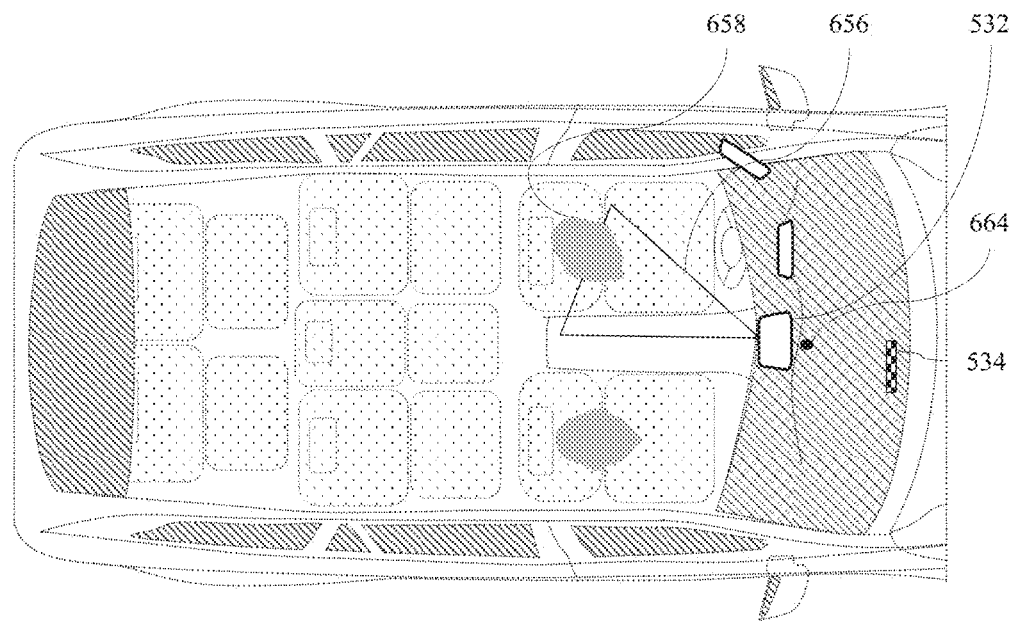
FIG. 39A and FIG. 39B are schematic diagrams illustrating in top view an automotive cabin and control of the directionality of directional displays in response to occupant gaze direction, in accordance with the present disclosure.
Figure 39B:
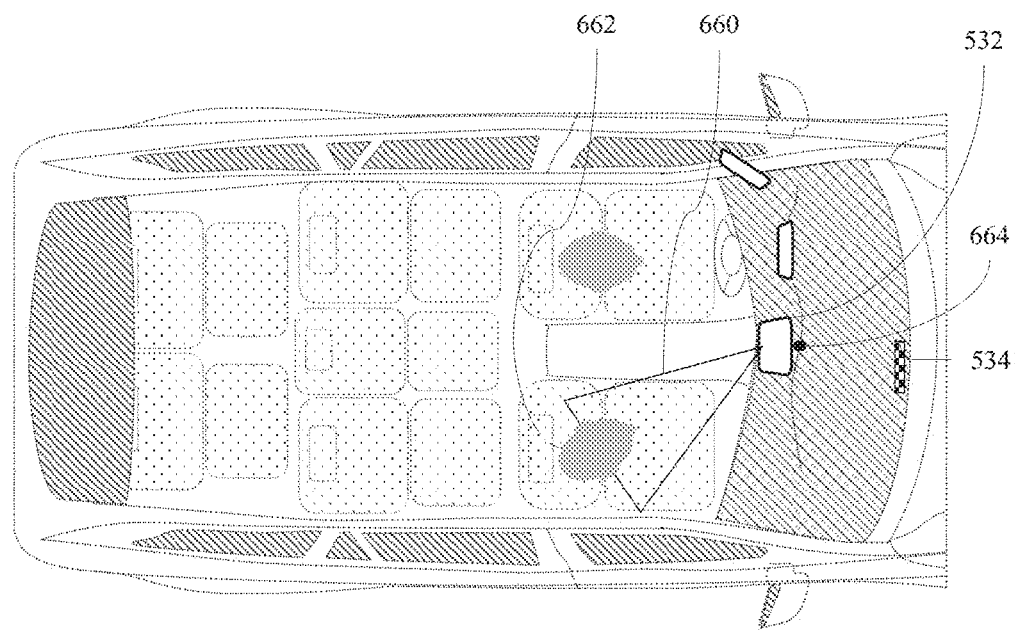

FIGS. 39A-B are schematic diagrams illustrating in top view an automotive cabin and control of the directionality of directional display CSD 532 mounted to the vehicle in response to driver 658 gaze direction. In FIG. 39A, the driver's gaze may be detected by means of a camera 664 and when looking at CSD 532 the angular output light distribution 656 along with content and brightness, display image contrast may be optimized for the driver in high ambient light or sunlight reflecting conditions. In FIG. 39B, the driver's gaze may be detected by means of camera 664 and when looking away from the CSD 532 the angular output illumination direction 660 along with content and brightness, display image contrast may be optimized for passenger 662 viewing.

Advantageously the driver and the passenger can share a display viewable in very bright ambient. Advantageously the power consumption of the display is reduced as an angular output light distribution for the driver is not illuminated when the driver is not looking at it.

Figure 40A:
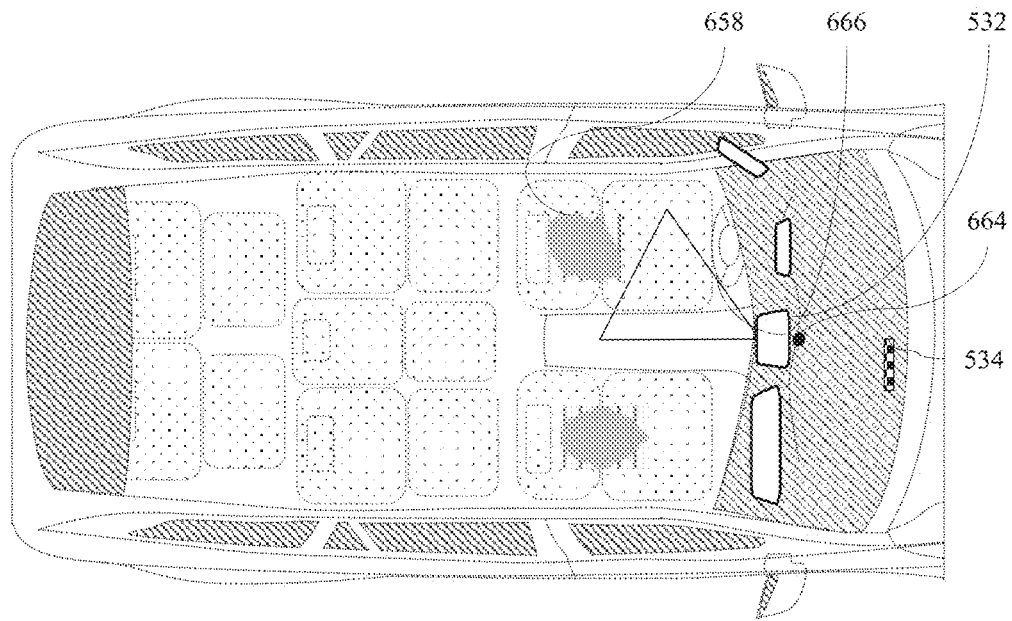
FIG. 40A and FIG. 40B are schematic diagrams illustrating in top view an automotive cabin and control of the directionality of directional displays in response to driver gaze direction in a night mode of operation, in accordance with the present disclosure.
Figure 40B:
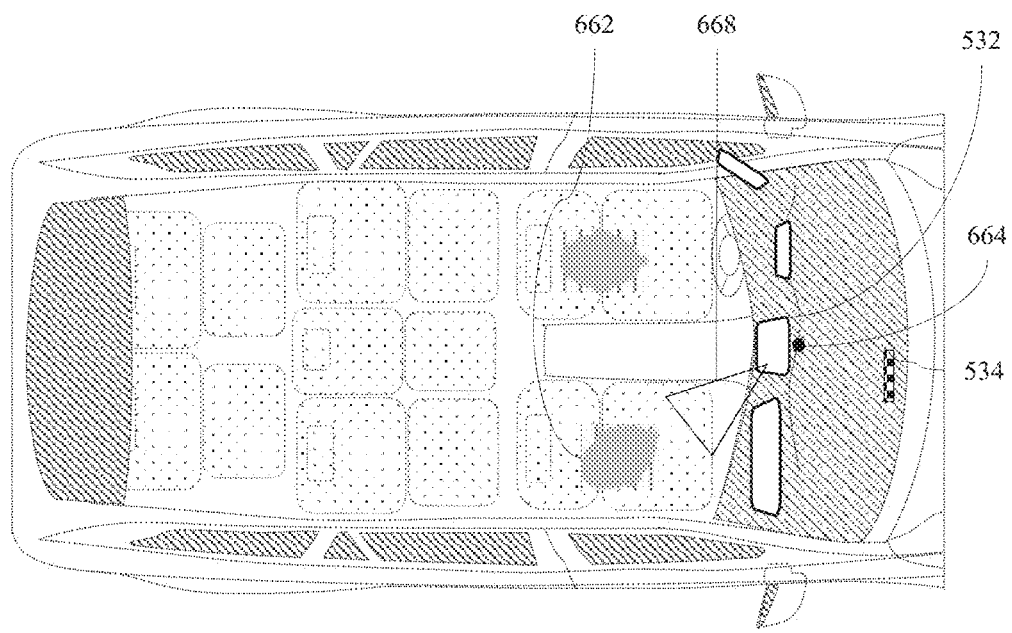

FIGS. 40A-B are schematic diagrams illustrating in top view an automotive cabin and control of the directionality of directional displays in response to driver gaze direction in a low ambient light level or night mode of operation. In FIG. 40A, the drivers gaze may be detected by means of a camera 664 and when looking at CSD 532 the angular output light distribution 666 along with content and brightness, display image contrast may be optimized for the driver in low ambient light conditions. In FIG. 40B, the driver's gaze may be detected by means of camera 664 and when looking away from the CSD 532 the angular output illumination direction 668 along with content and brightness, display image contrast may be optimized for passenger 662 viewing, or may adopt a default night mode angular output illumination direction cone (not shown) designed to minimize specular glass reflections and diffuse cabin reflectance.

Advantageously the displays mounted to the vehicle may provide an angular light output direction that is generally non-distracting to the driver, but may be clearly visible to the driver when looked at by the driver.

Figure 41:
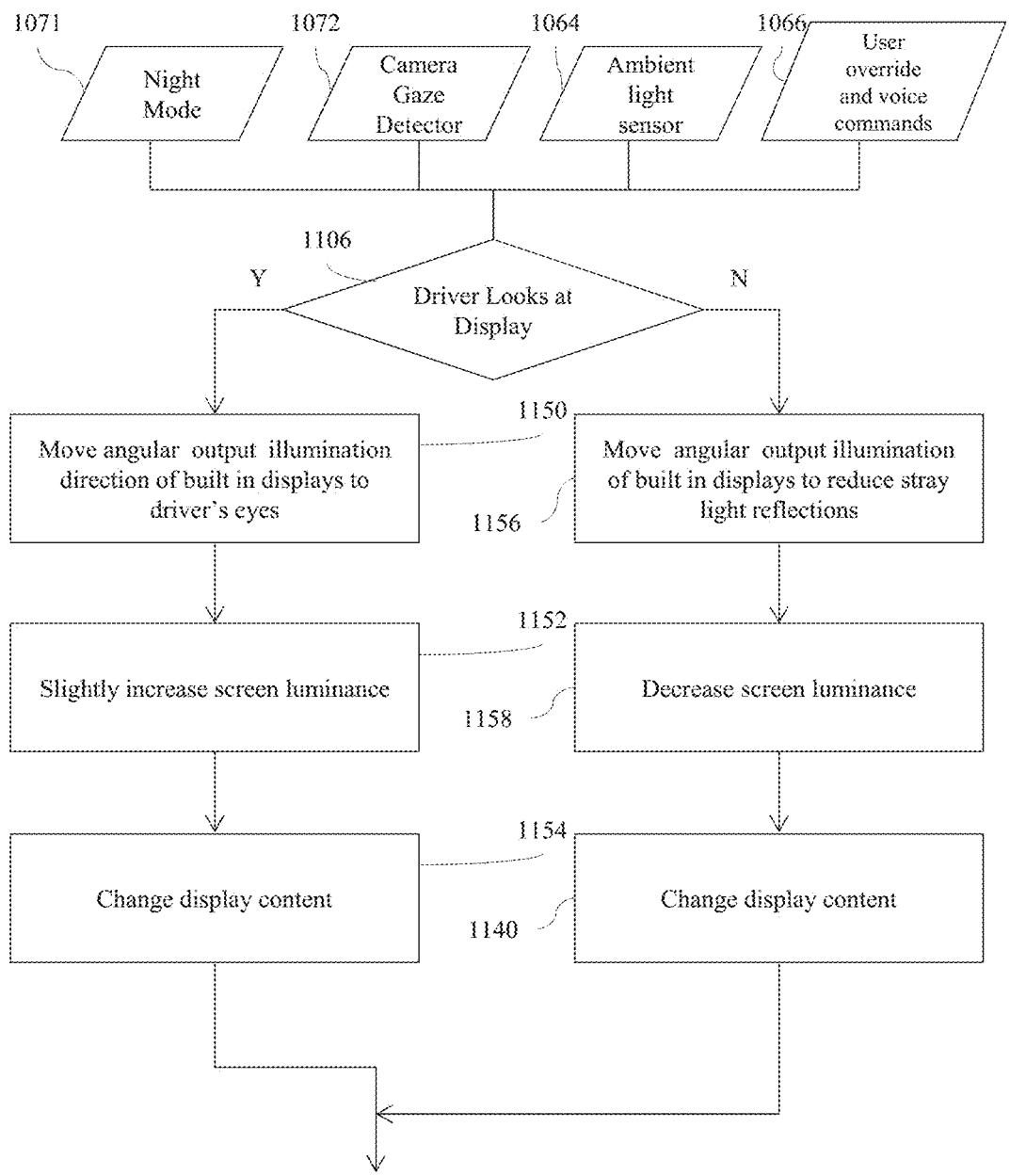
FIG. 41 is a flowchart illustrating directional illumination control of directional displays to provide control of display directionality in response to driver gaze direction, in accordance with the present disclosure.

FIG. 41 is a flowchart illustrating directional illumination control of directional displays to provide control of display directionality in response to driver gaze direction in low ambient light conditions or night mode. If night mode (1071) is set or automatically selected, a camera built in to the vehicle and close to or in the display area may detect the gaze (1072) of the driver. Infra-red illumination (not shown) may be provided within the vehicle cabin to improve the gaze detection in low ambient light level. Infra-red light is not visible to the driver and therefore does not produce distracting reflections. Along with Ambient light sensors (1064) and user override controls (1066), such information may be used to determine if (1106) the driver is looking at the display in low ambient conditions. In which case the angular output of directional displays such as the CSD 532 mounted to the vehicle (see FIG. 40A) may be moved (1150) to the driver's eyes. The screen luminance may slightly increase (1152) but still be at a level to be non-disturbing to the driver. Further the display content may be changed (1154) to a default view allowed to be viewed by the driver, or to that requested by the driver by for example voice commands e.g. "show outside temperature", or "show oil temperature". If the driver is not looking at the directional display such as the CSD 532, the angular output illumination direction may be moved (1156) to the passenger direction or a default direction. The screen luminance (1158) may be decreased to further reduce specular and diffuse reflections within the vehicle cabin and the display content (1140) may revert to default or to that requested by the passenger.

Advantageously the display angular light output direction may be adjusted in response to the gaze direction of the driver. Further advantageously large information displays can be used without producing annoying or distracting specular reflections in vehicle glass or substantially increasing the background cabin illumination from diffuse reflections off headlining, upholstery etc. The driver may see the information when needed simply by looking at or in the direction of the display.

It would be desirable for functional display luminance to be directed towards a driver.

Figure 42:
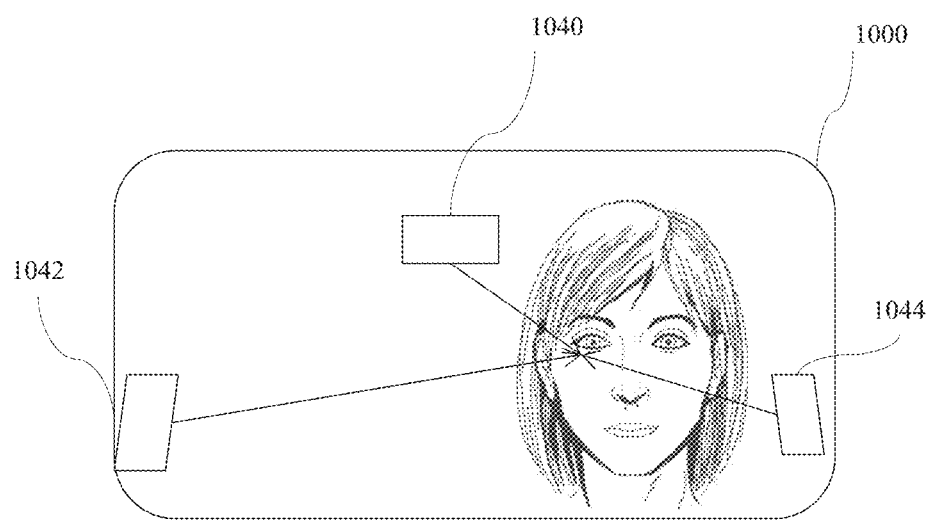
FIG. 42 is a schematic diagram illustrating in front view an automotive cabin and respective angular output light distributions from a driver functional directional displays, in accordance with the present disclosure.

FIG. 42 is a schematic diagram illustrating in front view an automotive cabin 1000 and respective angular output light distribution from driver functional directional displays. It would be desirable if these displays could reduce the light pollution created in night time operation.

FIG. 42 shows emissive directional displays 1042 and 1044, which can alter the angular output light distribution, providing the function of side and rear views from outside the vehicle. The image signal for the displays may be provided from data captured by rearward (rearwardly) or side facing cameras to the vehicle. The displayed images may also include digital overlay data such as warnings. Similarly 1040 is an emissive directional display which can alter the angular output light distribution, and provides the function of a rear view display. In a night mode, the angular output from such displays may be narrowed and or directed away from the driver to reduce distractions. Further in combination with a gaze recognition camera 664 (not shown) the output from the display may change in angle and optionally in brightness when the driver is looking at the displays. Further the displays may automatically alter their angular output light distribution towards the driver if a condition warranting attention is detected by the vehicle cameras and sensors.

Advantageously night time distraction to the driver from displays mounted to the vehicle is reduced.

It would be desirable for display directionality to be controlled in response to a stationary vehicle.

Figure 43A:
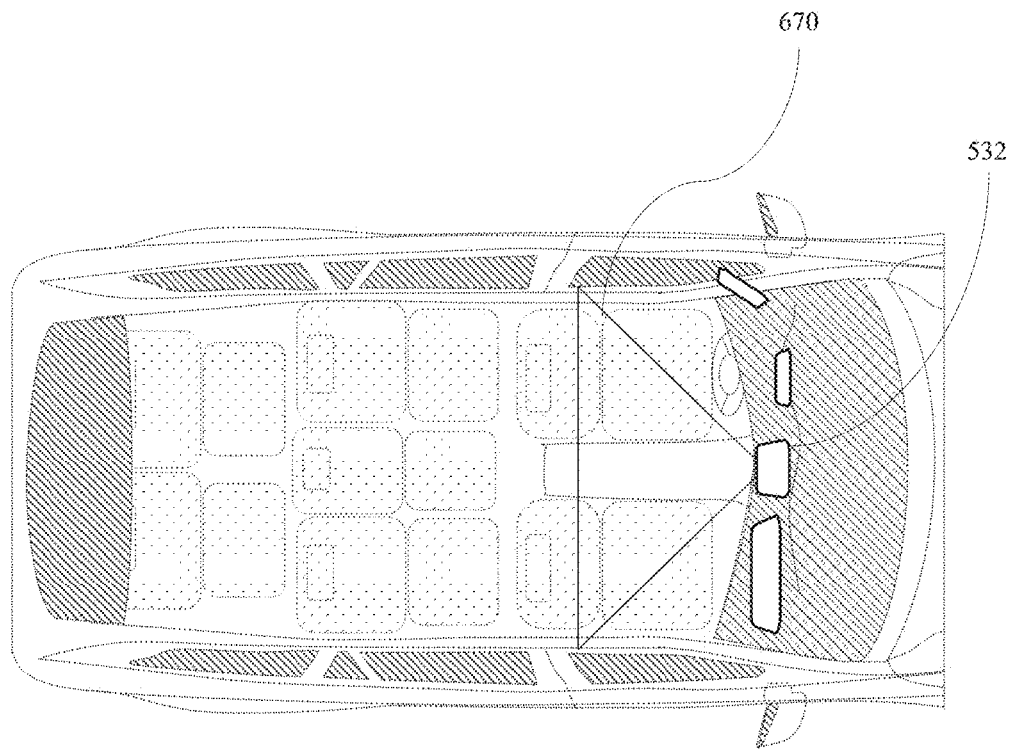
FIG. 43A, FIG. 43B, FIG. 43C, and FIG. 43D are schematic diagrams illustrating in top view an automotive cabin and control of the directionality of directional displays in response a stationary vehicle, in accordance with the present disclosure.
Figure 43B:
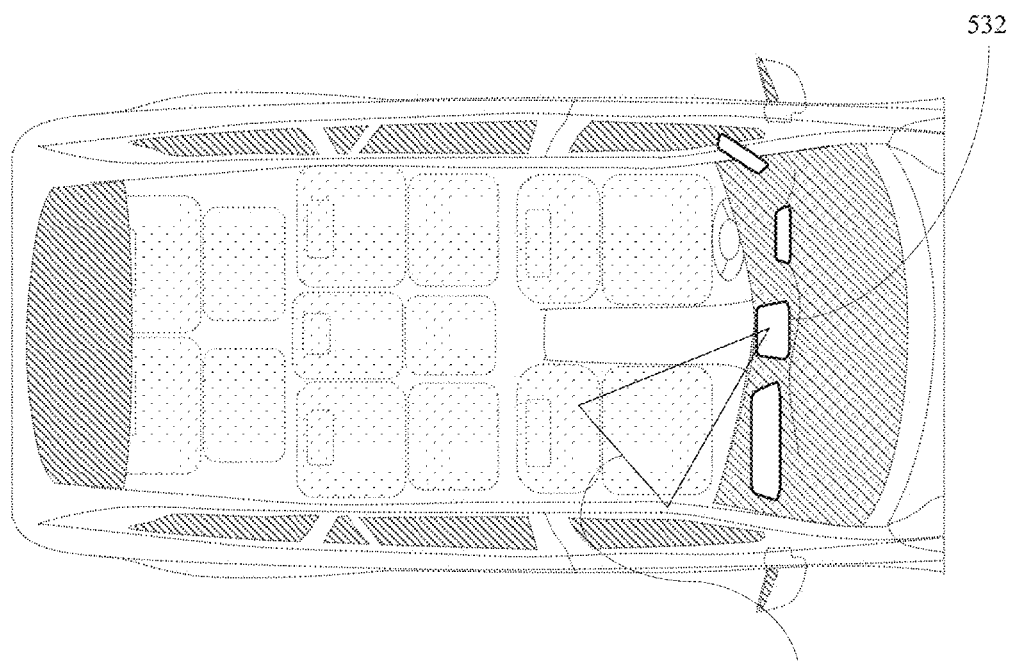
Figure 43C:
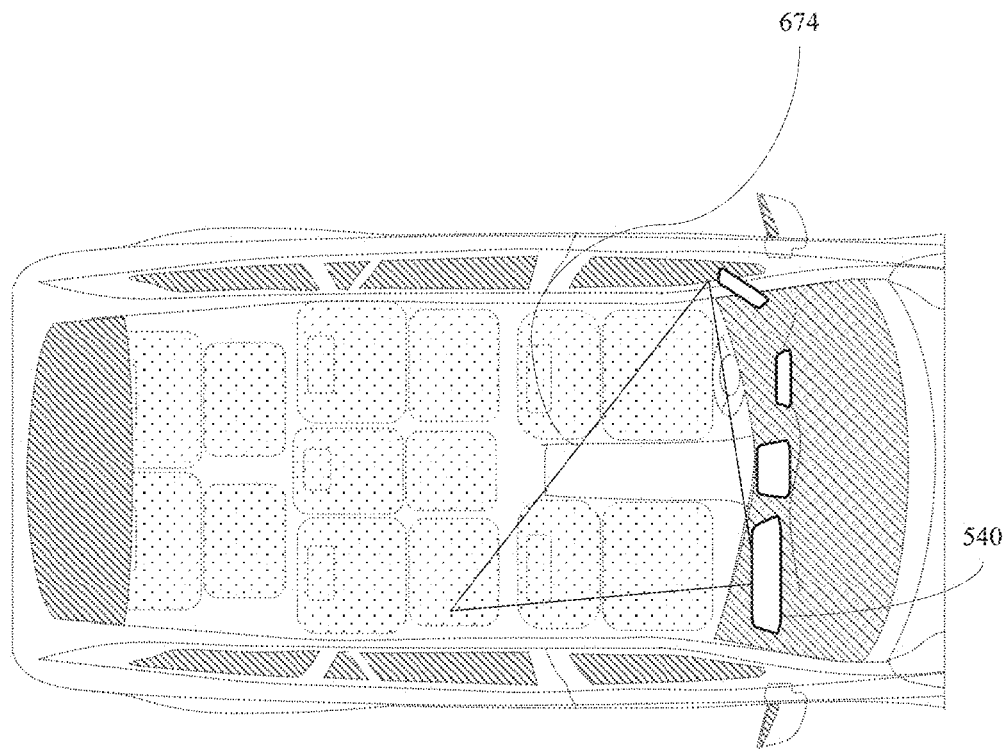
Figure 43D:
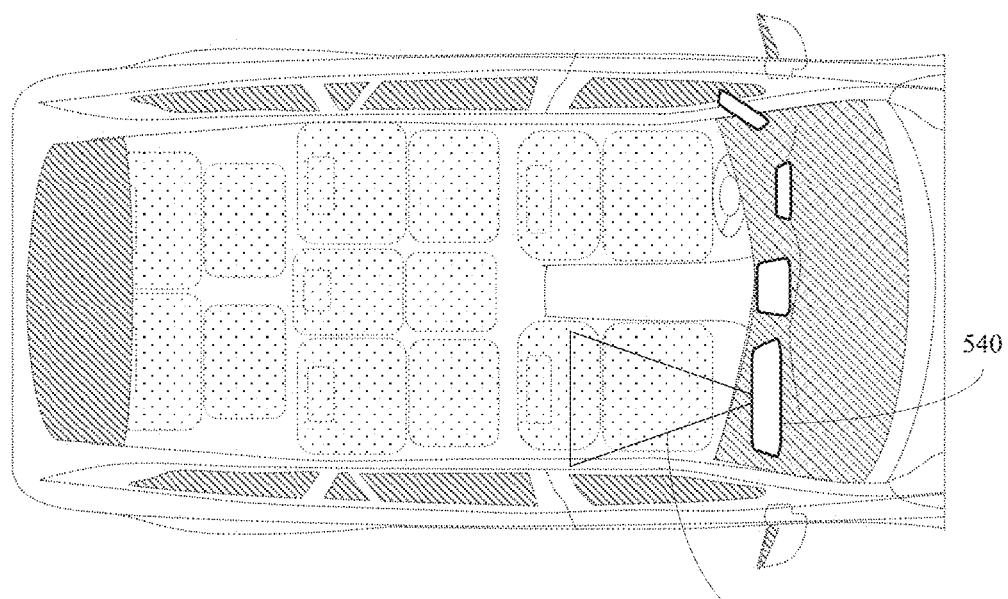

FIGS. 43A-D are schematic diagrams illustrating in top view an automotive cabin and control of the directionality of directional displays in response a stationary vehicle. FIG. 43A shows a directional display device such as CSD 532 mounted to the vehicle. When the vehicle is stationary for a period of time, for example two minutes or five minutes, the angular output light distribution may be set to a wide angular output light distribution 670 to enable viewing by the driver and passenger. Viewed images may include entertainment such as TV programs. FIG. 43B illustrates when the vehicle is moving the angular output light distribution may be set to angular output light distribution 672 appropriate to passenger viewing. FIG. 43C differs from FIG. 43A in that the angular output light distribution 674 is produced from passenger display 540 when the vehicle is stationary. FIG. 43D differs from FIG. 43B in that the display output angular light distribution 676 is produced from passenger display 540 when the vehicle is moving.

Advantageously the vehicle occupants can make full use of the entertainment displays mounted to the vehicle without the driver being able to see entertainment images while the vehicle is in motion.

Figure 44:
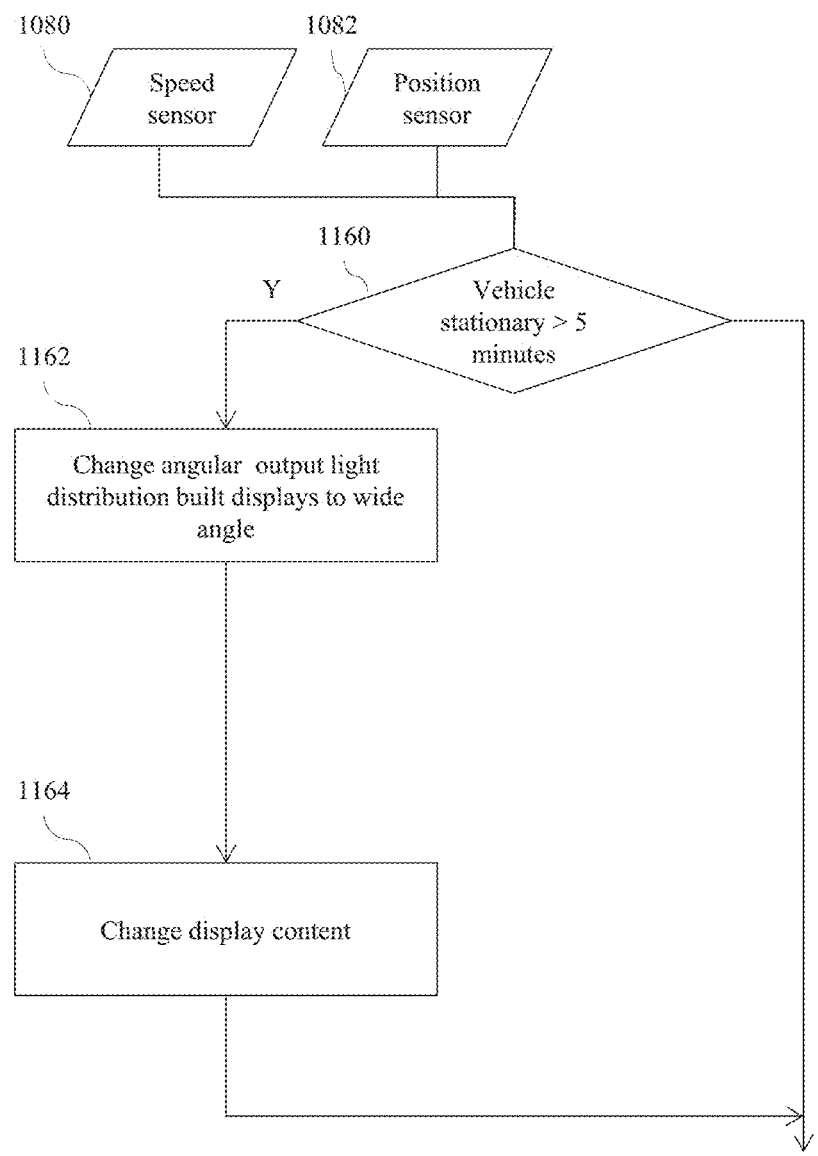
FIG. 44 is a flowchart illustrating directional illumination control of directional displays to provide control of display directionality in response to a stationary vehicle, in accordance with the present disclosure.

FIG. 44 is a flowchart illustrating directional illumination control of directional displays to provide control of display directionality in response to a stationary vehicle. The vehicle's speed sensor (1080) or position sensor (1082) may be used to determine if the vehicle is stationary for a period of time. If stationary (1160), the displays mounted to the vehicle may alter their angular output light distribution to a wide angle mode (1162). Additionally the content of the display may be altered (1164) so as to prevent the viewing of entertainment content by the driver when the vehicle is in motion, in compliance with law in certain countries.

Advantageously the vehicle occupants can make full use of the entertainment displays mounted to the vehicle without the driver being able to see entertainment while the vehicle is in motion.

It would be desirable for display directionality to be controlled in response to a crash or emergency situation.

Figure 45:
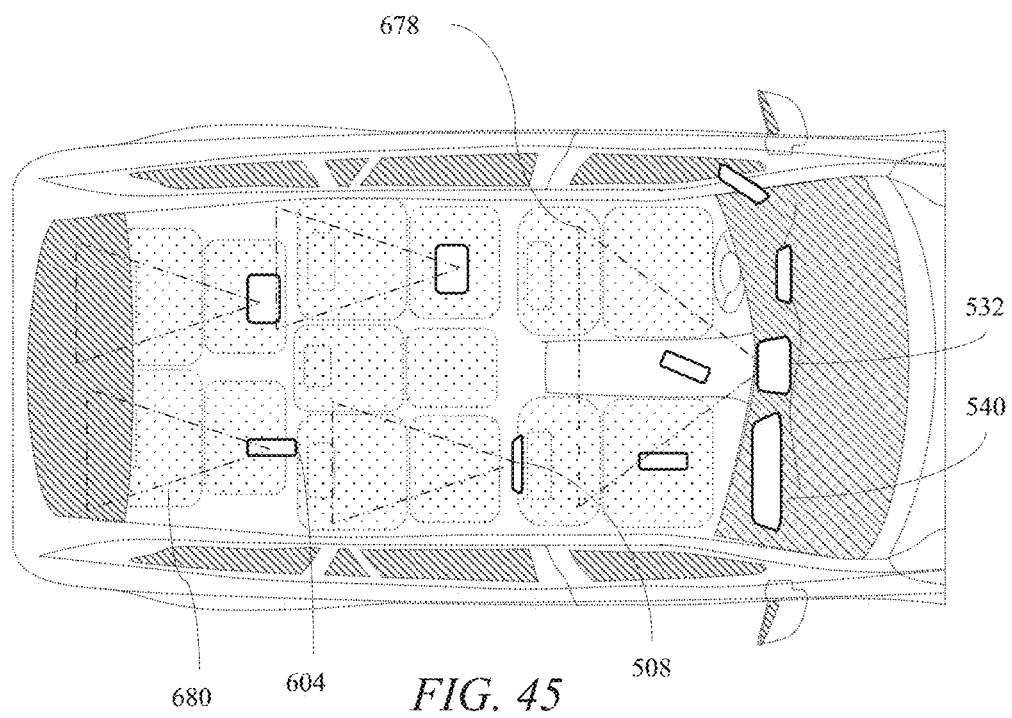
FIG. 45 is a schematic diagrams illustrating in top view an automotive cabin and control of the directionality of directional displays in response to a vehicle crash, in accordance with the present disclosure.

FIG. 45 is a schematic diagram illustrating in top view an automotive cabin and control of the directionality of directional displays in response to an emergency or vehicle crash. When a crash has been detected at night, for example by reference to the airbag being deployed, directional displays such as CSD 532 mounted to the vehicle may switch their angular output light distribution 678 between a wide angle mode and a narrow angle mode (not shown). The narrow angle may be zero. The output light may implement a recognized emergency signal such as switching angle in the pattern of Morse code SOS. Similarly, seat back displays 508 and co-located portable directional display may be instructed to operate in SOS or "beacon" mode. If the passenger seat was occupied, passenger display 540 may not operate in SOS mode.

The SOS mode may also be operated if the vehicle is detected, by means of monitoring the GPS system, as having left the highway abruptly or entered an area marked on the map as water. The vehicle may also instruct built in communications modules and co-located portable directional display device with an independent communications function to make an emergency call or text message before the vehicle power is lost as a result of the crash. The vehicle's own lighting system may be rendered inoperable by the crash either directly because of damage, or indirectly by open circuiting electrical system and power to reduce likelihood of fire.

Figure 46:
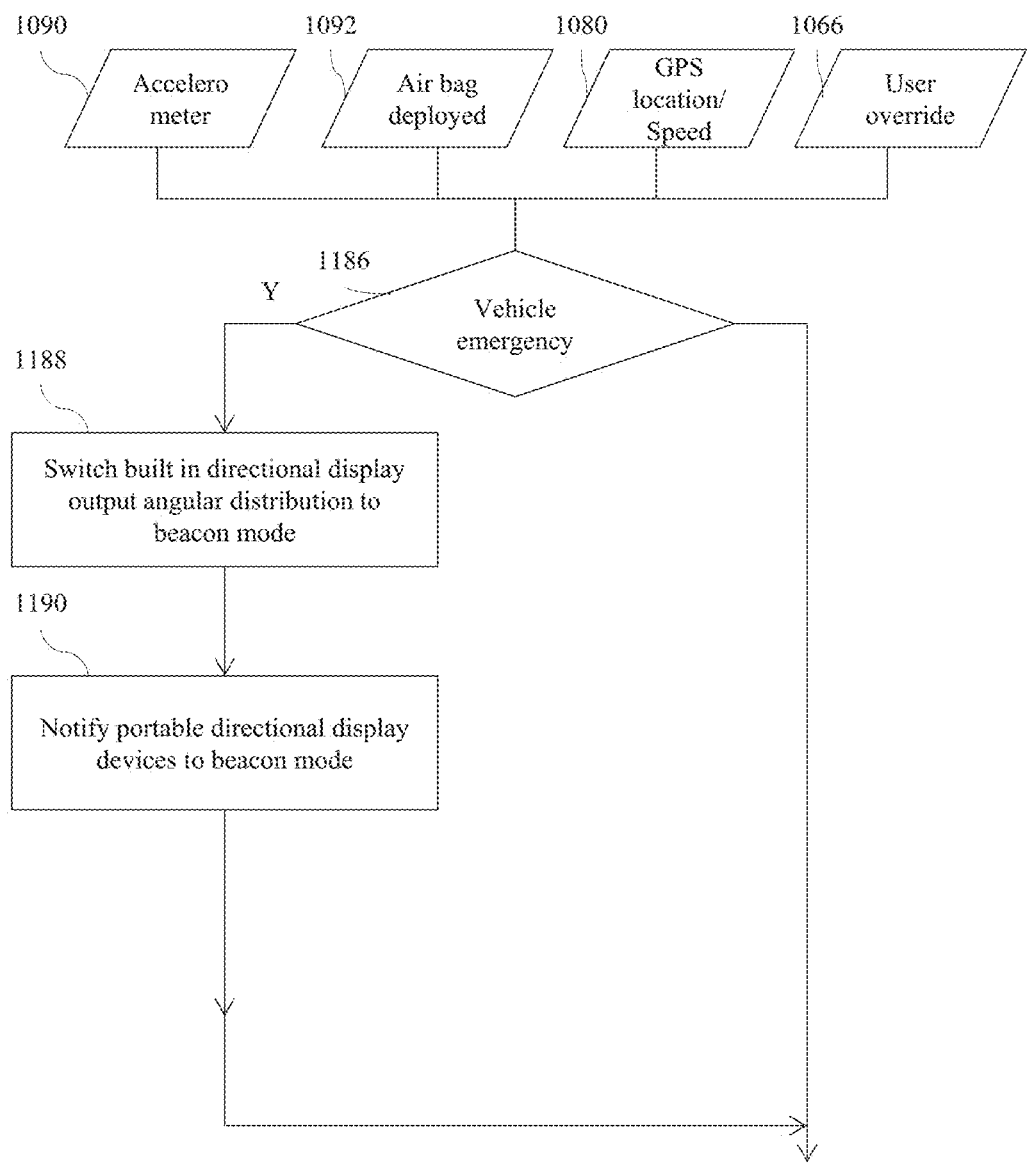
FIG. 46 is a flowchart illustrating directional illumination control of directional displays to provide control of display directionality in response to a vehicle crash, in accordance with the present disclosure.

FIG. 46 is a flowchart illustrating directional illumination control of directional displays to provide control of display directionality in response to a vehicle crash. Sensors such as accelerometer (1090) and signals such as deployment of one or more airbags (1092) along with GPS position and speed data (1080) may be monitored in order to automatically detect a vehicle emergency (1186) and trigger SOS or beacon mode by directional devices mounted to the vehicle (1188) or portable directional display devices (1190). The vehicle occupants may also trigger or cancel beacon mode manually (1066).

Advantageously in events where a vehicle leaves the road, particularly at night, the vehicle may be more easily noticed by passers-by and emergency workers.

Now that personal devices such as phones can be synchronized or linked with the vehicle it would be desirable for more than one portable directional display to be registered or synchronized to a vehicle.

Figure 47:
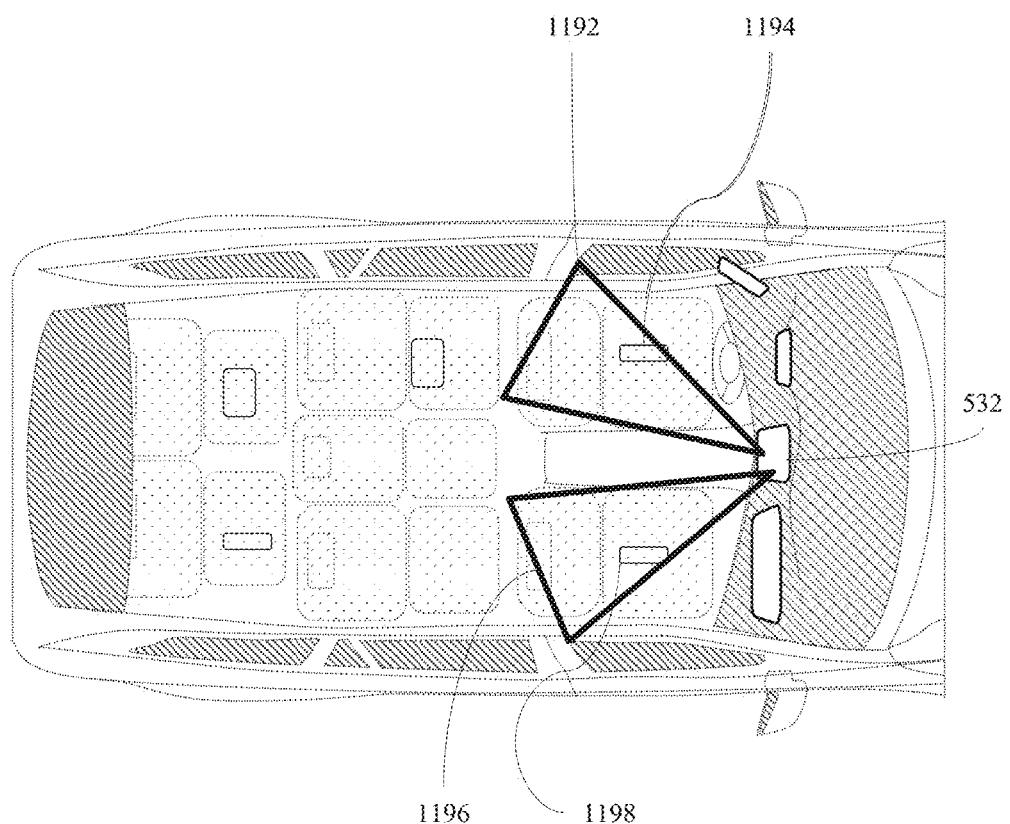
FIG. 47 is a schematic diagrams illustrating in top view an automotive cabin and registration of at least two directional display devices, in accordance with the present disclosure.

FIG. 47 is a schematic diagram illustrating in top view an automotive cabin and registration of at least two portable personal display devices (that are optionally provided with directional displays) to the directional display of the CSD 532. For example the driver's cell phone 1194 may be linked to the directional display CSD 532, which may produce an output angular light distribution 1192 appropriate for viewing by the driver. The passenger's cell phone or tablet 1198 may also be linked to the directional display CSD 532, which may produce an output angular light distribution cone 1196 appropriate for viewing by the passenger. Such light cones 1192, 1198 may be present at the same time or controlled as explained in other embodiments in this specification. The vehicle system may additionally limit the display of content to the respective cones 1192, 1196 in compliance with applicable law e.g. viewing of entertainment images by the driver may be prohibited.

Figure 48:
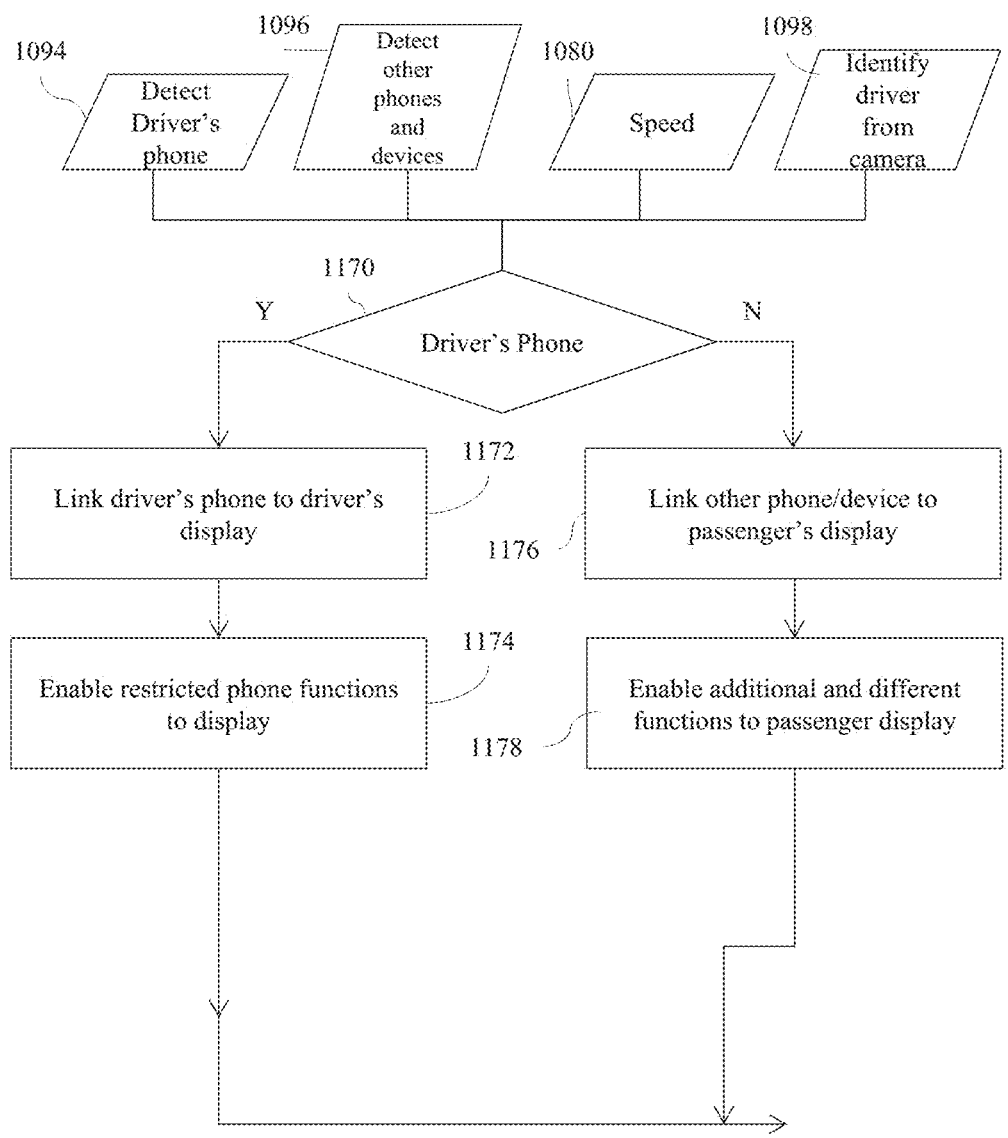
FIG. 48 is a flowchart illustrating directional illumination control comprising registration of at least two directional display devices, in accordance with the present disclosure.

FIG. 48 is a flowchart illustrating directional illumination control comprising registration of at least two personal display devices. The driver at any time may be identified by means of a camera system (1098) including facial recognition software and linked to a database of phone numbers and their registered owners. The system may therefore decide (1170) which is the driver's phone and link this device to the driver's view display (1172). The driver's view display may enable a subset of the phone's functions or content to be enabled. Similarly other phone or tablet device may be linked to the passenger's display (1176) and additional or extra functions may be enabled (1178).

Advantageously the system may automatically link the driver and passenger devices to their respective views in the directional displays mounted to the vehicle and manage the allowable content that may be displayed. The system may automatically react to driver passenger swaps for example during a long journey.

It would be desirable to provide an autonomous vehicle with directional display data in response to which side of a vehicle an occupant is located.

Figure 49A:
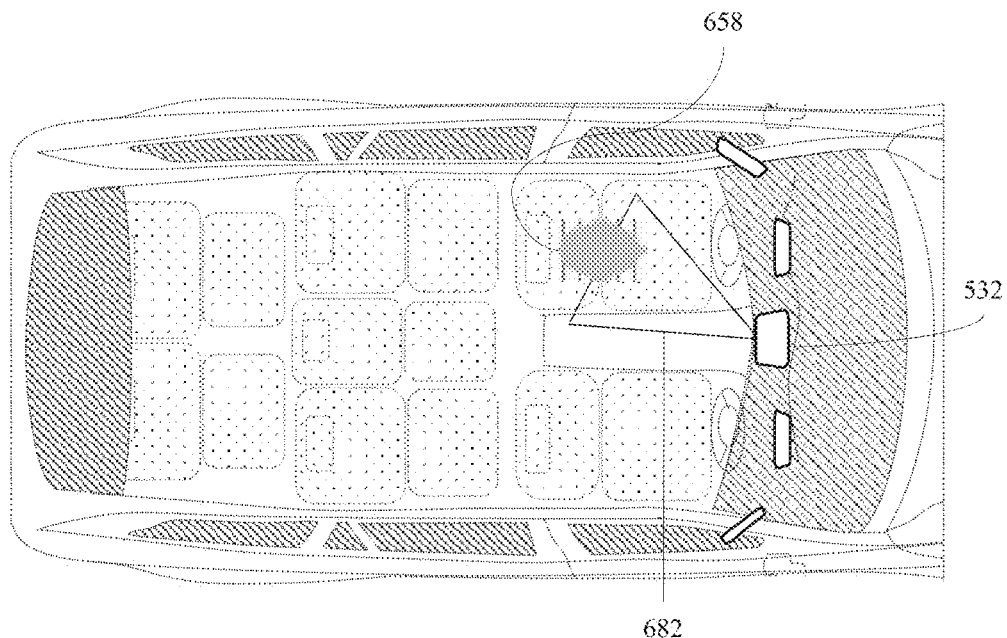
FIG. 49A and FIG. 49B are schematic diagrams illustrating in top view an automotive cabin for an autonomous vehicle comprising a directional display, in accordance with the present disclosure.
Figure 49B:
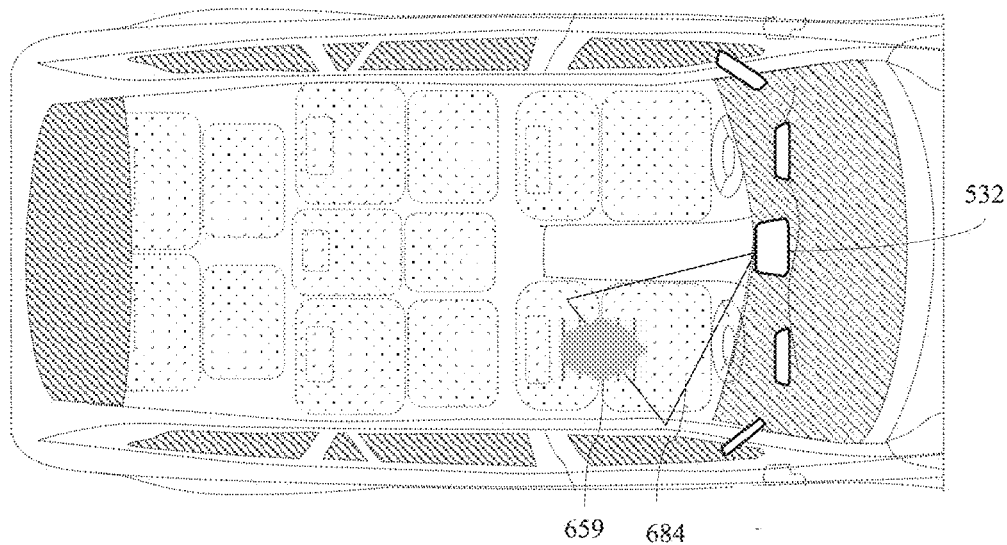

FIGS. 49A-B are schematic diagrams illustrating in top view an automotive cabin for an autonomous vehicle comprising a directional display.

It would be desirable that the driver could choose which seat to sit in and "drive" from when operating a vehicle capable of autonomous operation.

FIG. 49A shows the driver 658 sitting for left hand drive. Directional display CSD 532 mounted to the vehicle produces angular output light distribution 682 appropriate to the driver as described in the foregoing embodiments. FIG. 49B shows the driver sitting in the same vehicle but now adopting a driving seat for right hand drive. Directional display CSD 532 mounted to the vehicle produces angular output light distribution 684 appropriate to the driver 659 as described in the foregoing embodiments. Note that the vehicle override controls are electrically operated rather than mechanical and can also be altered easily from left to right hand drive. This is illustrated by the presence of two steering wheels in the figures.

Advantageously the driver may choose which seat to sit in when operating an autonomously controlled vehicle. This may be helpful when the sun for example is entering predominantly from the side window on one side of the vehicle. Further advantageously this feature may be useful when crossing from a right hand drive country such as UK to a left hand drive country such as France.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising:
   a directional display device for use in a vehicle arranged to display an image, the directional display device having an angular output light distribution that is adjustable; and
   a control system arranged to angularly expand the angular output light distribution of the directional display device on the basis of the output of a gaze sensor system provided on the vehicle indicating that an occupant's gaze is sensed at an angular direction toward the directional display device.

2. A display apparatus according to claim 1, wherein the control system is further arranged to angularly restrict the angular output light distribution of the directional display device on the basis of the output of a darkness sensor system provided on the vehicle indicating that dark ambient conditions have been detected.

3. A display apparatus according to claim 2, wherein the control system is arranged to decrease the brightness of the directional display device and/or adapt the color balance of the directional display device for viewing in dark ambient conditions on the basis of the output of the darkness sensor system indicating that dark ambient conditions have been detected.

4. A display apparatus according to claim 1, wherein the control system is arranged to restrict the angular output light distribution of the directional display device on the basis of the output of a brightness sensor system provided on the vehicle indicating that bright ambient conditions have been detected.

5. A display apparatus according to claim 4, wherein the control system is arranged to increase the brightness of the directional display device and/or adapt the color balance of the directional display device for viewing in bright ambient conditions on the basis of the output of the brightness sensor system indicating that bright ambient conditions have been detected.

6. A display apparatus according to claim 1, wherein the control system is arranged to expand the angular output light distribution of the directional display device on the basis of the output of a vehicle motion sensor system provided on the vehicle indicating that the vehicle is motionless for a specified time.

7. A display apparatus according to claim 1, wherein the control system is arranged to direct the angular output light distribution of the directional display device towards an occupant on the basis of the output of an occupant sensor system provided on the vehicle.

8. A display apparatus according to claim 1, wherein the display apparatus further comprises an orientation sensor arranged to detect the orientation of the directional display device and the control system is arranged to vary the angular output light distribution of the directional display device on the basis of the output of the orientation sensor.

9. A display apparatus according to claim 8, wherein the orientation sensor comprises an inertial sensor.

10. A display apparatus according to claim 8, wherein the orientation sensor comprises a camera system and an analysis system arranged to detect the position of windows of the vehicle in images captured by the camera system.

11. A display apparatus according to claim 1, wherein the directional display device is mounted to the vehicle.

12. A display apparatus according to claim 11, wherein the directional display device is mounted to a central console of the vehicle.

13. A display apparatus according to claim 11, wherein the directional display device is arranged to display an image captured by an image capture system facing rearwardly of the vehicle.

14. A display apparatus according to claim 1, wherein the display apparatus is a portable apparatus, the control system of the display apparatus being arranged to communicate with a processing system of the vehicle.

15. A display apparatus according to claim 14, wherein the control system of the display apparatus is arranged to receive layout information communicated from the processing system of the vehicle, the layout information identifying the internal layout of the vehicle, and the control system is arranged to vary the angular output light distribution of the directional display device on the basis of the layout information.

16. A display apparatus according to claim 14, wherein the communication with the processing system of the vehicle is by a wireless means.

17. A display apparatus according to claim 1, wherein the control system is arranged to vary the angular output light distribution of the directional display device in a manner that reduces the incidence of light on windows of the vehicle.

18. A display apparatus according to claim 1, wherein the control system is arranged to vary at least one of the brightness, contrast, color balance or content of the image displayed on the directional display device.

19. A display apparatus according to claim 1, wherein the directional display device comprises:
   a directional backlight arranged to direct light into selectable viewing windows; and
   a spatial light modulator arranged to modulate the light output by the directional backlight,
   wherein the control system is arranged to vary the angular output light distribution of the directional display device by selecting the viewing windows into which light is directed.

20. A display apparatus according to claim 19, wherein the directional backlight comprises:
   an array of light sources; and
   a directional waveguide arranged to direct light from each light source into a respective viewing window,
   wherein the control system is arranged to vary the angular output light distribution of the directional display device by selecting which light sources are operated.

21. A display apparatus according to claim 20, wherein the directional waveguide comprises:
   first and second opposed guide surfaces for guiding input light from the light sources along the directional waveguide; and
   a reflective end for reflecting input light back along the directional waveguide,
   wherein the second guide surface is arranged to deflect light reflected from the reflective end through the first guide surface as output light.

22. A display apparatus according to claim 21, wherein the first guide surface is arranged to guide light by total internal reflection and the second guide surface comprises a plurality of light extraction features oriented to direct light reflected by the reflective end in directions allowing exit through the first guide surface as the output light and intermediate regions between the plurality of light extraction features that are arranged to guide light along the directional waveguide.

* * * * *